US012801246B2

(12) United States Patent
Kikuta et al.

(10) Patent No.: US 12,801,246 B2
(45) Date of Patent: Nov. 17, 2026

(54) INTERFACE DEVICE AND INTERFACE SYSTEM

(71) Applicant: Mitsubishi Electric Corporation, Tokyo (JP)

(72) Inventors: Hayato Kikuta, Tokyo (JP); Hirohiko Higuchi, Tokyo (JP); Natsuki Takagawa, Tokyo (JP); Maki Ito, Tokyo (JP); Shodai Kayama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 19/107,590

(22) PCT Filed: Aug. 9, 2023

(86) PCT No.: PCT/JP2023/029011
§ 371 (c)(1),
(2) Date: Feb. 28, 2025

(87) PCT Pub. No.: WO2024/079971
PCT Pub. Date: Apr. 18, 2024

(65) Prior Publication Data

US 2026/0072550 A1 Mar. 12, 2026

(30) Foreign Application Priority Data

Oct. 13, 2022 (WO) .................. PCT/JP2022/038133

(51) Int. Cl.
*G06F 3/01* (2006.01)
*G02B 30/56* (2020.01)
*G06F 3/042* (2006.01)

(52) U.S. Cl.
CPC ............. *G06F 3/042* (2013.01); *G02B 30/56* (2020.01); *G06F 3/011* (2013.01); *G06F 3/017* (2013.01)

(58) Field of Classification Search
CPC .......... G06F 3/042; G06F 3/011; G06F 3/017; G06F 3/04842; G06F 3/04815;
(Continued)

(56) References Cited

U.S. PATENT DOCUMENTS 11,188,154 B2 * 11/2021 Rakshit ................. G06F 3/0426
2005/0122584 A1 6/2005 Ishikawa et al.
(Continued)

FOREIGN PATENT DOCUMENTS

JP 2005-141102 A 6/2005
JP 2011-039844 A 2/2011
(Continued)

OTHER PUBLICATIONS

International Search Report and Written Opinion mailed on Sep. 19, 2023, received for PCT Application PCT/JP2023/029011, filed on Aug. 9, 2023, 11 pages including English Translation.
(Continued)

*Primary Examiner* — Abdul-Samad A Adediran
(74) *Attorney, Agent, or Firm* — XSENSUS LLP

(57) ABSTRACT

An interface device includes: a detection unit that detects the three-dimensional position of a detection target in a virtual space; and a projection unit that projects an aerial image onto the virtual space. The virtual space is divided into a plurality of operation spaces for each operation executable by a user in a case where the three-dimensional position of the detection target detected by the detection unit is included, the operation being defined in each of the opera-
(Continued)

tion spaces, and a boundary position of each operation space in the virtual space is indicated by an aerial image projected by the projection unit.

28 Claims, 30 Drawing Sheets

(58) Field of Classification Search
CPC ....... G06F 3/0426; G02B 30/56; G03B 35/18; G03H 1/005
USPC ............................. 345/175; 353/10; 715/825
See application file for complete search history.

(56) References Cited

U.S. PATENT DOCUMENTS

| | | | | |
|---|---|---|---|---|
| 2010/0110384 | A1* | 5/2010 | Maekawa | G03B 35/18 353/10 |
| 2012/0119988 | A1 | 5/2012 | Izumi | |
| 2015/0077399 | A1* | 3/2015 | Nishioka | G06F 3/04815 345/175 |
| 2016/0124502 | A1 | 5/2016 | Sawyer et al. | |
| 2018/0184044 | A1 | 6/2018 | Yue et al. | |
| 2019/0212812 | A1 | 7/2019 | Sawyer et al. | |
| 2019/0243469 | A1 | 8/2019 | Kuribayashi | |
| 2020/0124867 | A1 | 4/2020 | Tsunekawa et al. | |
| 2021/0200321 | A1* | 7/2021 | Kaede | G03H 1/0005 |
| 2021/0382563 | A1* | 12/2021 | Dabir | G06F 3/017 |
| 2022/0308695 | A1* | 9/2022 | Hara | G06F 3/011 |
| 2023/0112984 | A1* | 4/2023 | Malin | G06F 3/04842 715/825 |
| 2024/0353933 | A1 | 10/2024 | Kuribayashi | |

FOREIGN PATENT DOCUMENTS

| | | | |
|---|---|---|---|
| JP | 2016-164701 | A | 9/2016 |
| JP | 2017-017521 | A | 1/2017 |
| JP | 2017-535901 | A | 11/2017 |
| JP | 2018-018305 | A | 2/2018 |
| JP | 2018-088027 | A | 6/2018 |
| JP | 2019-002976 | A | 1/2019 |
| JP | 2020-013171 | A | 1/2020 |
| JP | 2020-067707 | A | 4/2020 |
| JP | 2021-015637 | A | 2/2021 |
| JP | 2022-007868 | A | 1/2022 |
| WO | 2008/123500 | A1 | 10/2008 |
| WO | 2017/125984 | A1 | 7/2017 |
| WO | 2018/003861 | A1 | 1/2018 |
| WO | 2018/078777 | A1 | 5/2018 |

OTHER PUBLICATIONS

International Search Report and Written Opinion mailed on Dec. 6, 2022, received for PCT Application PCT/JP2022/038133, filed on Oct. 13, 2022, 10 pages including English Translation.
Notice of Reasons for Refusal issued on May 20, 2025, in connection with the corresponding Japanese patent application No. 2024-551244, 9pp.

* cited by examiner

INTERFACE DEVICE AND INTERFACE SYSTEM

CROSS-REFERENCE TO RELATED APPLICATIONS

This application is a national stage application, pursuant to 35 U.S.C. § 371, of International Patent Application No. PCT/JP2023/029011, filed Aug. 9, 2023, which is based on International Patent Application No. PCT/JP2022/038133, filed Oct. 13, 2022, the entire contents of each are incorporated herein by reference.

TECHNICAL FIELD

The present disclosure relates to an interface device and an interface system.

BACKGROUND ART

Conventionally, as an operation input technique for an electronic device or the like, there is a proposed technique that enables a user to perform a noncontact operation input by allowing the user to operate a virtual space provided in a space. In relation to such a technique, Patent Literature 1 discloses a display apparatus having a function of controlling an operation input through a remote operation performed by a user on a display screen.

This display apparatus includes two cameras that capture a region including the user viewing the display screen, and detects, from video images captured by the cameras, a second point representing a user reference position with respect to a first point representing a camera reference position, and a third point representing the position of a finger of the user. The display apparatus sets a virtual planar space at a position of a predetermined length in a first direction from the second point in a space, and determines and detects a predetermined operation performed by the user, on the basis of the degree of entry of the finger of the user into the virtual planar space. This display apparatus then generates operation input information on the basis of a result of the determination and detection, and controls operations of the display apparatus on the basis of the generated information.

Here, the virtual planar space is a space that has no physical entity, and is set as position coordinates of a three-dimensional space through calculation performed by a processor or the like of the display apparatus. This virtual planar space is designed as a substantially rectangular parallelepiped or a flat plate-like space interposed between two virtual planes. The two virtual planes are a first virtual plane on the near side close to the user, and a second virtual plane on the far side.

For example, in a case where the point at the finger position has reached the first virtual plane from the first space on the front side of the first virtual plane, and further entered the second space behind the first virtual plane, the display apparatus automatically shifts to a state in which a predetermined operation is accepted, and displays a cursor on the display screen. Further, in a case where the point at the finger position has reached the second virtual plane through the second space, and further entered the third space behind the second virtual plane, the display apparatus determines and detects a predetermined operation (such as touching, tapping, swiping, or pinching performed on the second virtual plane). Having detected the predetermined operation, the display apparatus controls operations of the display apparatus including display control of the GUI of the display screen, on the basis of the position coordinates of the point of the detected finger position, and operation information indicating the predetermined operation.

CITATION LIST

Patent Literature

Patent Literature 1: JP 2021-15637 A

SUMMARY OF INVENTION

Technical Problem

The display apparatus disclosed in Patent Literature 1 described above (hereinafter also referred to as the "conventional device"), a mode for accepting the predetermined operation and a mode for determining and detecting the predetermined operation are switched, depending on the point of the finger position of the user in the virtual planar space. With the above-described conventional device, however, it is difficult for the user to visually recognize at which positions in the virtual planar space the above respective modes are switched, or, in other words, the boundary positions (the boundary position between the first space and the second space, and the boundary position between the second space and the third space) of the respective spaces constituting the virtual planar space.

The present disclosure has been made to solve the above problem, and aims to provide a technology for visually recognizing boundary positions of a plurality of operation spaces constituting a virtual space to be operated by a user.

Solution to Problem

An interface device according to the present disclosure includes: a detector to detect a three-dimensional position of a detection target in a virtual space; and a projector to project an aerial image onto the virtual space, wherein the virtual space comprises a plurality of operation spaces for each operation executable by a user when the three-dimensional position of the detection target detected by the detector is included and the operation being defined in each operation space among the plurality of operation spaces, a predetermined pointer movement operation to the display information of the display device in conjunction with the movement of the detection target in the operation space being defined in at least any one of the plurality of the operation spaces, and a boundary position of each of the operation spaces in the virtual space is indicated by the aerial image projected by the projector.

Also, an interface device according to the present disclosure is an interface device that enables an operation of an application displayed on a display device, and includes: a detector to detect the three-dimensional position of a detection target in a virtual space comprising a plurality of operation spaces; at least one boundary definer to indicate a boundary position of each operation space and includes a line or a plane; and a boundary displayer to provide at least one visually recognizable boundary of the respective operation spaces, and includes a point, a line, or a plane. In a case where the three-dimensional position of the detection target detected by the detector is included in the virtual space, the detection target is enabled to perform a plurality of kinds of operations on the application, the operations being associated with the respective operation spaces, and in at least any one of the plurality of operation spaces, a predetermined pointer movement operation to display information of the display device in conjunction with movement of the detection target in the operation space is defined.

Further, an interface system according to the present disclosure includes: a detector that detects the three-dimensional position of a detection target in a virtual space; a projector that projects an aerial image onto the virtual space; and a display device that displays video information. The virtual space comprises a plurality of operation spaces for each an operation executable by a user in a case where the three-dimensional position of the detection target detected by the detector is included being defined in each of the operation spaces. A boundary position of each of the operation spaces is indicated by the aerial image projected by the projector. The aerial image projected by the projector is visually recognizable by the user, together with the video information displayed on the display device.

Also, an interface system according to the present disclosure includes: a detector that detects the three-dimensional position of a detection target in a virtual space comprising a plurality of operation spaces; an acquisitor that acquires the three-dimensional position of the detection target detected by the detector; a projector that projects an aerial image indicating a boundary position of the operation spaces; a determinator that determines the operation space in which the three-dimensional position of the detection target is included, on the basis of the three-dimensional position of the detection target acquired by the acquisitor and the boundary position of each of the operation spaces in the virtual space; and an operation information outputter that outputs operation information for performing a predetermined operation on an application displayed on a display apparatus, using at least a result of determination performed by the determiner. Each of the operation spaces corresponds to at least one operation of a plurality of kinds of operations using a mouse or a touch panel for the application, and different successive operations of the operations for the application are associated with adjacent operation spaces among the respective operation spaces.

Further, an interface system according to the present disclosure includes: a detector that detects the three-dimensional position of a detection target in a virtual space comprising a plurality of operation spaces; an acquisitor that acquires the three-dimensional position of the detection target detected by the detector; a projector that projects an aerial image indicating a boundary position of the operation spaces; a determiner that determines the operation space in which the three-dimensional position of the detection target is included, on the basis of the three-dimensional position of the detection target acquired by the acquisitor and the boundary position of each of the operation spaces in the virtual space; and an operation information outputter that outputs operation information for performing a predetermined operation on an application displayed on a display apparatus, using at least a result of determination performed by the determiner. The operation information outputter identifies movement of the detection target on the basis of the three-dimensional position of the detection target, associates movement of the detection target in each of the operation spaces or across each of the operation spaces with at least one operation of a plurality of kinds of operations for the application using a mouse or a touch panel, and interlocks a predetermined operation for the application with the movement of the detection target.

Advantageous Effects of Invention

According to the present disclosure, with the above-described configuration, it is possible to visually recognize boundary positions of a plurality of operation spaces constituting a virtual space to be operated by a user.

DESCRIPTION OF EMBODIMENTS

The following is a detailed description of embodiments, with reference to the drawings.

First Embodiment

Figure 1A:
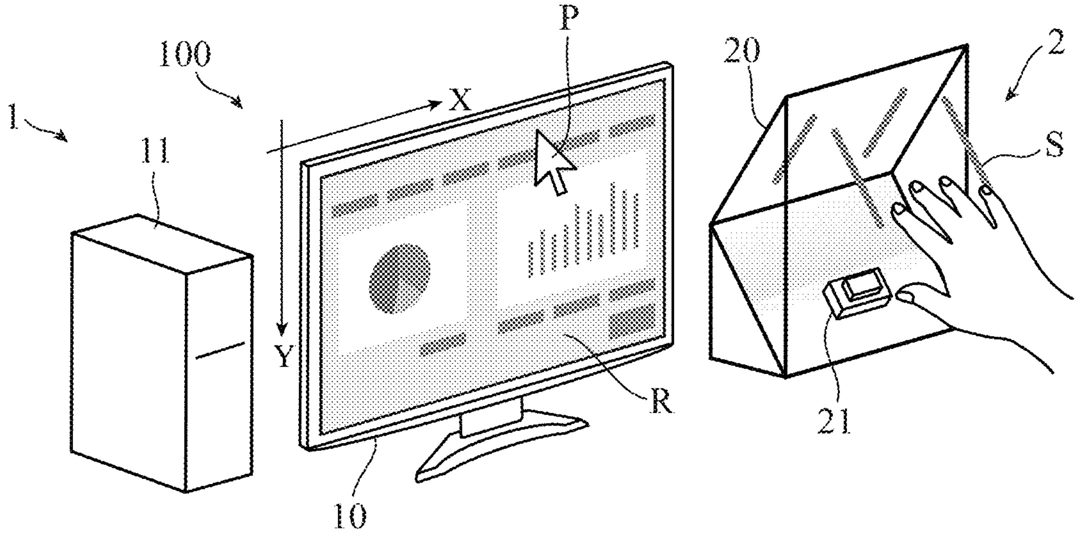
FIG. 1A is a perspective view illustrating an example configuration of an interface system according to a first embodiment.
Figure 1B:
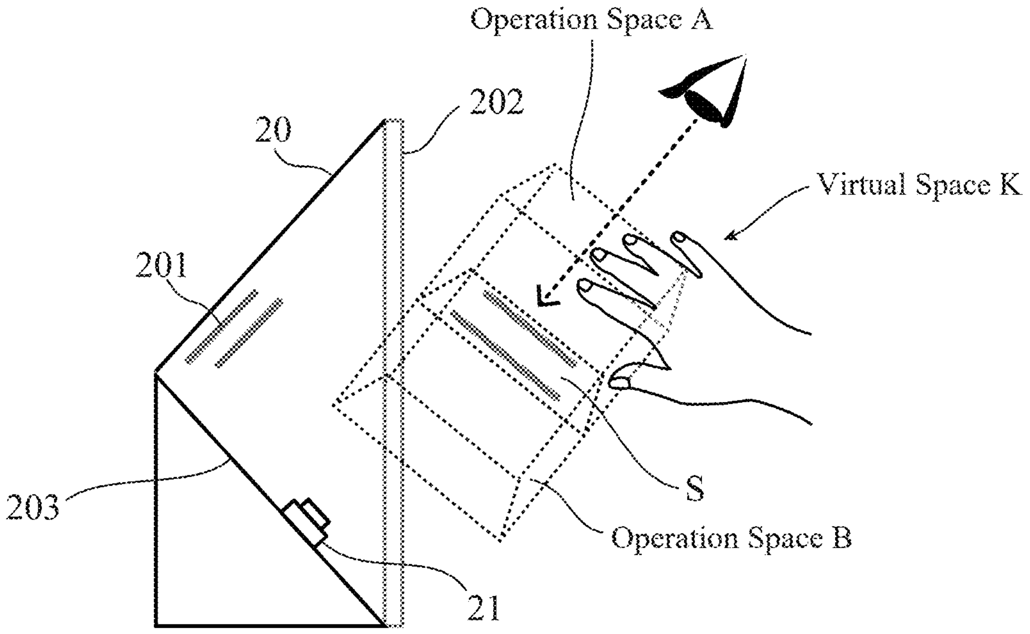
FIG. 1B is a side view illustrating the example configuration of the interface system according to the first embodiment.

FIGS. 1A and 1B are diagrams illustrating an example configuration of an interface system 100 according to a first embodiment. As illustrated in FIGS. 1A and 1B, for example, the interface system 100 includes a display apparatus 1 and an interface device 2. Note that FIG. 1A is a perspective view illustrating an example configuration of the interface system 100, and FIG. 1B is a side view illustrating an example configuration of the interface device 2.

<Display Apparatus 1>

As illustrated in FIG. 1A, for example, the display apparatus 1 includes a display 10 and a display control device 11.

Under the control of the display control device 11, for example, the display 10 displays various screens including a predetermined operation screen R on which a pointer P that can be operated by the user is displayed. The display 10 includes a liquid crystal display, a plasma display, or the like, for example.

The display control device 11 performs control for displaying various screens on the display 10, for example. The display control device 11 includes a personal computer (PC), a server, or the like, for example.

In the first embodiment, the user performs various operations on the display apparatus 1, using the interface device 2 to be described later. For example, the user handles the pointer P on an operation screen displayed on the display 10, or executes various commands on the display apparatus 1, using the interface device 2 to be described later.

<Interface Device 2>

The interface device 2 is a noncontact device through which the user can input an operation on the display apparatus 1 without direct contact. As illustrated in FIGS. 1A and 1B, for example, the interface device 2 includes a projection device 20 and a detection device 21 disposed inside the projection device 20.

<Projection Device 20>

The projection device 20 projects one or more aerial images S onto a virtual space K, using an imaging optical system, for example. The imaging optical system is an optical system that has a light beam bending plane forming one plane in which the optical path of light emitted from a light source is bent, for example.

As illustrated in FIG. 1B, for example, the virtual space K is a space that has no physical entity and is set in the region detectable by the detection device 21, and is a space divided into a plurality of operation spaces. Note that FIG. 1B illustrates an example in which the virtual space K is set to have a posture in the direction of detection to be performed by the detection device 21, but the virtual space K is not limited to this and may be set to have any appropriate posture.

Note that, in the description below, for ease of explanation, a case where the virtual space K is divided into two operation spaces (an operation space A and an operation space B) will be described as an example. At this point, in the first embodiment, a boundary position between the operation space A and the operation space B constituting the virtual space K is indicated by the aerial image S projected by the projection device 20, as illustrated in FIG. 1B, for example.

Figure 2A:
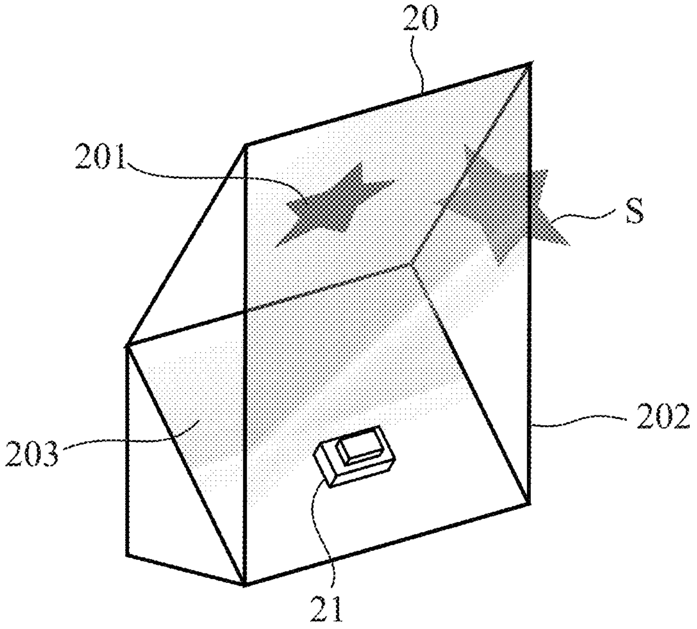
FIG. 2A is a perspective view illustrating an example configuration of a projection device according to the first embodiment.
Figure 2B:
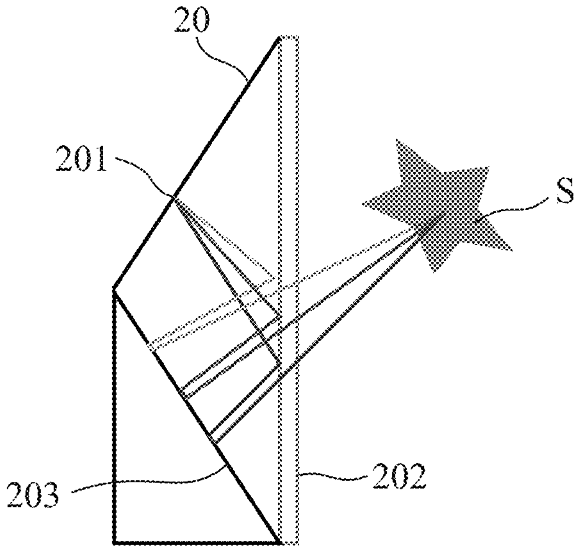
FIG. 2B is a side view illustrating the example configuration of the projection device according to the first embodiment.

Next, a specific example of the configuration of the projection device 20 is described with reference to FIGS. 2A and 2B. FIGS. 2A and 2B illustrate an example case where the imaging optical system mounted on the projection device 20 includes a beam splitter 202 and a retroreflective member 203. Note that reference numeral 201 indicates the light source. FIG. 2A is a perspective view illustrating an example configuration of the projection device 20, and FIG. 2B is a side view illustrating the example configuration of the projection device 20. Note that, in FIG. 2B, the detection device 21 is not shown.

The light source 201 includes a display device that emits incoherent diffused light. The light source 201 includes a display device including a liquid crystal element such as a liquid crystal display and a backlight, a display device that is a self-luminous device using an organic EL element and an LED element, a projection device using a projector and a screen, or the like.

The beam splitter 202 is an optical element that separates incident light into transmitted light and reflected light, and an element plane thereof functions as the above-described light beam bending plane. The beam splitter 202 includes an acrylic plate and a glass plate, for example. In a case where the beam splitter 202 includes an acrylic plate, a glass plate, and the like, the intensity of the transmitted light is normally higher than that of reflected light. Accordingly, the beam splitter 202 may include a semi-reflective mirror in which metal is added to the acrylic plate, the glass plate, and the like to increase reflection intensity.

Also, the beam splitter 202 may be formed with a reflective polarizing plate whose reflecting behavior and transmitting behavior change depending on the state of polarization caused in incident light by a liquid crystal element and a thin-film element. Alternatively, the beam splitter 202 may be formed with a reflective polarizing plate in which the ratio between transmittance and reflectance changes depending on the state of polarization caused in incident light by a liquid crystal element and a thin-film element.

The retroreflective member 203 is a sheet-like optical element having retroreflective properties for directly reflecting incident light in the incident direction. Examples of optical elements that realizes retroreflection include a bead-type optical element in which small glass beads are spread in the form of a mirror surface, a minute triangular pyramid having a protruding shape in which each surface is a mirror surface, and a microprism-type optical element in which shapes obtained by cutting off the central portions of triangular pyramids are spread.

In the projection device 20 including the imaging optical system designed as described above, light (diffused light) emitted from the light source 201 is specularly reflected by a surface of the beam splitter 202, and the reflected light enters the retroreflective member 203, for example. The retroreflective member 203 retroreflects the incident light, and the light again enters the beam splitter 202. The light that has entered the beam splitter 202 passes through the beam splitter 202, and reaches the user. By travelling through the optical path, the light emitted from the light source 201 reconverges and rediffuses at a position plane-symmetrical with the light source 201, with the beam splitter 202 serving as the boundary. Thus, the user can perceive the aerial image S in the virtual space K.

Note that FIGS. 2A and 2B illustrate an example in which the aerial image S is projected in a star-like shape, but the shape of the aerial image S is not limited to this and may have any shape.

Further, although an example in which the imaging optical system included in the projection device 20 includes the beam splitter 202 and the retroreflective member 203 has been explained in the above description, the configuration of the imaging optical system is not limited to the above example.

For example, the imaging optical system may include a two-sided corner reflector array element. The two-sided corner reflector array element is an element formed by arranging a plurality of sets of two orthogonal mirror face elements (mirrors) on a flat plate (substrate), for example.

The two-sided corner reflector array element has a function of reflecting light entering from the light source 201 disposed on one surface side of the plate with one of the two mirror face elements, and further reflecting the reflected light with the other mirror face element to pass the light to the other surface side of the plate. When the light path is viewed from a side, the light entrance path and the light exit path are plane-symmetrical, with the plate being interposed in between. That is, the element plane of the two-sided corner reflector array element functions as the above-described light beam bending plane, and forms a real image by the light source 201 on one surface side of the plate as the aerial image S at a plane-symmetrical position on the other surface side.

In a case where the imaging optical system includes the two-sided corner reflector array element, the two-sided corner reflector array element is disposed at the position where the beam splitter 202 is disposed in a configuration in a case where the above-described retroreflective member 203 is used. Further, in this case, the retroreflective member 203 is omitted.

Alternatively, the imaging optical system may include a lens array element, for example. The lens array element is an element formed by arranging a plurality of lenses on a flat plate (substrate), for example. In this case, the element plane of the lens array element functions as the above-described light beam bending plane, and forms a real image by the light source 201 disposed on the one surface side of the plate as the aerial image S at a plane-symmetrical position on the other surface side. Note that, in this case, the distance from the light source 201 to the element plane is substantially proportional to the distance from the element plane to the aerial image S.

Alternatively, the imaging optical system may include a holographic element, for example. In this case, the element plane of the holographic element functions as the above-described light beam bending plane. As light emitted as reference light from the light source 201 is projected onto the holographic element, the holographic element outputs light in such a way as to reproduce the phase information about the light stored in the element. As a result, the holographic element forms a real image by the light source 201 disposed on one surface side of this element as the aerial image S at a plane-symmetrical position on the other surface side.

<Detection Device 21>

The detection device 21 detects a three-dimensional position of a detection target (a hand of the user, for example) that is present in the virtual space K, for example.

An example of a method for detecting a detection target with the detection device 21 is a method by which the detection target is irradiated with infrared rays, and the time of flight (ToF) and the infrared pattern are detected to calculate the position in the depth direction of the detection target present in the imaging angle of view of the detection device 21. In the first embodiment, the detection device 21 includes a three-dimensional camera sensor, or a two-dimensional camera sensor capable of sensing an infrared wavelength, for example. In this case, the detection device 21 can calculate the position in the depth direction of a detection target present in the imaging angle of view, and detect the three-dimensional position of the detection target.

Other than the above, the detection device 21 may include a device that detects a one-dimensional position in a depth direction, such as a line sensor. Note that, in a case where the detection device 21 includes a line sensor, a plurality of line sensors is disposed depending on the detection region, so that the three-dimensional position of a detection target can be detected. Note that an example in which the detection device 21 includes the line sensor will be described in detail in the fourth embodiment.

Alternatively, the detection device 21 may include a stereo camera device including a plurality of cameras, for example. In this case, the detection device 21 performs triangulation from the feature points detected in the imaging angle of view, and detects the three-dimensional position of the detection target.

<Virtual Space K>

Next, a specific example of the configuration of the virtual space K is described with reference to FIG. 3.

As described above, the virtual space K is a space having no physical entity set in the region detectable by the detection device 21, and is a space divided into the operation space A and the operation space B. As illustrated in FIG. 3, for example, the virtual space K is a space that is set in a rectangular parallelepiped shape as a whole, and is divided into two operation spaces (the operation space A and the operation space B). Note that, in the description below, the operation space A will be also referred to as the "first operation space", and the operation space B will be also referred to as the "second operation space".

In this case, the aerial image S projected onto the virtual space K by the projection device 20 indicates the boundary position between the operation space A and the operation space B, which are the two operation spaces. In FIG. 3, two aerial images S are projected. These aerial images S are projected onto a closed plane separating the operation space A and the operation space B from each other (this plane will be hereinafter also referred to particularly as the "boundary plane"). Note that, although FIG. 3 illustrates an example in which two aerial images S are projected, the number of aerial images S is not limited to this, and may be one or may be three or larger. Further, for easier understanding of explanation herein, the lateral direction of the boundary plane is defined as the X-axis direction, the longitudinal direction thereof is defined as the Y-axis direction, and the direction orthogonal to the X-axis direction and the Y-axis direction is defined as the Z-axis direction, as illustrated in FIG. 3.

Furthermore, as for the operation space A and the operation space B, an operation that can be performed by the user in a case where the three-dimensional position of a detection target detected by the detection device 21 is included is associated with each operation space. Note that, in the description below, for easier understanding of explanation, a case where the detection target to be detected by the detection device 21 is a hand of the user will be described as an example. In this case, the detection device 21 detects the three-dimensional position of the hand of the user in the virtual space K, or, in particular, the three-dimensional positions of the five fingers of the hand of the user in the virtual space K.

For example, the operation space A is associated with an operation of the pointer P as an operation that can be performed by the user. Specifically, in a case where the user has put his or her hand into the operation space A, which is a case where the three-dimensional positions of the five fingers of the user's hand detected by the detection device 21 are all included in the operation space A, for example, when the user moves the hand in the operation space A, the user can move the pointer P displayed on the operation screen R of the display 10 in conjunction with the movement (the left side in FIG. 3). Note that, although the pointer P is shown as a conceptual view on the operation space A on the left side in FIG. 3, the pointer P displayed on the operation screen R of the display 10 actually moves.

Note that, in the description below, "the three-dimensional position of the user's hand is included in the operation space A" means that "the three-dimensional positions of the five fingers of the user's hand are all included in the operation space A". Also, in the description below, "the user operates the operation space A" means "the user moves his or her hand while the three-dimensional position of the user's hand is included in the operation space A".

Figure 3:
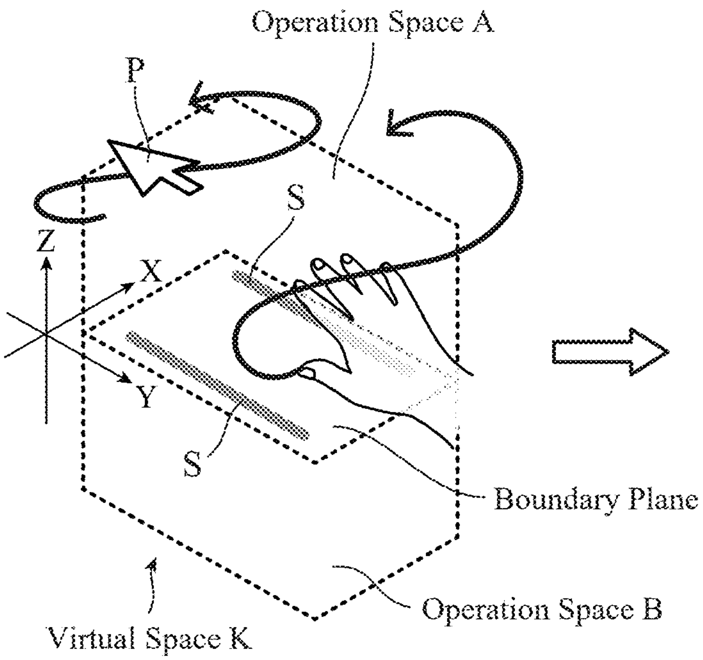
FIG. 3 is a diagram illustrating an example of a basic operation of the interface system according to the first embodiment.

Further, in a case where the user puts his or her hand from the operation space A into the operation space B across the boundary position (boundary plane), which is a case where the three-dimensional positions of the five fingers of the user's hand detected by the detection device 21 are all included in the operation space B, movement of the pointer P displayed on the operation screen R is fixed on the display 10 (the right side in FIG. 3). Note that, on the right side in FIG. 3, fixing the movement of the pointer P is indicated by square brackets displayed at the four corners of the pointer P.

At this point of time, even if the user moves the hand in the operation space B, the pointer P would not move. On the other hand, when the user moves the hand in a predetermined pattern in the operation space B, the user can execute a command (such as a left click or a right click) corresponding to this movement (a gesture). That is, the operation space B is associated with inputting (execution) of a command as an operation that can be performed by the user.

Note that, in the description below, "the three-dimensional position of the user's hand is included in the operation space B" means that "the three-dimensional positions of the five fingers of the user's hand are all included in the operation space B". Also, in the description below, "the user operates the operation space B" means "the user moves his or her hand while the three-dimensional position of the user's hand is included in the operation space B".

In this manner, the user can operate the operation space A to move the pointer P displayed on the operation screen R of the display 10, and subsequently operate the operation space B to execute a command corresponding to movement of the hand. In other words, the adjacent operation spaces A and B are associated with operations to be performed by the user, or, in particular, operations having continuity. Here, "operations having continuity" refers to operations that are normally performed successively in terms of time, such as operations to be performed by the user moving the pointer P displayed on the operation screen R of the display 10 and then executing a predetermined command.

Note that, of the operation spaces, all the adjacent spaces may be associated with operations having continuity, or some of the adjacent operation spaces may be associated with operations having continuity. That is, the other adjacent operation spaces may be associated with operations having no continuity.

Further, the two aerial images S illustrated in FIG. 3 are projected onto the closed plane (boundary plane) separating the adjacent operation space A and operation space B from each other. That is, these aerial images S indicate adjacent boundaries between the two adjacent operation spaces.

Note that the region of the operation space A is the region from the position of the boundary plane onto which the aerial images S are projected, to the upper limit position in the region detectable by the detection device 21, in the Z-axis direction in FIG. 3, for example. Also, the region of the operation space B is the region from the position of the boundary plane onto which the aerial images S are projected, to the lower limit position in the region detectable by the detection device 21, in the Z-axis direction in FIG. 3, for example.

Note that, on the right side in FIG. 3, an aerial image SC is an aerial image projected by the projection device 20 when the user puts his or her hand from the operation space A into the operation space B across the boundary position (boundary plane). The aerial image SC is an aerial image that indicates the lower limit position in the region detectable by the detection device 21, and indicates the reference position for separating the operation space B into right and left spaces as viewed from the user side. The aerial image SC is projected by the projection device 20 in the vicinity of the lower limit position in the region detectable by the detection device 21, and in the vicinity of the substantial center of the operation space B in the X-axis direction. While the aerial images S are present on the plane (boundary plane) whose coordinate position in the Z-axis direction is 0, the aerial image SC is present in a region whose coordinate position in the Z-axis direction is negative. Thus, the user can easily grasp how much he or she can lower his or her hand in the operation space B, and execute commands that require left and right designations such as a left click and a right click. A method for inputting commands such as a left click and a right click will be described later.

Figure 4:
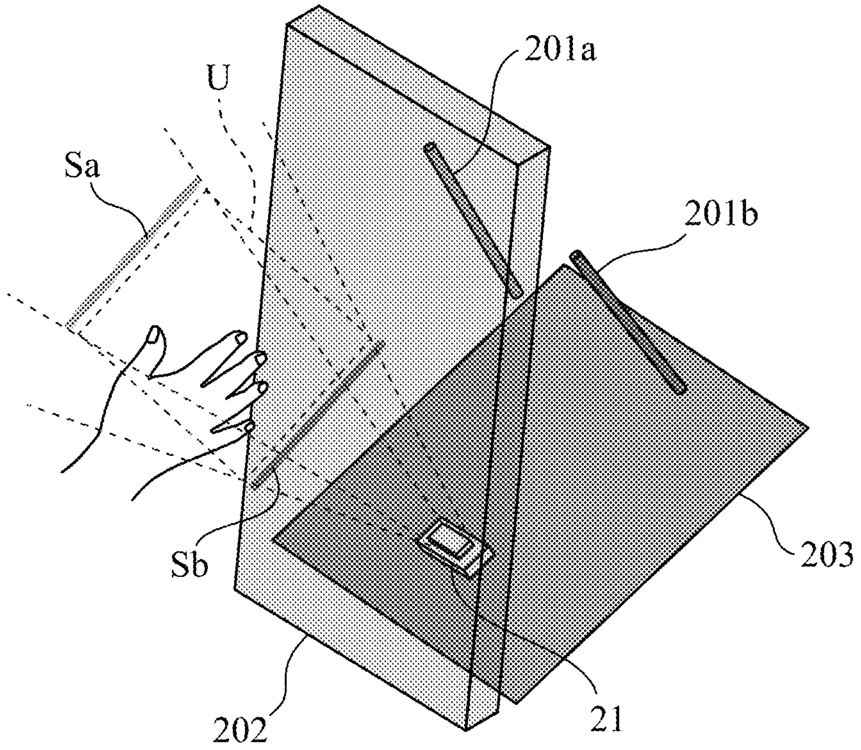
FIG. 4 is a perspective view illustrating an example layout of the projection device and a detection device in an interface device according to the first embodiment.
Figure 5:
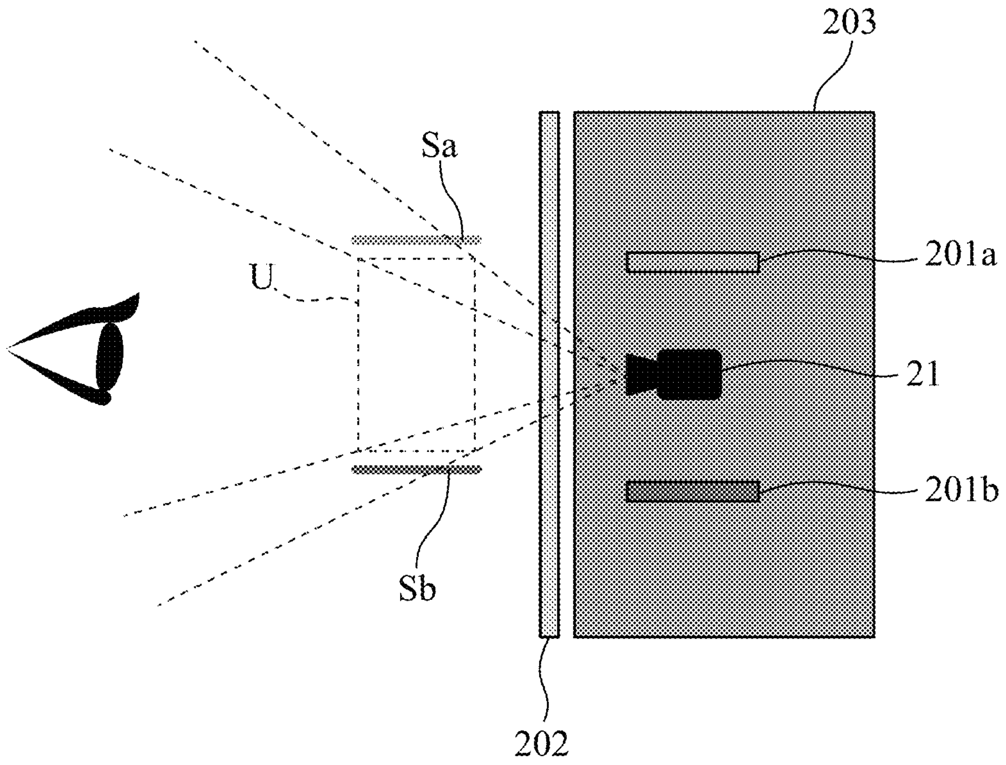
FIG. 5 is a top view illustrating an example layout of the projection device and the detection device in the interface device according to the first embodiment.

Next, an example layout of the projection device 20 and the detection device 21 in the interface device 2 is described with reference to FIGS. 4 and 5. FIG. 4 is a perspective view illustrating an example layout of the projection device 20 and the detection device 21 in the interface device 2, and FIG. 5 is a top view illustrating the example layout of the projection device 20 and the detection device 21 in the interface device 2.

Note that, in the description below, for easier understanding of explanation, a case where the imaging optical system included in the projection device 20 includes the beam splitter 202 and the retroreflective member 203 illustrated in FIGS. 2A and 2B is described as an example.

Also, in the example case described below, the projection device 20 includes two bar (rod)-like light sources 201*a* and 201*b*, and light emitted from the two light sources 201*a* and 201*b* is reconverged and rediffused at positions plane-symmetrical with the respective light sources 201*a* and 201*b* with the beam splitter 202 serving as the boundary, so that two aerial images Sa and Sb formed with linear figures (straight lines) are projected onto the virtual space K.

Further, in the example case described below, the detection device 21 includes a camera device capable of detecting the three-dimensional position of a hand of the user by emitting infrared light as detection light and receiving infrared light reflected by the hand of the user as the detection target.

As illustrated in FIGS. 4 and 5, the detection device 21 is disposed inside the projection device 20. More specifically, the detection device 21 is disposed inside the imaging optical system included in the projection device 20, or, in particular, on the inner side of the beam splitter 202 forming the imaging optical system.

Also, at this point, the imaging angle of view of the detection device 21 (hereinafter, this angle of view will be also referred to simply as the "angle of view") is set within a region in which the aerial images Sa and Sb projected by the projection device 20 do not appear. Note that, in FIGS. 4 and 5, the angle of view of the detection device 21 is set in such a way as to fall within an internal region U defined by the two aerial images Sa and Sb, which is a region in which the aerial images Sa and Sb projected by the projection device 20 do not appear. In other words, the projection device 20 forms the aerial images Sa and Sb on the virtual space K in such a manner that the aerial images Sa and Sb include the angle of view of the detection device 21. Further, when this point is viewed from the sides of the aerial images Sa and Sb, the aerial images Sa and Sb are formed at positions at which the decrease in the accuracy of detection of the three-dimensional position of the hand (detection target) of the user by the detection device 21 is reduced.

Here, "the internal region defined by the two aerial images Sa and Sb" refers to a rectangular region drawn on the boundary plane by the connecting lines and the two aerial images Sa and Sb, when ends of the aerial images Sa and Sb facing each other are connected, and the other ends of the aerial images Sa and Sb facing each other are connected on the boundary plane onto which the two aerial images Sa and Sb are projected.

Note that, although a case where two aerial images are projected has been described as an example, the same applies in a case where three or more aerial images formed with linear figures (straight lines) are projected. For example, "the internal region defined by three aerial images Sa, Sb, and Sc" refers to the region drawn on the boundary plane by the connecting lines and the three aerial images Sa, Sb, and Sc when the ends of the adjacent aerial images Sa, Sb, and Se are connected to one another on the boundary plane onto which the three aerial images Sa, Sb, and Sc are projected. Also, the projection device 20 forms the three aerial images on the virtual space K in such a manner that the three aerial images include the angle of view of the detection device 21. Further, when this point is viewed from the sides of the aerial images, the three aerial images are formed at positions at which the decrease in the accuracy of detection of the three-dimensional position of the hand (detection target) of the user by the detection device 21 is reduced.

Further, in a case where the aerial image S is formed not with a linear figure (straight lines) but with a figure having a closed region such as one frame-like figure or one circular figure, "the internal region defined by the aerial image S" refers to a closed region such as the region surrounded by the frame line of the frame-like figure or the region surrounded by the circumference of the circular figure, for example. Also, the projection device 20 forms the aerial image on the virtual space K in such a manner that the closed region of the aerial image formed with a figure having a closed region includes the angle of view of the detection device 21. Further, when this point is viewed from the aerial image, the aerial image is formed at a position at which the decrease in the accuracy of detection of the three-dimensional position of the hand (detection target) of the user by the detection device 21 is reduced.

As described above, the detection device 21 is disposed inside the imaging optical system included in the projection device 20, or, in particular, on the inner side of the beam splitter 202 forming the imaging optical system. Thus, while the detection device 21 requiring a predetermined detection distance to the hand of the user as the detection target ensures the predetermined detection distance, the projection device 20 including the structure of the imaging optical system can be made smaller in size.

Also, as the detection device 21 is disposed specifically on the inner side of the beam splitter 202 forming the imaging optical system, the accuracy of detection of the hand of the user by the detection device 21 is stabilized.

For example, in a case where the detection device 21 is exposed to the outside of the projection device 20, there is a possibility that the accuracy of detection of the three-dimensional position of the user's hand will drop due to external factors such as dust, dirt, and moisture. Also, in a case where the detection device 21 is exposed to the outside of the projection device 20, there is a possibility that external light such as sunlight or illumination light will enter the sensor unit of the detection device 21, and this external light will turn into noise when the three-dimensional position of the user's hand is detected.

In this aspect, the detection device 21 is disposed on the inner side of the beam splitter 202 forming the imaging optical system in the first embodiment, and thus, it is possible to reduce the decrease to be caused in the accuracy of detection of the three-dimensional position of the user's hand by external factors such as dust, dirt, and moisture. Also, by adding an optical material such as a phase polarizing plate that absorbs light other than infrared light emitted by the detection device 21 and light emitted from the light sources 201*a* and 201*b* to the surface (the surface facing the user side) of the beam splitter 202, for example, it is possible to reduce the decrease to be caused in the accuracy of detection by external light such as sunlight or illumination light.

Also, in a case where a phase polarizing plate is added to the surface (the surface facing the user side) of the beam splitter 202 as described above, this phase polarizing plate makes it difficult for the detection device 21 to be visually recognized from the outside of the projection device 20 in the interface device 2. Therefore, the interface device 2 does not give the user an impression as if imaging were being performed by the camera, and an effect in terms of design can also be expected.

Further, in the interface device 2, the angle of view of the detection device 21 is set to a region in which the aerial images Sa and Sb projected by the projection device 20 do not appear. Note that, in FIGS. 4 and 5, the angle of view of the detection device 21 is set in such a way as to fall within the internal region U defined by the two aerial images Sa and Sb, which is a region in which the aerial images Sa and Sb projected by the projection device 20 do not appear, as described above. Thus, in the interface device 2, the decrease in the resolution of the aerial images Sa and Sb is reduced. This point will be described below in detail.

For example, WO 2018/78777 A discloses an aerial video display system (hereinafter also referred to as the "conventional system") having a configuration similar to that of the interface device 2 according to the first embodiment.

This aerial video display system includes: a video display device that displays a video image on a screen; an image forming member that turns video light including the displayed video image into a real image in the air; a wavelength selecting reflective member that is disposed on the video light incident surface side of the image forming member, and characteristically transmits visible light while reflecting invisible light; and an imager that receives invisible light reflected by a detection target performing an input operation on the real image, and captures a detection target image formed with an invisible light image.

Further, the video display device includes: an input operation determining unit that acquires the detection target image from the imager, and analyzes the detection target image to analyze the contents of the input operation performed by the detection target; a main control unit that outputs an operation control signal based on the contents of the input operation analyzed by the input operation determining unit; and a video generating unit that generates a video signal reflecting the contents of the input operation in accordance with the operation control signal, and outputs the video signal to a video display. The wavelength selecting reflective member is disposed at a position where the real image falls within the viewing angle of the imager.

Figure 10:
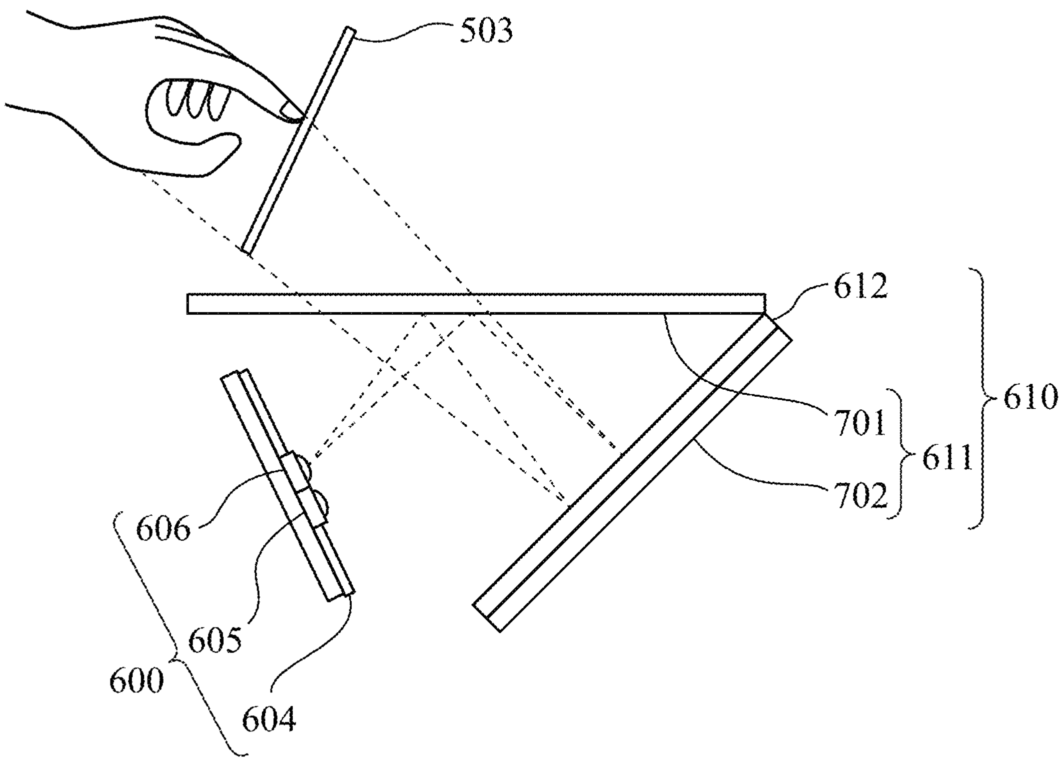
FIG. 10 is a diagram illustrating an example configuration of a conventional aerial video display system.

FIG. 10 illustrates an example configuration of the aerial video display system designed as described above. In FIG. 10, reference numeral 600 indicates the video display device, reference numeral 604 indicates the video display, reference numeral 605 indicates a light emitter, and reference numeral 606 indicates the imager. Further, reference numeral 610 indicates a wavelength-selective imaging device, reference numeral 611 indicates the image forming member, and reference numeral 612 indicates the wavelength selecting reflective member. Further, reference numeral 701 indicates a semi-reflective mirror, and reference numeral 702 indicates a retroreflective sheet. Furthermore, reference numeral 503 indicates the real image.

In the conventional system illustrated in FIG. 10, the video display device 600 includes the light emitter 605 that emits infrared light for detecting the three-dimensional positions of the fingers of the user's hand, and the imager 606 including a visible light camera, in addition to the display device 604 that emits video light for forming the real image 503 to be visually recognized by the user. Also, in the conventional system illustrated in FIG. 10, the wavelength selecting reflective member 612 that reflects infrared light is added to the surface of the retroreflective sheet 702, so that infrared light emitted from the light emitter 605 can be reflected by the wavelength selecting reflective member 612 and be transmitted to the position of the user's hand, and part of the infrared light diffused at the user's fingers or the like can be reflected by the wavelength selecting reflective member 612 and enter the imager 606. Thus, the position of the user or the like can be detected.

In the conventional system designed as described above, however, the user touches and operates the real image 503. In other words, the position of the hand of the user whose position is to be detected and the position of the real image (aerial image) 503 are in a correspondence relationship. Therefore, the wavelength selecting reflective member 612 that reflects infrared light needs to be disposed in the optical path of the video light starting from the display device 604 that emits the video light for forming the real image 503. That is, in the conventional system, it is necessary to replace part of the video light emitted from the display device 604 with infrared light, and, as a result, the resolution of the real image 503 might become lower.

Furthermore, the wavelength selecting reflective member 612 added to the surface of the retroreflective sheet 702 also affects the optical path for forming the real image 503, there is a possibility that the luminance and resolution of the real image 503 will be lowered.

In the interface device 2 according to the first embodiment, on the other hand, the aerial image S is used as a guide indicating the boundary position between the operation space A and the operation space B that constitute the virtual space K. Accordingly, the user does not necessarily have to touch the aerial image S, and the detection device 21 does not need to detect the three-dimensional position of the hand of the user touching the aerial image S.

Therefore, in the interface device 2 according to the first embodiment, the angle of view of the detection device 21 is set to fall within the internal region U defined by the two aerial images Sa and Sb, which is a region in which the aerial images Sa and Sb projected by the projection device 20 do not appear, for example, and it is only required to detect the three-dimensional position of the hand of the user in the internal region U. As described above, in the interface device 2 according to the first embodiment, the angle of view of the detection device 21 is set in a region in which the aerial images Sa and Sb projected by the projection device 20 do not appear. Accordingly, the optical path of the infrared light emitted from the detection device 21 does not obstruct the optical path for forming the aerial image S as in the conventional system. Thus, in the interface device 2 according to the first embodiment, the decrease in the resolution of the aerial image S is reduced.

Also, in the interface device 2 according to the first embodiment, the angle of view of the detection device 21 is only required to be set in a region in which the aerial images Sa and Sb projected by the projection device 20 do not appear. Accordingly, at the time of placement of the detection device 21, there is no need to take into consideration the position relationship with the other members constituting the imaging optical system as in the conventional system. Thus, in the interface device 2 according to the first embodiment, the detection device 21 can be disposed at a position close to the other members constituting the imaging optical system, and, as a result, the entire interface device 2 can be made smaller in size.

Also, in the interface device 2, the projection device 20 forms the aerial images Sa and Sb on the virtual space K in such a manner that the aerial images Sa and Sb include the angle of view of the detection device 21. That is, the aerial images Sa and Sb are formed at positions where the decrease in the accuracy of detection of the three-dimensional position of the hand (detection target) of the user by the detection device 21 is reduced. More specifically, the aerial images Sa and Sb are formed at least outside the angle of view of the detection device 21, for example. Thus, in the interface device 2, the aerial images Sa and Sb projected onto the virtual space K do not hinder the detection device 21 from detecting the three-dimensional position of the hand of the user. Accordingly, in the interface device 2, the decrease to be caused in the accuracy of detection of the three-dimensional position of the hand of the user by the aerial images Sa and Sb appearing in the angle of view of the detection device 21 is reduced.

Note that, although the detection device 21 is disposed inside (on the inner side of the beam splitter 202) the projection device 20 in the example described above, the detection device 21 is not necessarily disposed inside the projection device 20 as long as the angle of view is set in a region in which the aerial images Sa and Sb projected by the projection device 20 do not appear. Note that, in that case, the entire interface device 2 including the projection device 20 and the detection device 21 might become larger in size. Therefore, it is desirable to dispose the detection device 21 inside the projection device 20, and set the angle of view in a range in which the aerial images Sa and Sb projected by the projection device 20 do not appear, as described above.

Further, in the example case described above, the imaging optical system included in the projection device 20 includes the beam splitter 202 and the retroreflective member 203, and the detection device 21 is disposed on the inner side of the beam splitter 202 forming the imaging optical system. However, the imaging optical system may have a configuration different from the above. In that case, the detection device 21 is only required to be disposed on the inner side of the above-described light beam bending plane included in the imaging optical system. The inner side of the light beam bending plane is one surface side of the light beam bending plane, and is the side on which the light source is disposed with respect to the light beam bending plane.

For example, in a case where the imaging optical system includes a two-sided corner reflector array element, the element plane of the two-sided corner reflector array element functions as the above-described light beam bending plane, and accordingly, the detection device 21 is only required to be disposed on the inner side of the element plane of the two-sided corner reflector array element.

Further, in a case where the imaging optical system includes a lens array element, for example, the element plane of the lens array element functions as the above-described light beam bending plane, and accordingly, the detection device 21 is only required to be disposed on the inner side of the element plane of the lens array element.

Note that, in the example described above, the angle of view of the detection unit 21 is set in a region in which the aerial images Sa and Sb indicating boundary positions between the operation space A and the operation space B in the virtual space K do not appear. However, in a case where an aerial image that does not indicate any of the boundary positions of the respective operation spaces in the virtual space K is projected onto the virtual space K, it is not always necessary to prevent this aerial image from appearing in the angle of view of the detection unit 21.

For example, in the operation space B, the aerial image SC indicating the lower limit position in the region detectable by the detection unit 21 is projected by the projection unit 20 in some cases (see FIG. 3). Note that this aerial image SC is projected in the vicinity of the center position in the X-axis direction in the operation space B and indicates the lower limit position, and may also serve as the reference for the left and right designations when the user moves his or her hand in the operation space B with the movement corresponding to a command that requires a left click, a right click, and the like. Not indicating any of the boundary positions of the respective operation spaces in the virtual space K, such an aerial image SC is not necessarily prevented from appearing within the angle of view of the detection device 21. That is, an aerial image that is not an aerial image indicating any of the boundary positions of the respective operation spaces in the virtual space K may be projected within the angle of view of the detection device 21.

Also, in the interface device 2, one or more aerial images are projected by the projection device 20 as described above. In this case, the one or more aerial images may present the outer frame or the outer surface of the virtual space K to the user.

For example, in the interface device 2, an aerial image indicating the boundary position of each operation space in the virtual space K, and an aerial image not indicating any of the boundary positions may be projected by the projection device 20. Among these images, the projection position of the former aerial image, which is the aerial images indicating the boundary position of each operation space in the virtual space K, is set to a position along the outer edge of the virtual space K, for example, so that the former aerial image can be an aerial image indicating the boundary position of each operation space in the virtual space K and indicating the outer frame or the outer surface of the virtual space K. In this case, by visually recognizing the aerial image, the user can easily grasp not only the boundary position of each operation space in the virtual space K but also the outer edge of the virtual space K.

As described above, according to the first embodiment, the interface device 2 includes the detection unit 21 that detects the three-dimensional position of the detection target in the virtual space K, and the projection unit 20 that projects the aerial image S onto the virtual space K. The virtual space K is divided into a plurality of operation spaces, in each of which an operation that can be performed by the user in a case where the three-dimensional position of the detection target detected by the detection unit 21 is included is defined, and the boundary position of each operation space in the virtual space K is indicated by the aerial images S projected by the projection unit 20. Thus, in the interface device 2 according to the first embodiment, it is possible to visually recognize the boundary positions of the plurality of operation spaces constituting the virtual space to be operated by the user.

Further, the projection unit 20 forms the aerial images Sa and Sb in the virtual space K in such a manner that the aerial images Sa and Sb include the angle of view of the detection unit 21. Thus, in the interface device 2 according to the first embodiment, the decrease in the accuracy of detection of the three-dimensional position of the detection target by the detection unit 21 is reduced.

Also, the projection unit 20 includes an imaging optical system that has a light beam bending plane forming one plane in which the optical path of light emitted from a light source is bent, and forms a real image by a light source disposed on one surface side of the light beam bending plane as the aerial images Sa and Sb on the opposite surface side of the light beam bending plane. Thus, in the interface device 2 according to the first embodiment, it is possible to project the aerial images Sa and Sb, using the imaging optical system.

Further, the imaging optical system includes the beam splitter 202 that has the light beam bending plane and divides light emitted from the light source 201 into transmitted light and reflected light, and the retroreflective member 203 that reflects the reflected light in the incident direction when the reflected light from the beam splitter 202 enters the retroreflective member 203. As a result, in the interface device 2 according to the first embodiment, it is possible to project the aerial images Sa and Sb, using retroreflection of light.

Also, the imaging optical system includes a two-sided corner reflector array element having the light beam bending plane. Thus, in the interface device 2 according to the first embodiment, it is possible to project the aerial images Sa and Sb, using specular reflection of light.

Further, the detection unit 21 is disposed in an internal region of the imaging optical system, and on one surface side of the light beam bending plane of the imaging optical system. Thus, the entire interface device 2 according to the first embodiment can be made smaller in size. It is also possible to reduce the decrease to be caused in the accuracy of detection of the three-dimensional position of the detection target by external factors such as dust, dirt, and moisture.

Further, the aerial images Sa and Sb projected onto the virtual space K are formed at positions where the decrease in the accuracy of detection of the three-dimensional position of the detection target by the detection unit 21 is reduced. Thus, in the interface device 2 according to the first embodiment, the decrease in the accuracy of detection of the three-dimensional position of the detection target by the detection unit 21 is reduced.

Furthermore, the angle of view of the detection unit 21 is set in a region in which the aerial images Sa and Sb projected by the projection unit 20 do not appear. As a result, in the interface device 2 according to the first embodiment, the decrease in the resolution of the aerial images Sa and Sb is reduced.

Further, one or more aerial images are projected onto the virtual space K, and the one or more aerial images present the outer frame or the outer surface of the virtual space K to the user. Thus, with the interface device 2 according to the first embodiment, the user can easily grasp the outer edge of the virtual space K.

Furthermore, at least one image among a plurality of projected aerial images is projected within the angle of view of the detection unit 21. Thus, in the interface device 2 according to the first embodiment, the degree of freedom of the projection position of an aerial image indicating the lower limit position in the region detectable by the detection unit 21 becomes higher, for example.

Second Embodiment

In the first embodiment, the interface device 2 that can reduce the decrease in the resolution of the aerial images Sa and Sb, and make the entire device smaller in size has been described. In a second embodiment, an interface device 2 that can reduce the decrease in the resolution of the aerial images Sa and Sb, and make the entire device even smaller in size is described.

Figure 6:
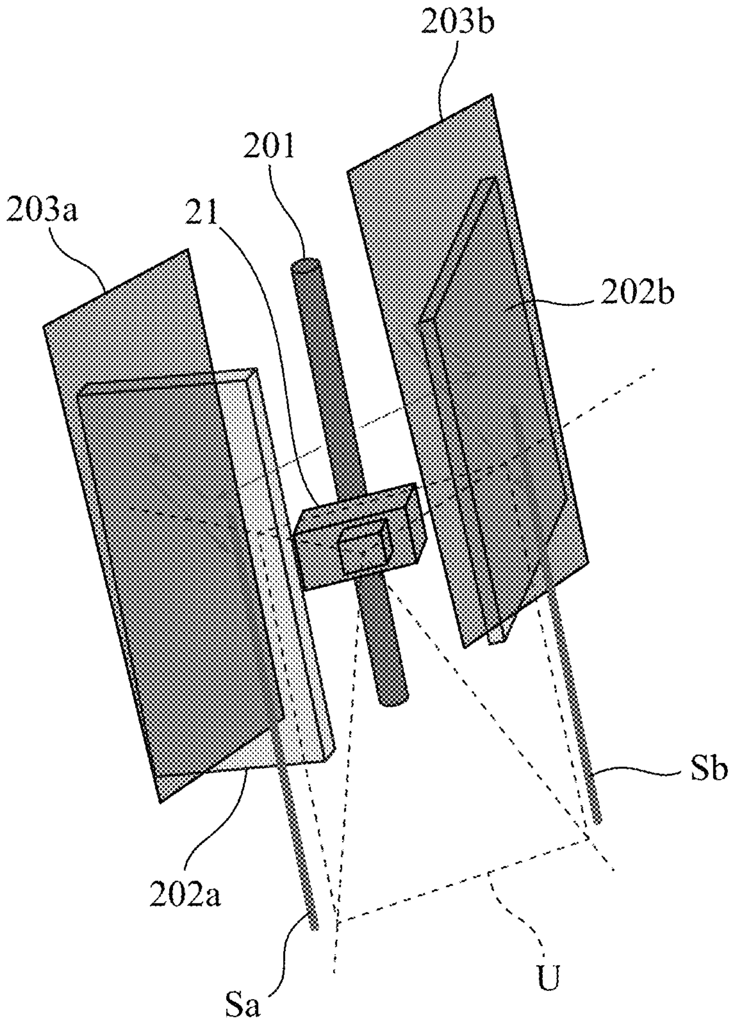
FIG. 6 is a perspective view illustrating an example layout of a projection device and a detection device in an interface device according to a second embodiment.
Figure 7:
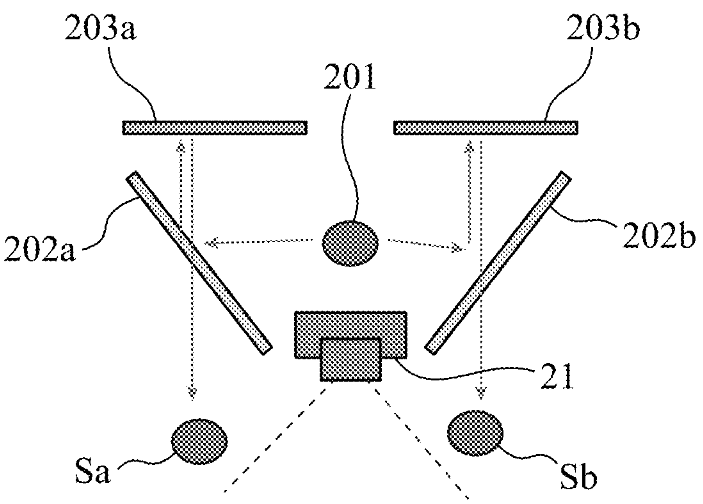
FIG. 7 is a top view illustrating an example layout of the projection device and the detection device in the interface device according to the second embodiment.

FIG. 6 is a perspective view illustrating an example layout of the projection device 20 and the detection device 21 in the interface device 2 according to the second embodiment. Further, FIG. 7 is a top view illustrating an example layout of the projection device 20 and the detection device 21 in the interface device 2 according to the second embodiment.

The interface device 2 according to the second embodiment differs from the interface device 2 according to the first embodiment illustrated in FIGS. 4 and 5, in that the beam splitter 202 is divided into two beam splitters **202*a* and 202*b*, and the retroreflective member 203 is divided into two retroreflective members 203*a* and 203*b***.

Further, an aerial image Sa is projected onto a virtual space K (a space on the front side of the paper plane of FIG. 6) by a first imaging optical system including the beam splitter **202*a* and the retroreflective member 203*a*, and an aerial image Sb is projected onto the virtual space K by a second imaging optical system including the beam splitter 202*b* and the retroreflective member 203*b*. That is, the two divided beam splitters and the two retroreflective members are in a correspondence relationship, the beam splitter 202*a* and the retroreflective member 203*a* correspond to each other, and the beam splitter 202*b* and the retroreflective member 203*b*** correspond to each other.

Note that the principles of projection (image formation) of aerial images by the first imaging optical system and the second imaging optical system are similar to those according to the first embodiment. For example, the retroreflective member **203*a* reflects reflected light from the corresponding beam splitter 202*a* in the incident direction, and the retroreflective member 203*b* reflects reflected light from the corresponding beam splitter 202*b*** in the incident direction.

Also, in the interface device 2 according to the second embodiment, the detection device 21 is disposed inside the projection device 20 as in the interface device 2 according to the first embodiment. More specifically, the detection device 21 is disposed inside the first imaging optical system and the second imaging optical system included in the projection device 20, or, in particular, in a region interposed between the light source 201 and the two beam splitters **202*a* and 202*b***.

Further, at this point of time, the angle of view of the detection device 21 is set within a region in which the aerial images Sa and Sb projected by the projection device 20 do not appear, as in the first embodiment. In particular, the angle of view is set within an internal region U defined by the two aerial images Sa and Sb.

As described above, in the interface device 2 according to the second embodiment, the two imaging optical systems including the divided beam splitters **202*a* and 202*b* and the retroreflective members 203*a* and 203*b*, respectively, are used, so that the size of the entire interface device 2 can be made even smaller than that in the first embodiment, while the aerial images Sa and Sb visible to the user are projected onto the virtual space K. Also, in this case, the detection device 21 is disposed inside these two imaging optical systems, so that downsizing of the entire interface device 2** is further promoted.

Further, in the interface device 2 according to the second embodiment, the angle of view of the detection device 21 is also set in a region in which the aerial images Sa and Sb projected by the projection device 20 do not appear. Thus, the decrease in the resolution of the aerial images Sa and Sb is reduced as in the interface device 2 according to the first embodiment.

Note that, in the example described above, one light source 201 is provided, and each of the beam splitter 202 and the retroreflective member 203 is divided into two. However, the interface device 2 is not limited to this, and the number of light sources 201 may be increased to two, and the individual light sources may be used by the first imaging optical system and the second imaging optical system. The number of increased light sources 201, and the number of divisions of the beam splitter 202 and the retroreflective member 203 are not limited to the above, and may be n (n being an integer of 2 or greater).

Also, in the example described above, an imaging optical system includes a beam splitter and a retroreflective member. However, an imaging optical system is not limited to this, and may include a two-sided corner reflector array element as described in the first embodiment, for example. In the interface device 2 in this case, the retroreflective members 203*a* and 203*b* are omitted in FIG. 6, and a two-sided corner reflector array element is only required to be disposed at each of the positions at which the beam splitters 202*a* and 202*b* are arranged.

Also, in the example described above, the beam splitter 202 and the retroreflective member 203 are each divided into two in one imaging optical system. However, the interface device 2 is not limited to this, and one or more imaging optical systems and two or more light sources 201 may be included, for example. In this case, the number of imaging optical systems and the number of light sources 201 are not necessarily the same, and each imaging optical system and each light source do not necessarily correspond to each other. Further, in this case, each of the two or more light sources 201 may form a real image as an aerial image with one or more imaging optical systems.

For example, in a case where one imaging optical system is provided, and two light sources 201 are provided (first and second light sources), the first light source may form a real image as an aerial image with the one imaging optical system, and the second light source may also form a real image as an aerial image with the one imaging optical system. Note that this configuration corresponds to the configuration illustrated in FIGS. 4 and 5.

Further, in a case where three imaging optical systems are provided (first to third imaging optical systems) and four light sources 201 are provided (first to fourth light sources), for example, the first light source may form a real image as an aerial image only with one of the imaging optical systems (with the first imaging optical system, for example), may form a real image as an aerial image with two of the imaging optical systems (with the first imaging optical system and the second imaging optical system, for example), or may form a real image as an aerial image with all the imaging optical systems (with the first to third imaging optical systems).

Likewise, the second light source may form a real image as the aerial image S only with one of the imaging optical systems (with the second imaging optical system, for example), may form a real image as the aerial image S with two of the imaging optical systems (with the second imaging optical system and the third imaging optical system, for example), or may form a real image as the aerial image S with all the imaging optical systems (the first to third imaging optical systems). The same applies to the third light source and the fourth light source. Thus, in the interface device 2, adjustment of the luminance of the aerial image S, the image forming position of the aerial image S, and the like becomes easier.

As described above, according to second embodiment, each of the beam splitter 202 and the retroreflective member 203 is divided into n parts (n being an integer of 2 or greater), the n beam splitters and the n retroreflective members correspond to each other on a one-to-one basis, and each of the n retroreflective members reflects reflected light from the corresponding beam splitter in the incident direction. Thus, in addition to achieving the effects of the first embodiment, the interface device 2 according to the second embodiment can further reduce the entire size of the interface device 2, compared with that of the first embodiment.

Further, the interface device 2 includes two or more light sources 201 and one or more imaging optical systems, and each light source forms a real image as an aerial image with one or more imaging optical systems. Thus, in addition to achieving the effects of the first embodiment, the interface device 2 according to the second embodiment can easily adjust the luminance of the aerial image, the imaging position, and the like.

Third Embodiment

In the first embodiment, the interface device 2 that can reduce the decrease in the resolution of the aerial images Sa and Sb, and make the entire device smaller in size has been described. In a third embodiment, an interface device 2 capable of extending a detection path from the detection device 21 to the detection target, as well as reducing the decrease in the resolution of the aerial images Sa and Sb and reducing the size of the entire device, is described.

Figure 8:
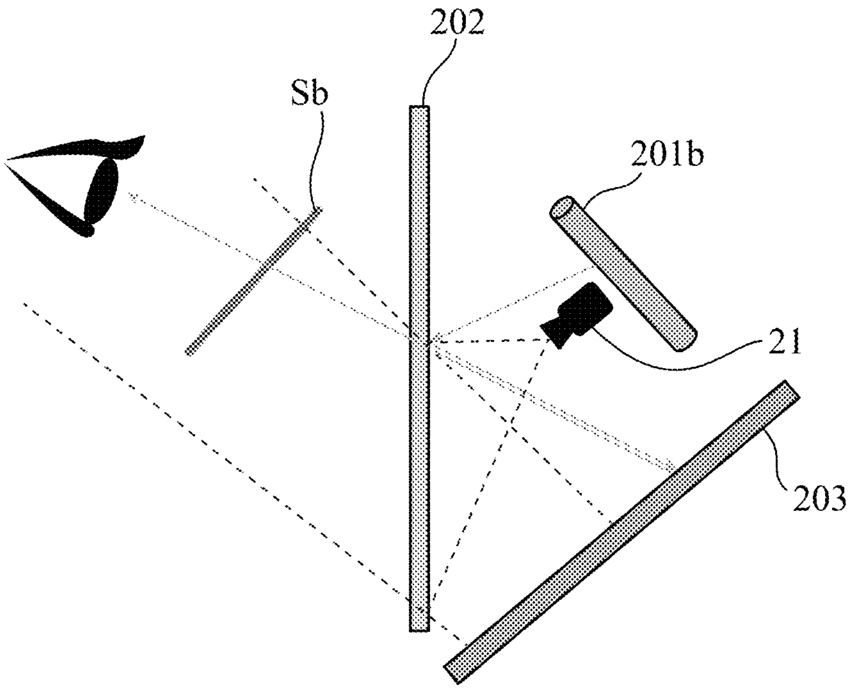
FIG. 8 is a side view illustrating an example layout of a projection device and a detection device in an interface device according to a third embodiment.

FIG. 8 is a side view illustrating an example layout of the projection device 20 and the detection device 21 in the interface device 2 according to the third embodiment. The interface device 2 according to the third embodiment differs from the interface device 2 according to the first embodiment illustrated in FIGS. 4 and 5, in that the position of the detection device 21 is changed to a position near the light sources 201*a* and 201*b*. More specifically, the position of the detection device 21 is changed to a position interposed between the light sources 201*a* and 201*b* in a top view and a position slightly closer to the front than the light sources 201*a* and 201*b* in a side view (closer to the beam splitter 202). Note that FIG. 8 illustrates a view of the interface device 2 according to the third embodiment as viewed from the side of the light source 201*b* and the aerial image Sb.

Further, the angle of view of the detection device 21 at this point of time is set to face substantially the same direction as the direction of emission of light to be emitted from the light sources 201*a* and 201*b* in the imaging optical system. Also, the angle of view of the detection device 21 at this point of time is set in a region in which the aerial images Sa and Sb projected by the projection device 20 do not appear, as in the first embodiment.

As described above, as the detection device 21 is disposed in the vicinity of the light sources 201*a* and 201*b*, and the angle of view of the detection device 21 is set to be substantially in the same direction as the direction of emission of light to be emitted from the light sources 201*a* and 201*b*, the infrared light emitted when the detection device 21 detects the three-dimensional position of the hand of the user goes through reflection by the beam splitter 202 and retroreflection by the retroreflective member 203, and passes through the beam splitter 202 to follow the path to the hand of the user at the transmission destination.

That is, the infrared light emitted from the detection device 21 follows substantially the same path as the light emitted from the light sources 201*a* and 201*b* when the imaging optical system forms the aerial images Sa and Sb. Thus, in the interface device 2 according to the third embodiment, it is possible to make the distance (detection distance) from the detection device 21 to the hand of the user as the detection target longer than that with the interface device 2 according to the first embodiment in which both light paths are different, while reducing the decrease in the resolution of the aerial image S and making the entire device smaller in size.

In particular, in a case where the detection device 21 includes a camera device capable of detecting the three-dimensional position of the user's hand, the minimum distance (shortest detectable distance) that needs to be maintained between the camera device and the detection target in order to perform appropriate detection is set in the camera device. In turn, to perform appropriate detection, the detection device 21 needs to ensure the shortest detectable distance. On the other hand, for the interface device 2, there is also a demand for reducing the size of the entire device.

In this aspect, in the interface device 2 according to the third embodiment, the position of the detection device 21 is set as described above. Thus, it is possible to extend the detection distance in the detection device 21 to ensure the shortest detectable distance, and reduce the decrease in detection accuracy, while achieving downsizing of the entire interface device 2.

As described above, according to the third embodiment, the detection unit 21 is disposed at a position and an angle of view at which the detection path for detecting the three-dimensional position of the detection target is substantially the same as the optical path of light from the light sources 201*a* and 201*b* in the imaging optical system to the aerial images Sa and Sb via the beam splitter 202 and the retroreflective member 203. Thus, in the interface device 2 according to the third embodiment, it is possible to ensure the shortest detectable distance for the detection device 21 and reduce the decrease in detection accuracy while reducing the size of the entire interface device 2, in addition to achieving the effects of the first embodiment.

Fourth Embodiment

In the first embodiment, an example in which the detection device 21 includes a camera device capable of detecting the three-dimensional position of the user's hand by emitting detection light (infrared light) has been described. In a fourth embodiment, an example in which the detection device 21 is formed with a device that detects a one-dimensional position in a depth direction is described.

Figure 9:
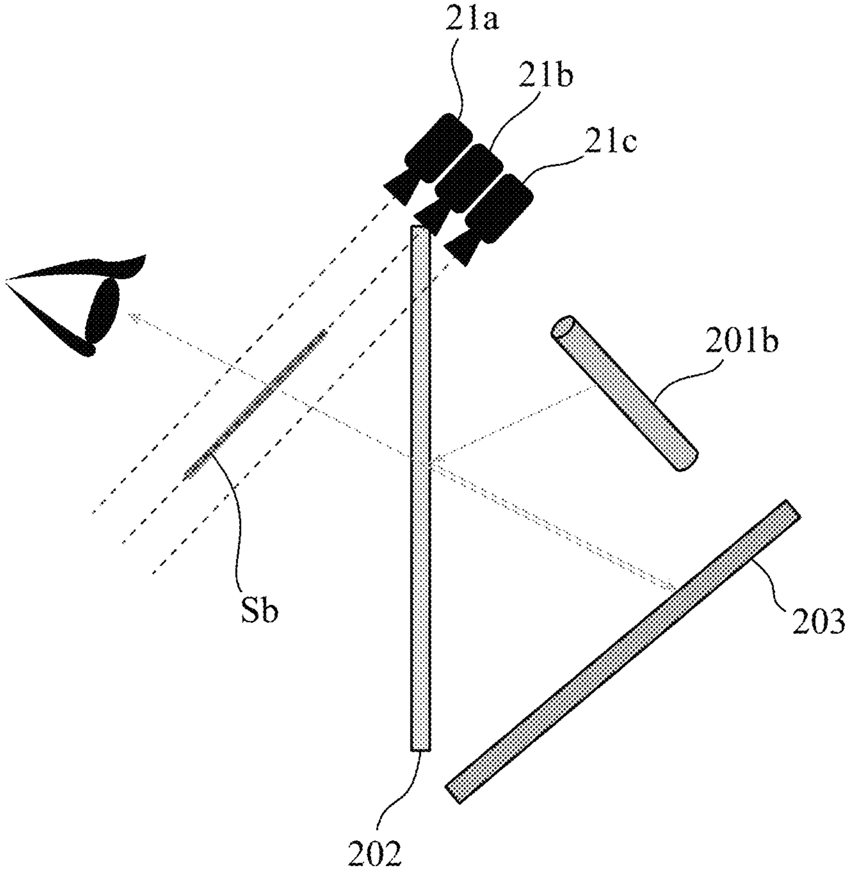
FIG. 9 is a side view illustrating an example layout of a projection device and a detection device in an interface device according to a fourth embodiment.

FIG. 9 is a side view illustrating an example layout of the projection device 20 and the detection device 21 in an interface device 2 according to the fourth embodiment. The interface device 2 according to the fourth embodiment differs from the interface device 2 according to the first embodiment illustrated in FIGS. 4 and 5, in that the detection device 21 is changed to detection devices 21*a*, 21*b*, and 21*c*, and these three detection devices 21*a*, 21*b*, and 21*c* are arranged at the upper end of the beam splitter 202.

The detection devices 21*a*, 21*b*, and 21*c* include line sensors that emit detection light (infrared light) to the user's hand as the detection target, to detect the one-dimensional position of the user's hand in the depth direction. Note that FIG. 9 illustrates the interface device 2 according to the fourth embodiment as viewed from the side of the light source 201*b* and the aerial image Sb.

Further, the angle of view of the detection device 21*b* at this point of time is set to face the direction in which the aerial images Sa and Sb are projected, and is set in such a manner that the plane (scan plane) formed by the detection light (infrared light) substantially overlaps the boundary plane onto which the aerial images Sa and Sb are projected. That is, the detection device 21*b* detects the position of the user's hand in a region near the boundary plane onto which the aerial images Sa and Sb are projected. Note that, the angle of view of the detection device 21*b* is set in a region in which the aerial images Sa and Sb do not appear, as in the interface device 2 according to the first embodiment.

Further, the detection device 21*a* is disposed at a higher position than the detection device 21*b*, the angle of view thereof is set to face the direction in which the aerial images Sa and Sb are projected, and the plane (scan plane) formed by the detection light is set to be substantially parallel to the boundary plane. That is, the detection device 21*a* has a detectable region that is a region in the scan plane in a space (operation space A) higher than the boundary plane, and detects the position of the user's hand in this region.

Further, the detection device 21*c* is disposed at a lower position than the detection device 21*b*, the angle of view thereof is set to face the direction in which the aerial images Sa and Sb are projected, and the plane (scan plane) formed by the detection light is set to be substantially parallel to the boundary plane. That is, the detection device 21*c* has a detectable region that is a region in the scan plane in a space (operation space B) lower than the boundary plane, and detects the position of the user's hand in this region. Note that the angles of view of the detection devices 21*a* and 21*c* are also set in a region in which the aerial images Sa and Sb do not appear, as in the interface device 2 according to the first embodiment.

As described above, in the interface device 2 according to the fourth embodiment, the detection devices 21*a*, 21*b*, and 21*c* formed with line sensors are used as the detection device 21, and the angles of view of the respective detection devices are set in such a manner that the planes (scan planes) formed by rays of detection light from the respective detection devices are parallel to one another, and the planes are arranged in a space in the vertical direction (front-rear direction) around the boundary plane. Thus, the interface device 2 according to the fourth embodiment can detect the three-dimensional position of the user's hand in the virtual space K, using the line sensors.

Further, the line sensors are smaller and are less expensive than a camera device capable of detecting the three-dimensional position of the user's hand as described in the first embodiment. Accordingly, with the use of the line sensors as the detection device 21, the size of the entire device can be made smaller than that of the interface device 2 according to the first embodiment, and the cost can be lowered.

Note that, although three detection devices formed with line sensors are used in the example described above, the number is not limited to this. Note that, as described above, to become able to detect the position of the user's hand in a space including planes in the vertical direction (front-rear direction) with the boundary plane serving as the center, at least three detection devices formed with line sensors are preferably provided.

As described above, according to the fourth embodiment, the detection unit 21 includes three or more line sensors that have detectable regions that include at least a region in the boundary plane that is the plane onto which the aerial images Sa and Sb are projected in the virtual space K, and regions in planes sandwiching the boundary plane in the virtual space K. Thus, in addition to achieving the effects of the first embodiment, the interface device 2 according to the fourth embodiment can make the entire device smaller in size than the interface device 2 according to the first embodiment, and can also lower the cost.

Fifth Embodiment

Figure 11:
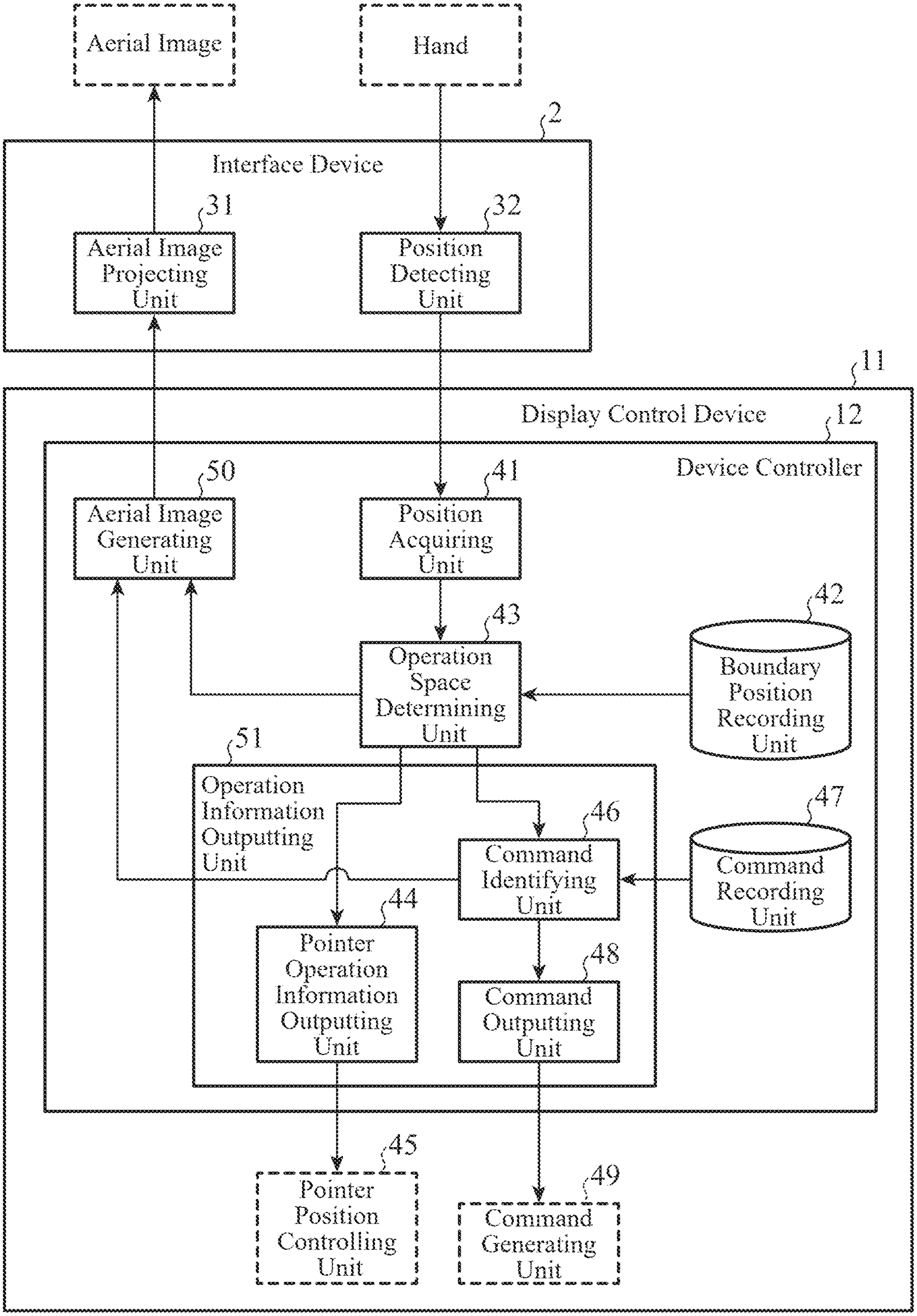
FIG. 11 is a diagram illustrating an example of functional blocks of an interface system according to a fifth embodiment.

Examples of the configuration of the interface device 2 included in the interface system 100 have been mainly described in the first to fourth embodiments. In a fifth embodiment, an example of functional blocks included in an interface system 100 is described. FIG. 11 shows an example of a functional block diagram of the interface system 100 according to the fifth embodiment.

As illustrated in FIG. 11, the interface system 100 includes an aerial image projecting unit 31, a position detecting unit 32, a position acquiring unit 41, a boundary position recording unit 42, an operation space determining unit 43, a pointer operation information outputting unit 44, a pointer position controlling unit 45, a command identifying unit 46, a command recording unit 47, a command outputting unit 48, a command generating unit 49, and an aerial image generating unit 50.

The aerial image projecting unit 31 acquires data indicating the aerial image S generated by the aerial image generating unit 50, and projects the aerial image S based on the acquired data onto the virtual space K. The aerial image projecting unit 31 includes the above-described projection device 20, for example. Note that the aerial image projecting unit 31 may acquire data indicating the above-described aerial image SC generated by the aerial image generating unit 50, and project the aerial image SC based on the acquired data onto the virtual space K.

The position detecting unit 32 detects the three-dimensional position of the detection target (the user's hand herein) in the virtual space K. The position detecting unit 32 includes the above-described detection device 21, for example. The position detecting unit 32 outputs a result of the detection of the three-dimensional position of the detection target (hereinafter also referred to as a "position detection result") to the position acquiring unit 41.

Also, the position detecting unit 32 may detect the three-dimensional position of the aerial image S projected onto the virtual space K, and record the data indicating the detected three-dimensional position of the aerial image S into the boundary position recording unit 42.

Note that, in a case where the aerial image projecting unit 31 includes the above-described projection device 20, and the position detecting unit 32 includes the above-described detection device 21, the functions of the aerial image projecting unit 31 and the position detecting unit 32 are implemented by the above-described interface device 2.

The position acquiring unit 41 acquires the position detection result output from the position detecting unit 32. The position acquiring unit 41 outputs the acquired position detection result to the operation space determining unit 43.

The boundary position recording unit 42 records data indicating the boundary position between the operation space A and the operation space B constituting the virtual space K, which is the three-dimensional position of the aerial image S. The boundary position recording unit 42 includes a hard disc drive (HDD), a solid-state drive (SSD), or the like, for example.

For example, in a case where the aerial image S is formed with a linear figure (straight lines) as illustrated in FIG. 3, the boundary position recording unit 42 records data indicating the three-dimensional position of at least one point among the points (pixels) of the aerial image S constituting the lines. For example, the boundary position recording unit 42 may record data indicating the three-dimensional positions of any three points among the points of the aerial image S constituting the lines, or may record data indicating the three-dimensional positions of all the points among the points of the aerial image S constituting the lines. Note that the aerial image S is projected onto the boundary plane illustrated in FIG. 3, and accordingly, all the coordinate positions of the respective points to be recorded by the boundary position recording unit 42 in the Z-axis direction are the same coordinate positions.

The operation space determining unit 43 acquires the position detection result output from the position acquiring unit 41. Also, the operation space determining unit 43 determines the operation space in which the user's hand is present, on the basis of the acquired position detection result and the boundary position of each operation space in the virtual space K. The operation space determining unit 43 outputs the result of the above determination (hereinafter also referred to as the "space determination result") to the aerial image generating unit 50. Further, the operation space determining unit 43 outputs the space determination result to an operation information outputting unit 51, as well as the position detection result acquired from the position acquiring unit 41.

The operation information outputting unit 51 outputs operation information for performing a predetermined operation on the display apparatus 1, using at least the space determination result from the operation space determining unit 43. The operation information outputting unit 51 includes the pointer operation information outputting unit 44, the command identifying unit 46, and the command outputting unit 48.

The pointer operation information outputting unit 44 acquires the space determination result and the position detection result, which have been output from the operation space determining unit 43. In a case where the acquired space determination result indicates that the user's hand is present in the operation space A, the pointer operation information outputting unit 44 generates information for moving the pointer P displayed on the operation screen R of the display 10 depending on the movement of the user's hand in the operation space A (the information will be hereinafter also referred to as the "movement control information"). Note that the "movement of the user's hand" includes information regarding movement such as the amount of movement of the user's hand. For example, the pointer operation information outputting unit 44 calculates the amount of movement of the user's hand, on the basis of the position detection result output from the operation space determining unit 43. The amount of movement of the user's hand includes information regarding the direction in which the user's hand has moved, and the distance over which the user's hand has moved in the direction.

On the basis of the calculated amount of movement, the pointer operation information outputting unit 44 then generates information (movement control information) for moving the pointer P displayed on the operation screen R of the display 10 depending on the movement of the user's hand in the operation space A. The pointer operation information outputting unit 44 outputs the operation information including the generated movement control information to the pointer position controlling unit 45.

Further, in a case where the acquired space determination result indicates that the user's hand is present in the operation space B, the pointer operation information outputting unit 44 generates information indicating that the pointer P displayed on the operation screen R of the display 10 is to be fixed (the information will be hereinafter also referred to as the "fixing control information"). The pointer operation information outputting unit 44 outputs the operation information including the generated fixing control information to the pointer position controlling unit 45.

Note that the pointer operation information outputting unit 44 may incorporate, into the operation information, information indicating that the amount of movement or the speed of movement of the pointer P displayed on the screen of the display apparatus 1 is variable, depending on the distance between the three-dimensional position of the user's hand included in the operation space A and the boundary plane of the virtual space K indicated by the aerial image S, which is the distance in a direction (the Z-axis direction in FIG. 3) orthogonal to the boundary plane, and then output the operation information.

The pointer position controlling unit 45 acquires the operation information output from the pointer operation information outputting unit 44. In a case where the movement control information is included in the operation information acquired from the pointer operation information outputting unit 44, the pointer position controlling unit 45 moves the pointer P on the operation screen R displayed on the display 10 depending on the movement of the user's hand, on the basis of the movement control information. For example, the pointer position controlling unit 45 moves the pointer P by the amount equivalent to the amount of movement of the user's hand, or, in other words, by the distance included in the amount of movement in the direction included in the amount of movement.

Further, in a case where the operation information acquired from the pointer operation information outputting unit 44 includes the fixing control information, the pointer position controlling unit 45 fixes the pointer P on the operation screen R displayed on the display 10, on the basis of the fixing control information.

The command identifying unit 46 acquires the space determination result and the position detection result, which have been output from the operation space determining unit 43. In a case where the acquired space determination result indicates that the user's hand is present in the operation space B, the command identifying unit 46 identifies the movement (gesture) of the user's hand, on the basis of the position detection result output from the operation space determining unit 43.

The command recording unit 47 records command information in advance. The command information is information in which movement (a gesture) of the user's hand is associated with a command that can be executed by the user. The command recording unit 47 includes a hard disc drive (HDD), a solid-state drive (SSD), or the like, for example.

The command identifying unit 46 identifies a command corresponding to the identified movement (gesture) of the user's hand, on the basis of the command information recorded in the command recording unit 47. The command identifying unit 46 outputs the identified command to the command outputting unit 48 and the aerial image generating unit 50.

The command outputting unit 48 acquires the command output from command identifying unit 46. The command outputting unit 48 outputs the operation information including information indicating the acquired command, to the command generating unit 49.

The command generating unit 49 receives the operation information output from the command outputting unit 48, and generates the command included in the received operation information. As a result, in the interface system 100, the command corresponding to the movement (gesture) of the user's hand is executed.

The aerial image generating unit 50 generates data indicating the aerial image S to be projected onto the virtual space K by the aerial image projecting unit 31. The aerial image generating unit 50 outputs the generated data indicating the aerial image S to the aerial image projecting unit 31.

Also, the aerial image generating unit 50 may acquire the space determination result output from the operation space determining unit 43, and regenerate data indicating the aerial image S to be projected in the mode corresponding to the acquired space determination result. Further, the aerial image generating unit 50 may output the regenerated data indicating the aerial image S to the aerial image projecting unit 31.

For example, in a case where the space determination result indicates that the user's hand is present in the operation space A, the aerial image generating unit 50 may regenerate data indicating an aerial image S to be projected in blue. Further, in a case where the space determination result indicates that the user's hand is present in the operation space B, the aerial image generating unit 50 may regenerate data indicating an aerial image S to be projected in red. Furthermore, in a case where the space determination result indicates that the user's hand is present in the operation space B, the aerial image generating unit 50 may generate data indicating the aerial image SC described above, and output the generated data indicating the aerial image SC to the aerial image projecting unit 31.

Also, the aerial image generating unit 50 may acquire the command output from the command identifying unit 46, and regenerate data indicating the aerial image S to be projected in the mode corresponding to the acquired command. Further, the aerial image generating unit 50 may output the regenerated data indicating the aerial image S to the aerial image projecting unit 31.

For example, in a case where the command acquired from the command identifying unit 46 is a left click, the aerial image generating unit 50 may regenerate data indicating an aerial image S that blinks once. Further, in a case where the command acquired from the command identifying unit 46 is a left double click, the aerial image generating unit 50 may regenerate data indicating an aerial image S that blinks twice in a row.

Note that the operation information outputting unit 51 described above may include a sound information outputting unit (not shown) that generates information indicating that the sound corresponding to fixing of the pointer P (a sound indicating fixing of the pointer P), and incorporate the generated information into the operation information to be output, in a case where the operation information including the fixing control information is output from the pointer operation information outputting unit 44 to the pointer position controlling unit 45. In this case, when the pointer position controlling unit 45 fixes the pointer P on the basis of the fixing control information, the sound corresponding to the fixing of the pointer P is output. Thus, by listening to the sound, the user can easily grasp the fact that the pointer P is fixed.

Also, the sound information outputting unit may generate information indicating that the sound corresponding to the command identified by the command identifying unit 46 is to be output, and incorporate the generated information into the operation information to be output. In this case, when the command generating unit 49 generates a command, the sound corresponding to the command is output. Thus, by listening to this sound, the user can easily grasp the fact that the command has been generated.

Also, the sound information outputting unit may generate information indicating that the sound corresponding to the three-dimensional position of the user's hand in the operation space A or the sound corresponding to the movement of the user's hand in the operation space A is to be output, and incorporate the generated information into the operation information to be output. For example, on the basis of the three-dimensional position of the user's hand in the operation space A as detected by the position detecting unit 32, the sound information outputting unit may generate information indicating that the sound corresponding to the three-dimensional position is to be output, and incorporate the generated information into the operation information to be output. In this case, when the user brings his or her hand close to the boundary plane in the operation space A, for example, a sound whose volume increases as the user's hand approaches the boundary plane is output. By listening to this sound, the user can easily grasp the fact that the hand is close to the boundary plane.

Further, on the basis of the amount of movement of the user's hand as calculated by the pointer operation information outputting unit 44, for example, the sound information outputting unit may generate information indicating that the sound corresponding to the amount of movement is to be output, and incorporate the generated information into the operation information to be output. In this case, as the user moves his or her hand more greatly in the operation space A (as the amount of movement of the hand is larger), a sound with a higher volume is output. By listening to this sound, the user can easily grasp the fact that the hand has moved greatly. By listening to the sound in this manner, the user can easily grasp the three-dimensional position of the hand or the movement of the hand in the operation space A.

Note that, in the fifth embodiment, the position acquiring unit 41, the boundary position recording unit 42, the operation space determining unit 43, the pointer operation information outputting unit 44, the pointer position controlling unit 45, the command identifying unit 46, the command recording unit 47, the command outputting unit 48, the command generating unit 49, and the aerial image generating unit 50 described above are provided in the display control device 11 described above, for example. Also, in this case, a device controller 12 includes the position acquiring unit 41, the boundary position recording unit 42, the operation space determining unit 43, the pointer operation information outputting unit 44, the command identifying unit 46, the command recording unit 47, the command outputting unit 48, and the aerial image generating unit 50. The device controller 12 controls the interface device 2.

Note that, although the boundary position recording unit 42 and the command recording unit 47 are provided in the device controller 12 in the example described above, the boundary position recording unit 42 and the command recording unit 47 are not limited to this, and may be provided outside the device controller 12.

Next, an example operation of the interface system 100 according to the fifth embodiment is described with reference to flowcharts shown in FIGS. 12 to 15. Here, for easier understanding of explanation, the example operation of the interface system 100 is separated into "A. aerial image projection phase" and "B. control execution phase".

<A. Aerial Image Projection Phase>

Figure 12:
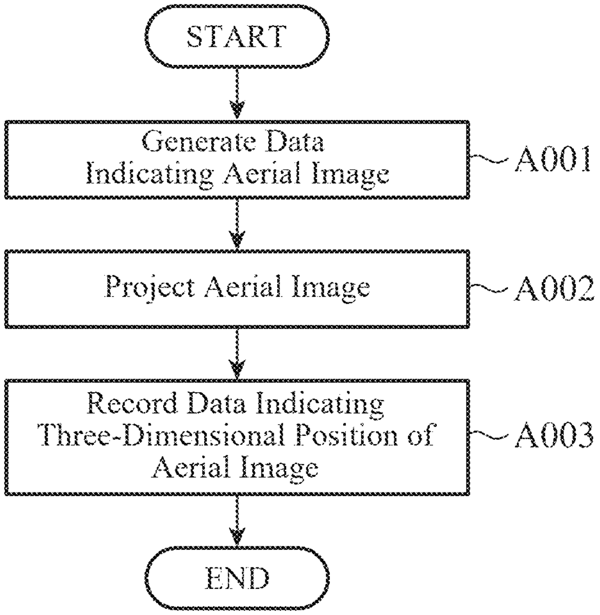
FIG. 12 is a flowchart showing an example operation in "A. aerial image projection phase" of the interface system according to the fifth embodiment.

First, the aerial image projection phase is described with reference to a flowchart shown in FIG. 12. In the aerial image projection phase, the aerial image Sis projected onto the virtual space K. Note that the aerial image projection phase is executed at least once when the interface system 100 is activated.

First, the aerial image generating unit 50 generates data indicating the aerial image S to be projected by the aerial image projecting unit 31 onto the virtual space K (step A001). The aerial image generating unit 50 outputs the generated data indicating the aerial image S to the aerial image projecting unit 31.

Next, the aerial image projecting unit 31 acquires the data indicating the aerial image S generated by the aerial image generating unit 50, and projects the aerial image S based on the acquired data onto the virtual space K (step A002).

Next, the position detecting unit 32 detects the three-dimensional position of the aerial image S projected onto the virtual space K, and records the data indicating the detected three-dimensional position of the aerial image S into the boundary position recording unit 42 (step A003).

Note that, in the example described above, the aerial image projecting unit 31 first projects the aerial image S, the position detecting unit 32 then detects the three-dimensional position of the aerial image S, and the data indicating the detected three-dimensional position of the aerial image S is recorded into the boundary position recording unit 42. However, step A003 is not a necessary process, and may be omitted. For example, in the interface system 100, the user may first record the data indicating the three-dimensional position of the aerial image S into the boundary position recording unit 42, and the aerial image projecting unit 31 may project the aerial image S at the three-dimensional position indicated by the data. In this case, step A003 may be omitted.

<B. Control Execution Phase>

Figure 13:
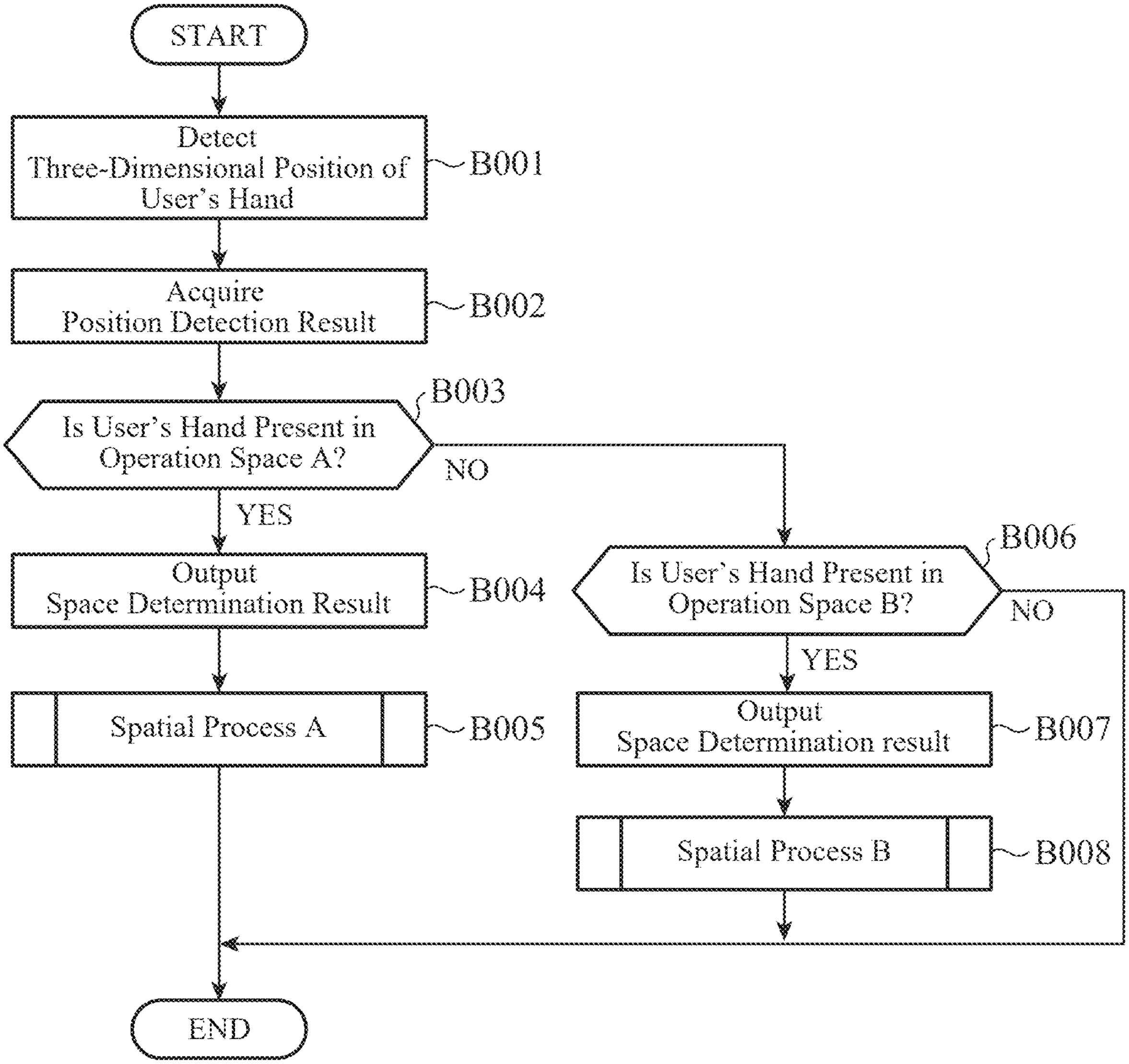
FIG. 13 is a flowchart showing an example operation in "B. control execution phase" of the interface system according to the fifth embodiment.

Next, the control execution phase is described with reference to a flowchart shown in FIG. 13. In the control execution phase, the user uses the interface device 2, and control by the display control device 11 and the device controller 12 is performed. Note that the control execution phase is repeatedly executed at predetermined intervals after the above-described aerial image projection phase is completed.

First, when the user puts his or her hand into the virtual space K, the position detecting unit 32 detects the three-dimensional position of the user's hand in the virtual space K (step B001). The position detecting unit 32 outputs a result of the detection of the three-dimensional position of the user's hand (position detection result) to the position acquiring unit 41.

Next, the position acquiring unit 41 acquires the position detection result output from the position detecting unit 32 (step B002). The position acquiring unit 41 outputs the acquired position detection result to the operation space determining unit 43.

Next, the operation space determining unit 43 acquires the detection result output from the position acquiring unit 41, and determines the operation space in which the user's hand is present, on the basis of the acquired position detection result and the boundary position of each operation space in the virtual space K.

For example, the operation space determining unit 43 compares the position coordinates of the five fingers of the user's hand in the Z-axis direction illustrated in FIG. 3 with the position coordinates of the boundary position between the operation space A and the operation space B in the Z-axis direction. The operation space determining unit 43 then determines whether the former is equal to the latter, or, if the former is located at a higher position than the latter (+Z direction), determines that the user's hand is present in the operation space A. If the former is located at a lower position than the latter (−Z direction), on the other hand, the operation space determining unit 43 determines that the user's hand is present in the operation space B.

Next, the operation space determining unit 43 checks whether or not the user's hand has been determined to be present in the operation space A (step B003). If the user's hand has been determined to be present in the operation space A (step B003; YES), the operation space determining unit 43 outputs the result of the determination (space determination result) to the aerial image generating unit 50 (step B004). Also, the operation space determining unit 43 outputs the space determination result, as well as the position detection result acquired from the position acquiring unit 41, to the pointer operation information outputting unit 44 (step B004). After that, the process moves on to step B005 (spatial process A).

If the user's hand has been determined not to be present in the operation space A in step B003 (step B003; NO), on the other hand, the operation space determining unit 43 checks whether or not the user's hand has been determined to be present in the operation space B (step B006). If the user's hand has been determined to be present in the operation space B (step B006; YES), the operation space determining unit 43 outputs the result of the determination (space determination result) to the aerial image generating unit 50 (step B007). Also, the operation space determining unit 43 outputs the space determination result, as well as the position detection result acquired from the position acquiring unit 41, to the pointer operation information outputting unit 44 and the command identifying unit 46 (step B007). After that, the process moves on to step B008 (spatial process B).

If the user's hand has been determined not to be present in the operation space B in step B006 (step B006; NO), on the other hand, the interface system 100 ends the process.

<Spatial Process A>

Figure 14:
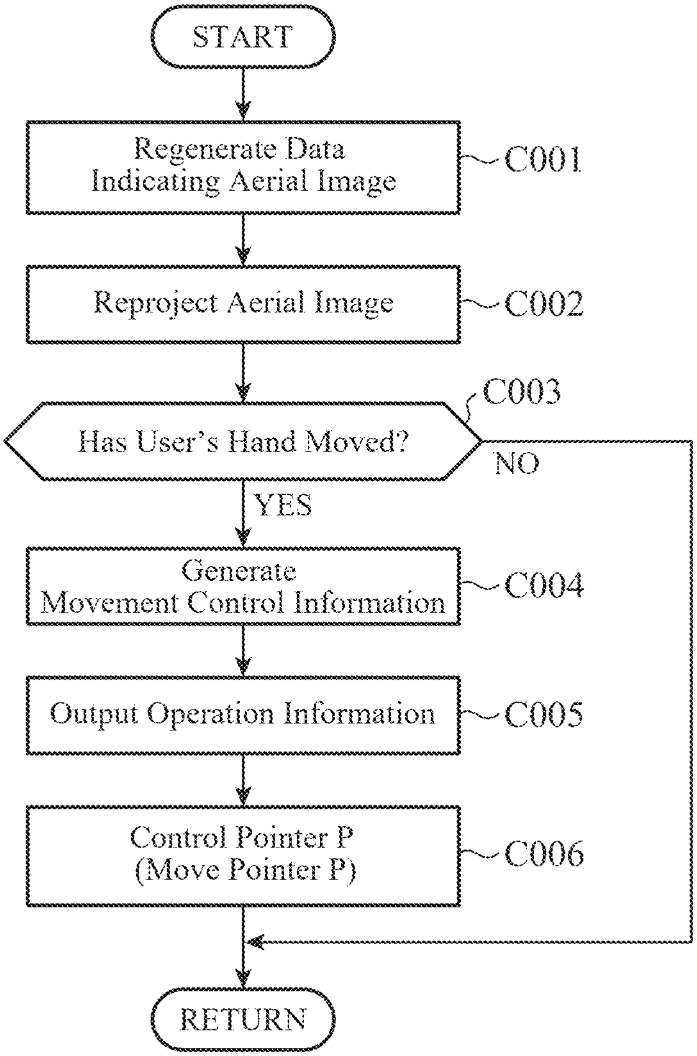
FIG. 14 is a flowchart showing an example operation in a "spatial process A" to be performed by the interface system according to the fifth embodiment.

Next, the spatial process A in step B005 is described with reference to a flowchart shown in FIG. 14.

First, the aerial image generating unit 50 acquires the space determination result indicating that the user's hand is present in the operation space A, which is output from the operation space determining unit 43, and regenerates the data indicating the aerial image S to be projected in the mode corresponding to the acquired space determination result (step C001). For example, the aerial image generating unit 50 regenerates the data indicating the aerial image S to be projected in blue as the aerial image S indicating that the user's hand is present in the operation space A. The aerial image generating unit 50 outputs the regenerated data indicating the aerial image S to the aerial image projecting unit 31.

Next, the aerial image projecting unit 31 acquires the data indicating the aerial image S regenerated by the aerial image generating unit 50, and reprojects the aerial image S based on the acquired data onto the virtual space K (step C002). That is, the aerial image projecting unit 31 updates the aerial image S being projected onto the virtual space K. As a result, the color of the aerial image S changes to blue, for example, and the user can easily grasp the fact that the hand has entered the operation space A (that a pointer operation mode has been set). Note that step C001 and step C002 are not necessary processes, and may be omitted.

Next, the pointer operation information outputting unit 44 determines whether or not the user's hand has moved, on the basis of the position detection result output from the operation space determining unit 43 (step C003). If it is determined that the user's hand has not moved as a result (step C003; NO), the process returns. If it is determined that the user's hand has moved (step C003; YES), on the other hand, the process moves on to step C004.

In step C004, the pointer operation information outputting unit 44 identifies the movement of the user's hand, on the basis of the position detection result output from the operation space determining unit 43. The pointer operation information outputting unit 44 then generates the information (movement control information) for moving the pointer P displayed on the operation screen R of the display 10 depending on the movement of the user's hand in the operation space A (step C004). Also, the pointer operation information outputting unit 44 outputs operation information including the generated movement control information to the pointer position controlling unit 45 (step C005).

Next, the pointer position controlling unit 45 controls the pointer P, on the basis of the movement control information included in the operation information output from the pointer operation information outputting unit 44 (step C006). Specifically, on the basis of the movement control information, the pointer position controlling unit 45 moves the pointer P on the operation screen R displayed on the display 10 depending on the movement of the user's hand. More specifically, the pointer position controlling unit 45 moves the pointer P on the operation screen R displayed on the display 10 by the amount corresponding to the amount of movement of the user's hand, or, in other words, by the distance included in the amount movement in the direction included in the amount of movement. Thus, the pointer P moves in conjunction with the movement of the user's hand. After that, the process returns.

<Spatial Process B>

Figure 15:
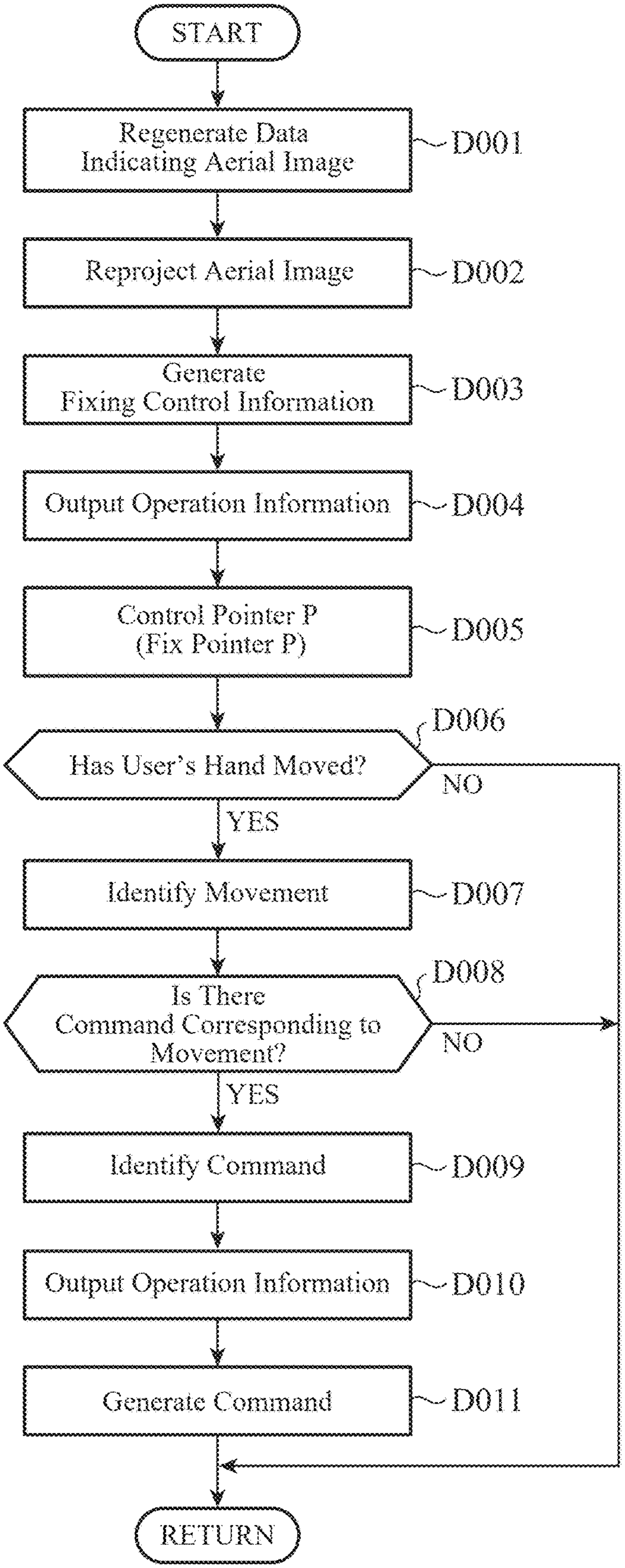
FIG. 15 is a flowchart showing an example operation in a "spatial process B" to be performed by the interface system according to the fifth embodiment.

Next, the spatial process B in step B008 is described with reference to a flowchart shown in FIG. 15.

First, the aerial image generating unit 50 acquires the space determination result indicating that the user's hand is present in the operation space B, which has been output from the operation space determining unit 43, and regenerates data indicating the aerial image S to be projected in the mode corresponding to the acquired space determination result (step D001). For example, the aerial image generating unit 50 regenerates data indicating the aerial image S to be projected in red as the aerial image S indicating that the user's hand is present in the operation space B. The aerial image generating unit 50 outputs the regenerated data indicating the aerial image S to the aerial image projecting unit 31.

Next, the aerial image projecting unit 31 acquires the data indicating the aerial image S regenerated by the aerial image generating unit 50, and reprojects the aerial image S based on the acquired data onto the virtual space K (step D002). That is, the aerial image projecting unit 31 updates the aerial image S being projected onto the virtual space K. As a result, the color of the aerial image S changes to red, for example, and the user can easily grasp the fact that his or her hand has entered the operation space B (that a command execution mode has been set). Note that steps D001 and D002 are not necessary processes, and may be omitted.

Next, the pointer operation information outputting unit 44 generates control information (fixing control information) indicating that the pointer P displayed on the operation screen R of the display 10 is to be fixed (step D003). Also, the pointer operation information outputting unit 44 outputs operation information including the generated fixing control information to the pointer position controlling unit 45 (step D004).

Next, the pointer position controlling unit 45 fixes the pointer P on the operation screen R displayed on the display 10, on the basis of the fixing control information included in the operation information output from the pointer operation information outputting unit 44 (step D005).

Next, the command identifying unit 46 determines whether or not the user's hand has moved, on the basis of the position detection result output from the operation space determining unit 43 (step D006). If it is determined that the user's hand has not moved as a result (step D006; NO), the process returns. If it is determined that the user's hand has moved (step D006; YES), on the other hand, the process moves on to step D007.

In step D007, the command identifying unit 46 identifies the movement (gesture) of the user's hand, on the basis of the position detection result output from the operation space determining unit 43 (step D007).

Next, the command identifying unit 46 refers to the command information recorded in the command recording unit 47, and determines whether or not the command information includes the movement corresponding to the identified movement of the hand (step D008). As a result, if it is determined that the command information does not include the movement corresponding to the identified movement of the hand (step D008; NO), the process returns. If it is determined that the command information includes the movement corresponding to the identified movement of the hand (step D008; YES), on the other hand, the command identifying unit 46 identifies the command associated with the movement in the command information (step D009). The command identifying unit 46 outputs the identified command to the command outputting unit 48.

Next, the command outputting unit 48 outputs operation information including information indicating the command acquired from the command identifying unit 46 to the command generating unit 49 (step D010).

Next, the command generating unit 49 receives the operation information output from the command outputting unit 48, and generates the command included in the received operation information (step D011). As a result, in the interface system 100, the command corresponding to the movement (gesture) of the user's hand is executed.

Note that, although not shown in the above flowchart, the command identifying unit 46 may output the identified command to the aerial image generating unit 50 in step D009. The aerial image generating unit 50 may then acquire the command output from the command identifying unit 46, and regenerate the data indicating the aerial image S to be projected in the mode corresponding to the acquired command. Further, the aerial image generating unit 50 may output the regenerated data indicating the aerial image S to the aerial image projecting unit 31.

Also, the aerial image projecting unit 31 may acquire the data indicating the aerial image S regenerated by the aerial image generating unit 50, and reproject the aerial image S based on the acquired data onto the virtual space K. That is, the aerial image projecting unit 31 may update the aerial image S being projected on the virtual space K. As a result, the aerial image S blinks once, and the user can easily grasp the fact that a left click command has been executed.

Next, examples of control to be performed by the interface system 100 according to the fifth embodiment are described with reference to FIGS. 16 to 24. By operating as described above, the interface system 100 according to the fifth embodiment can perform control as described below, for example.

(1) Pointer Movement

Figure 16:
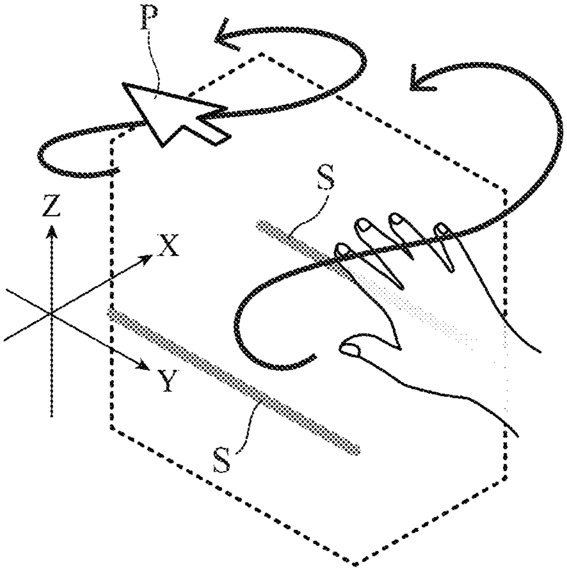
FIG. 16 is a diagram for explaining cursor movement in the fifth embodiment.

In a case where the user's hand is present in the operation space A, the pointer P moves on the operation screen R of the display 10, depending on the amount of movement of the user's hand in the virtual space K (X-Y-Z coordinate system) (see FIG. 16). Note that, although the pointer P is expressed as a conceptual drawing on the operation space A in FIG. 16, the pointer P displayed on the operation screen R of the display 10 moves in practice.

Note that, in the above case, the pointer operation information outputting unit 44 may generate the movement control information with which the amount of movement or the speed of movement of the pointer P changes depending on how far the three-dimensional position of the user's hand is away from the boundary plane (X-Y plane) of the virtual space indicated by the aerial image S in the direction orthogonal to the boundary plane (which is the Z-axis direction), even though the amount of movement of the user's hand is the same.

Figure 17:
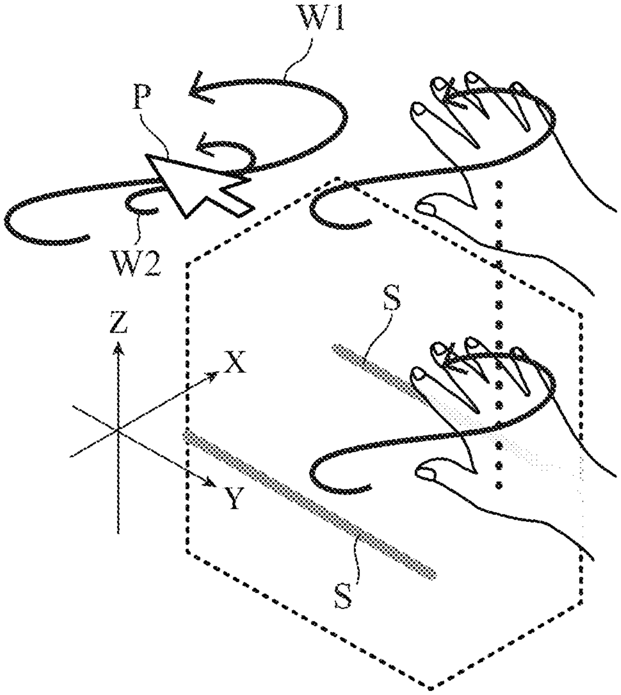
FIG. 17 is a diagram for explaining cursor movement in the fifth embodiment.

For example, as illustrated in FIG. 17, when the three-dimensional position of the user's hand is far away from the boundary plane (X-Y plane) in the Z-axis direction, the pointer operation information outputting unit 44 may generate movement control information indicating that the pointer P is to be moved by a distance about the same as the distance over which the user's hand has moved, or at a speed about the same as the speed at which the user's hand has moved (reference sign W1 in FIG. 17). On the other hand, even when the amount of movement of the user's hand is the same as the above, the pointer operation information outputting unit 44 may generate movement control information indicating that, if the three-dimensional position of the user's hand is close to the boundary plane (X-Y plane) in the Z-axis direction, the pointer P is to be moved by a distance about half the distance over which the user's hand has moved, or at a speed about half the speed at which the user's hand has moved (reference sign W2 in FIG. 17).

That is, the pointer operation information outputting unit 44 may generate the movement control information by multiplying the amount of movement or the speed of movement of the user's hand projected on the boundary plane (X-Y plane) on which the aerial image S is projected, by the coefficient corresponding to the distance in the Z-axis direction between the three-dimensional position of the user's hand and the boundary plane (X-Y plane).

In this case, by moving the hand at a position far in the Z-axis direction from the boundary plane (X-Y plane) on which the aerial image S is projected, the user can move the pointer P by the amount corresponding to the amount of movement of the hand or at the same speed as the movement of the hand. On the other hand, by moving the hand at a position close in the Z-axis direction to the boundary plane (X-Y plane) on which the aerial image S is projected, the user can minutely (slightly) or slowly move the pointer P. In particular, when the pointer movement mode switches to the command execution mode, it is assumed that the user moves the hand near the boundary plane on which the aerial image S is projected. At that time, the user can minutely or slowly move the pointer P. Thus, the position of the pointer P can be finely designated when a command is to be executed, and user-friendliness is increased.

Note that, in the example described herein, when the three-dimensional position of the user's hand is located far away from the boundary plane (X-Y plane) in the Z-axis direction, the pointer operation information outputting unit 44 generates the movement control information to the effect that the pointer P is to be moved by a distance about the same as the distance over which the user's hand has moved or at a speed about the same as the speed at which the user's hand has moved, and, when the three-dimensional position of the user's hand is located close to the boundary plane (X-Y plane) in the Z-axis direction, the pointer operation information outputting unit 44 generates the movement control information to the effect that the pointer P is to be moved by a distance approximately half the distance over which the user's hand has moved or at a speed approximately half the speed at which the user's hand has moved. However, contrary to the above, when the three-dimensional position of the user's hand is located far away from the boundary plane (X-Y plane) in the Z-axis direction, the pointer operation information outputting unit 44 may generate the movement control information to the effect that the pointer P is to be moved by a distance about half the distance over which the user's hand has moved or at a speed about half the speed at which the user's hand has moved, and, when the three-dimensional position of the user's hand is located close to the boundary plane (X-Y plane) in the Z-axis direction, the pointer operation information outputting unit 44 may generate the movement control information to the effect that the pointer P is to be moved by a distance about the same as the distance over which the user's hand has moved or at a speed about the same as the speed at which the user's hand has moved.

(2) Pointer Fixing

Figure 18:
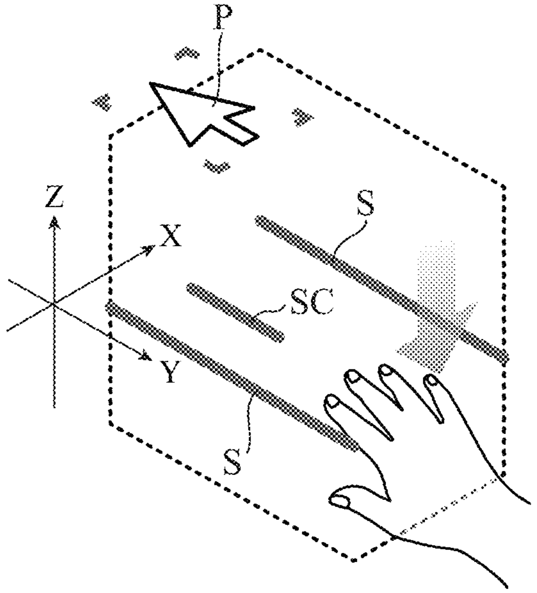
FIG. 18 is a diagram for explaining cursor fixing in the fifth embodiment.
Figure 19:
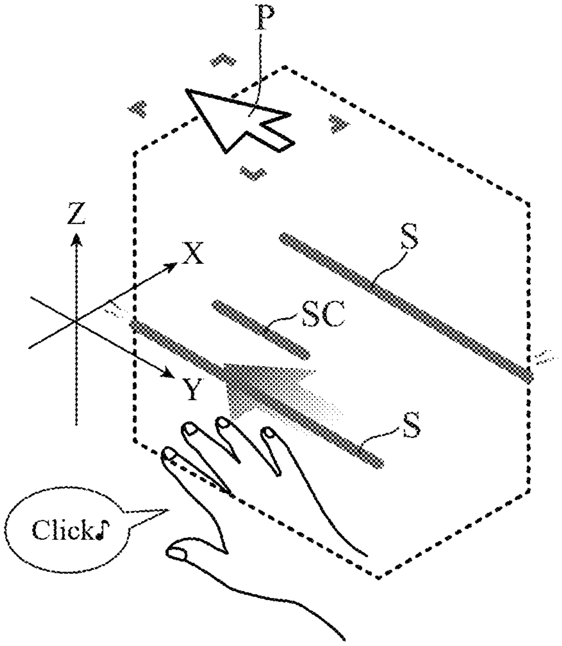
FIG. 19 is a diagram for explaining a left click in the fifth embodiment.
Figure 20:
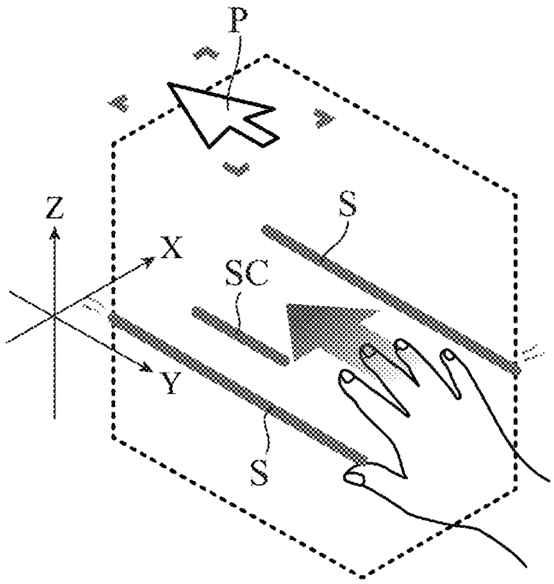
FIG. 20 is a diagram for explaining a right click in the fifth embodiment.
Figure 21:
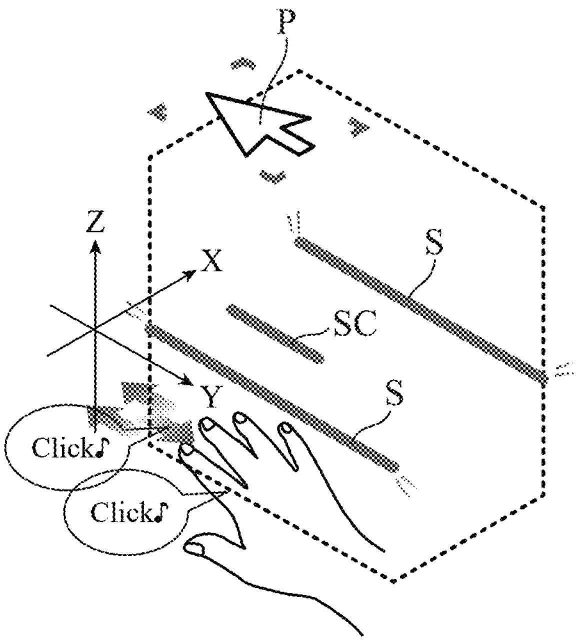
FIG. 21 is a diagram for explaining a left double click in the fifth embodiment.

In a case where the user's hand has entered the operation space B from the operation space A across the position (boundary position) of the aerial image, the pointer P is fixed on the operation screen R of the display 10 (see FIG. 18). After that, even when the user's hand moves in the operation space B, the pointer P remains fixed on the operation screen R of the display 10. Note that, at this point of time, the aerial image S may be updated, and, for example, the color of the aerial image S may be changed from blue to red. As a result, the user can easily grasp the fact that the hand has entered the operation space B (that the mode has been changed to the command execution mode). Also, at this point of time, the aerial image SC may be projected by the projection device 20 at a position in the vicinity of the lower limit position of the region detectable by the detection device 21 and in the vicinity of almost the center of the virtual space K in the X-axis direction.

(3) Left Click

For example, in the operation space B, when the user moves the hand in the −Y direction, and the hand reaches a preset left click occurrence region, the movement (gesture) of the hand is identified by the command identifying unit 46. The left click occurrence region is a predetermined region on the left side (−X direction side) of the aerial image SC in the operation space B and on the far side (−Y direction side) as viewed from the user, for example.

This movement (gesture) is associated with a "left click" command in the command information. Accordingly, the command identifying unit 46 identifies the "left click" command, and a left click is performed (see FIG. 19). Also, at this point of time, the aerial image generating unit 50 may regenerate data indicating the aerial image S that blinks once, for example, and the aerial image projecting unit 31 may project the aerial image S based on the regenerated data. As a result, in the interface system 100, the aerial image S blinks once, and the user can easily grasp the fact that the left click has been performed. Note that, at this point of time, the interface system 100 may output a sound such as "click" as the sound corresponding to the left click. As a result, by listening to this sound, the user can more easily grasp the fact that a left click has been performed.

(4) Right Click

For example, in the operation space B, when the user moves his or her hand in the −Y direction, and the hand reaches a preset right click occurrence region, the command identifying unit 46 identifies the movement (gesture) of the hand. The right click occurrence region is a predetermined region on the right side (+X direction side) of the aerial image SC in the operation space B and on the far side (−Y direction side) as viewed from the user, for example.

This movement (gesture) is associated with a "right click" command in the command information. Accordingly, the command identifying unit 46 identifies the "right click" command, and a right click is performed (see FIG. 20). Also, at this point of time, the aerial image generating unit 50 may regenerate data indicating the aerial image S that blinks once, for example, and the aerial image projecting unit 31 may project the aerial image S based on the regenerated data. As a result, in the interface system 100, the aerial image S blinks once, and the user can easily grasp the fact that a right click has been performed.

(5) Left Double Click

For example, in the operation space B, when the user moves his or her hand in the −Y direction to reach the preset left click occurrence region, and continuously moves the hand in the +Y direction and the −Y direction while the hand remains in the left click occurrence region, the command identifying unit 46 identifies the movement (gesture) of the hand. This movement (gesture) is associated with a "left double click" command in the command information. Accordingly, the command identifying unit 46 identifies the "left double click" command, and a left double click is performed (see FIG. 21). Also, at this point of time, the aerial image generating unit 50 may regenerate data indicating the aerial image S that blinks twice in a row, for example, and the aerial image projecting unit 31 may project the aerial image S based on the regenerated data. As a result, in the interface system 100, the aerial image S blinks twice in a row, and the user can easily grasp the fact that a left double click has been performed. Note that, at this point of time, the interface system 100 may output continuous sounds such as "click" and "click" as the sound corresponding to the left double click. As a result, by listening to this sound, the user can more easily grasp the fact that a left double click has been performed.

(6) Continuous Pointer Moving Operation

Figure 22A:
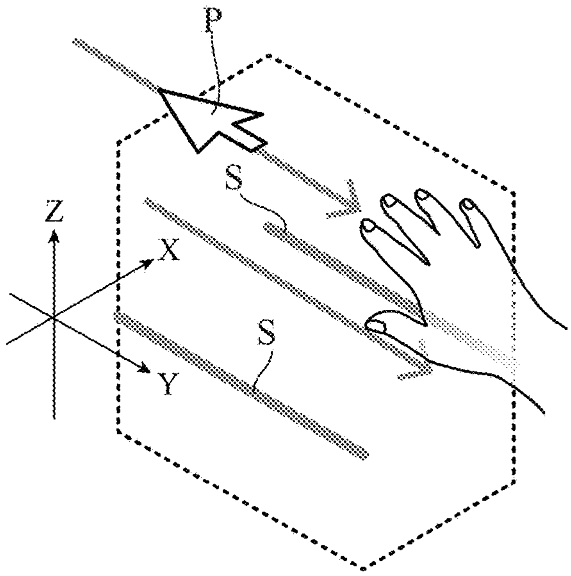
FIGS. 22A to 22D are diagrams for explaining a continuous pointer moving operation in the fifth embodiment.
Figure 22B:
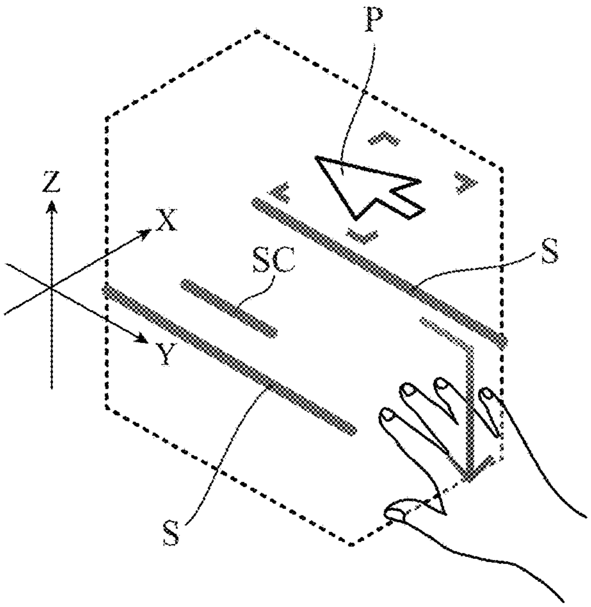
Figure 22C:
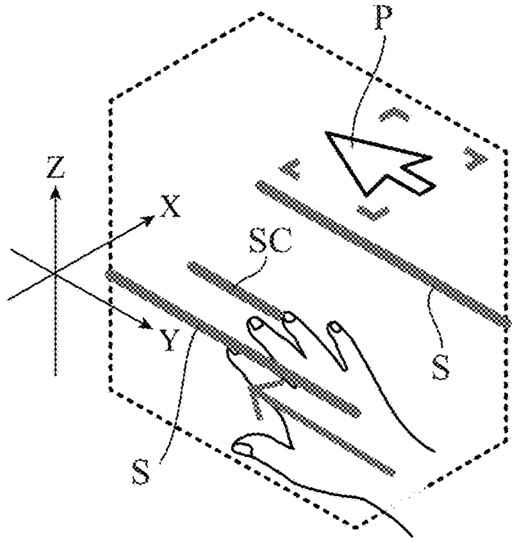

When the user moves his or her hand in the +Y direction in the operation space A, the pointer P also moves in the +Y direction in conjunction with the movement (see FIG. 22A). Here, the user moves his or her hand to the operation space B once, to fix the pointer P (see FIG. 22B). In a case where the user moves the hand in the −Y direction in this state, the pointer P remains fixed (see FIG. 22C).

Figure 22D:
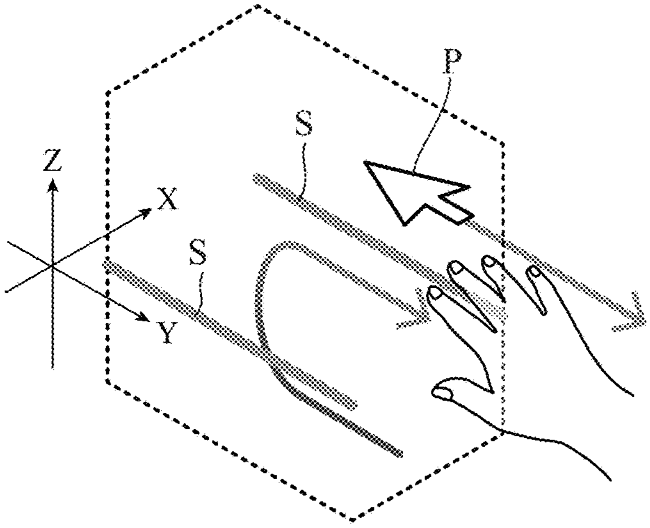

When the user further moves the hand from the operation space B to the operation space A across the boundary position (boundary plane), the pointer P moves again in conjunction with the movement of the hand of the user (see FIG. 22D). By repeating the above operation, the user can continuously move the pointer P simply by moving his or her hand in the limited space formed with the operation space A and the operation space B.

Figure 23A:
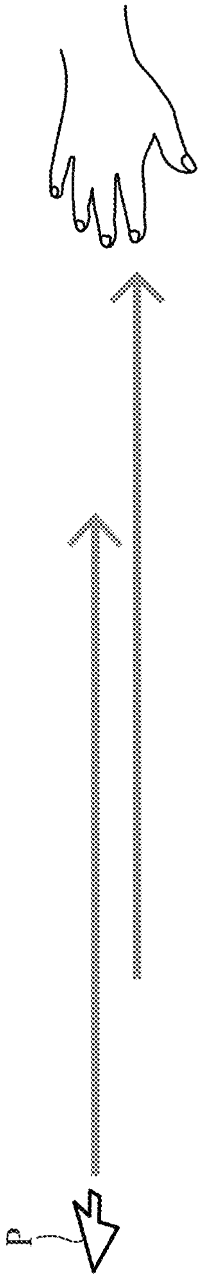
FIG. 23A is a diagram for explaining a continuous pointer moving operation by a conventional device.
Figure 23B:
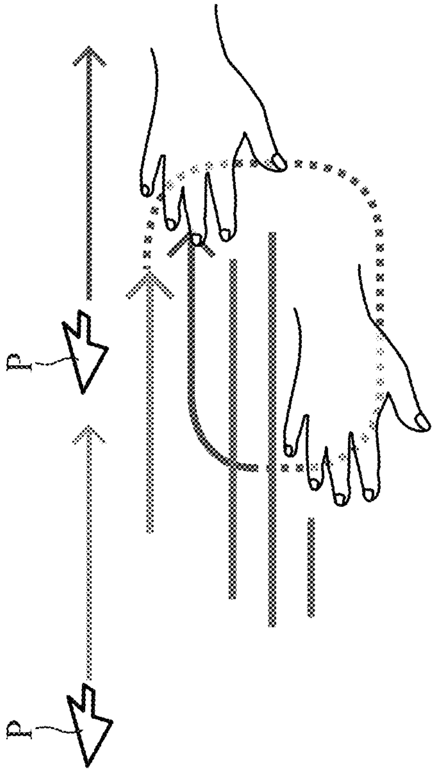
FIG. 23B is a diagram for explaining a continuous pointer moving operation in the fifth embodiment.
Figure 24A:
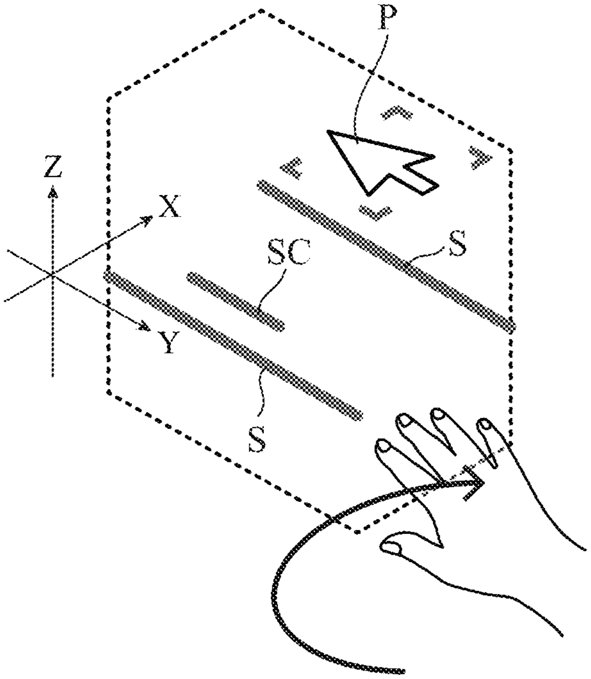
FIGS. 24A and 24B are diagrams for explaining a scroll operation in the fifth embodiment.
Figure 24B:
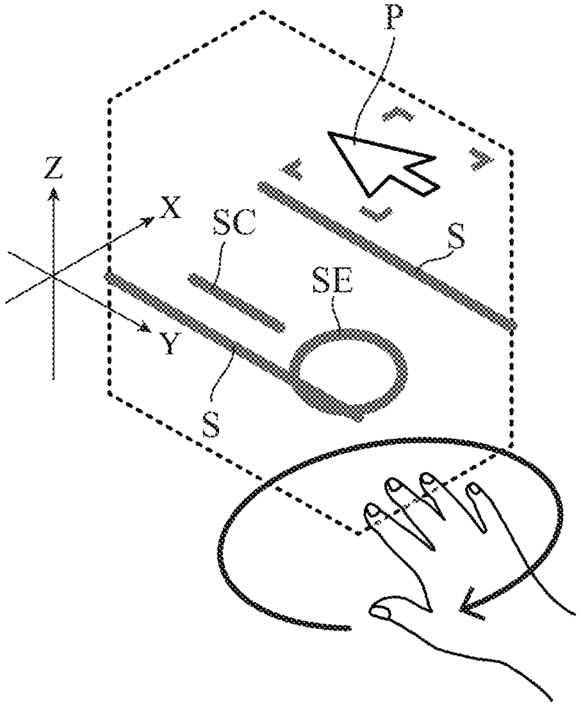

In this aspect, in an operation involving continuity such as long distance movement and scrolling of the pointer P with the above described conventional device, the amount of movement of the user's hand is large, and a wide space to such an extent that the large movement can be performed is required, as illustrated in FIG. 23A, for example. In the fifth embodiment, on the other hand, when the user's hand moves back and forth at the boundary position (boundary plane) as illustrated in FIG. 23B, for example, the correlation between the pointer P and the user's hand can be reset. Accordingly, by repeatedly moving his or her hand over a short moving distance, the user can perform a continuous operation such as long distance movement and scrolling of the pointer P even in the limited space formed with the operation space A and the operation space B.

(7) Scroll Operation

When the user starts movement (a gesture) such as turning his or her hand within a region not reaching the left click occurrence region or the right click occurrence region described above in the operation space B, the movement (gesture) of the hand is identified by the command identifying unit 46. This movement (gesture) is associated with a "scroll operation" command in the command information. Accordingly, in the interface system 100, the command identifying unit 46 identifies the "scroll operation" command, and a scroll operation is performed (see FIG. 24A). Also, at this point of time, the aerial image generating unit 50 may regenerate data indicating an aerial image SE obtained by adding a predetermined figure to the current aerial image S, for example, and the aerial image projecting unit 31 may project the aerial images S and SE based on the regenerated data (see FIG. 24B). As a result, the aerial images S and SE to which the predetermined figure is added are projected, and the user can easily grasp the fact that a scroll operation is possible.

Figure 25:
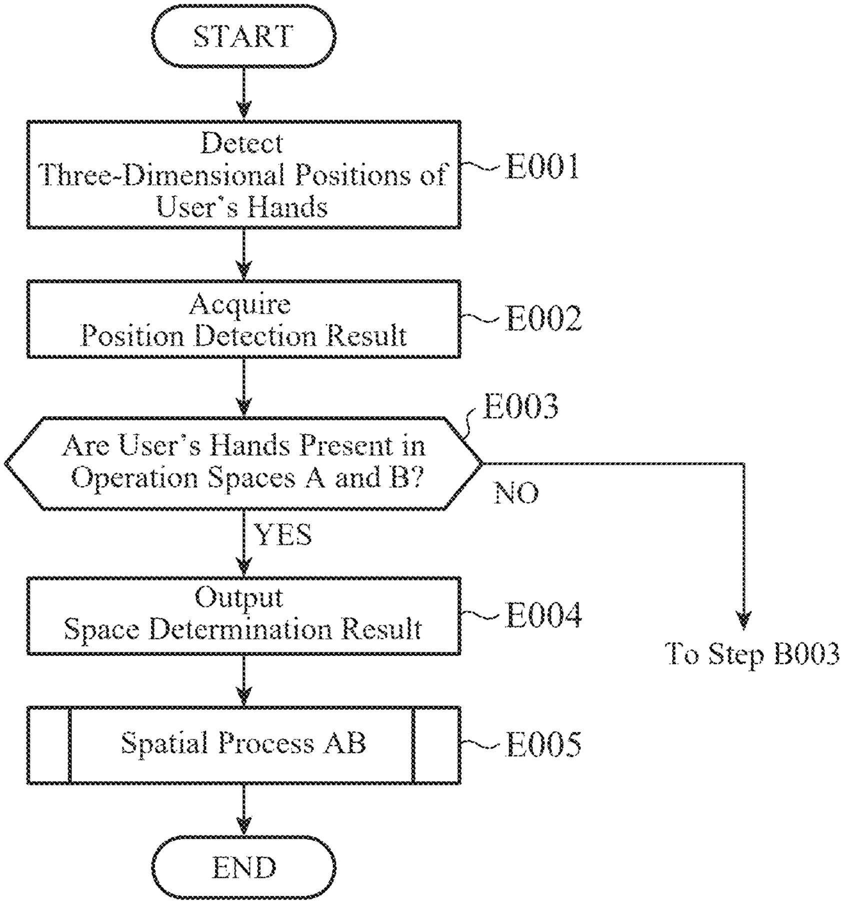
FIG. 25 is a flowchart illustrating another example operation in "B. control execution phase" of the interface system according to the fifth embodiment.

Next, an example of an applied operation in the control execution phase of the interface system 100 according to the fifth embodiment is described with reference to a flowchart shown in FIG. 25. In this example of an applied operation, an example in which the user operates both the operation space A and the operation space B with the right and left hands is described.

First, when the user puts his or her hands into the virtual space K, the position detecting unit 32 detects the three-dimensional positions of the user's hands in the virtual space K (step E001). The position detecting unit 32 outputs a result of the detection of the three-dimensional positions of the user's hands (position detection result) to the position acquiring unit 41.

Next, the position acquiring unit 41 acquires the position detection result output from the position detecting unit 32 (step E002). The position acquiring unit 41 outputs the acquired position detection result to the operation space determining unit 43.

Next, the operation space determining unit 43 acquires the detection result output from the position acquiring unit 41, and determines the operation spaces in which the user's hands are present, on the basis of the acquired position detection result and the boundary position of each operation space in the virtual space K.

Next, the operation space determining unit 43 checks whether or not the user's hands have been determined to be present in both the operation space A and the operation space B (step E003). If the user's hands are determined not to be present in both the operation space A and the operation space B (step E003; NO), the process moves on to step B003 of the flowchart in FIG. 13 described above.

If the user's hands are determined to be present in both the operation space A and the operation space B (step E003; YES), the operation space determining unit 43 outputs the result of the determination (space determination result) to the aerial image generating unit 50. Also, the operation space determining unit 43 outputs the space determination result, as well as the position detection result acquired from the position acquiring unit 41, to the pointer operation information outputting unit 44 and the command identifying unit 46 (step E004). After that, the process moves on to step E005 (spatial process AB).

<Spatial Process AB>

Figure 26:
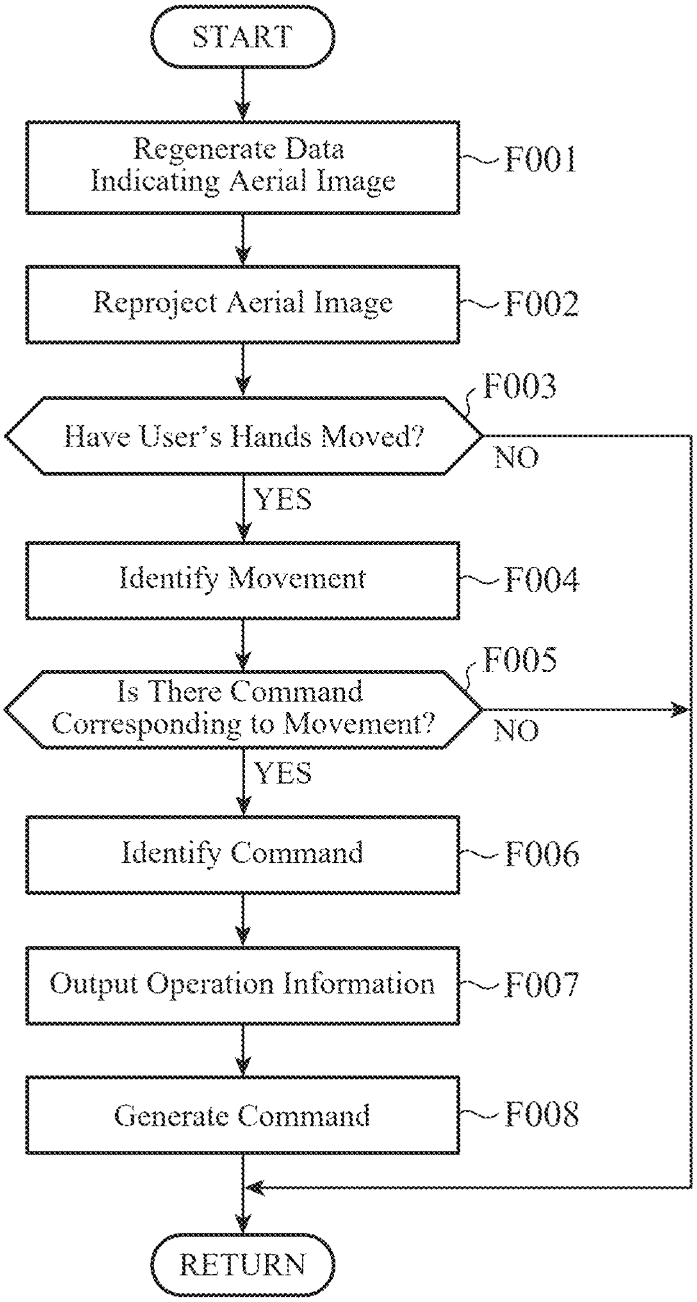
FIG. 26 is a flowchart showing an example operation in a "spatial process AB" to be performed by the interface system according to the fifth embodiment.

Next, the spatial process AB in step E005 is described with reference to a flowchart shown in FIG. 26.

First, the aerial image generating unit 50 acquires the space determination result that has been output from the operation space determining unit 43 and indicates that the user's hands are present in both the operation space A and the operation space B, and regenerates data indicating the aerial image S to be projected in the mode corresponding to the acquired space determination result (step F001). For example, the aerial image generating unit 50 regenerates data indicating an aerial image S to be projected in green as the aerial image S indicating that the user's hands are present in both the operation space A and the operation space B. The aerial image generating unit 50 outputs the regenerated data indicating the aerial image S to the aerial image projecting unit 31.

Next, the aerial image projecting unit 31 acquires the data indicating the aerial image S regenerated by the aerial image generating unit 50, and reprojects the aerial image S based on the acquired data onto the virtual space K (step F002). That is, the aerial image projecting unit 31 updates the aerial image S being projected onto the virtual space K. As a result, the color of the aerial image S changes to green, for example, and the user can easily grasp the fact that his or her hands have entered both the operation space A and the operation space B. Note that step F001 and step F002 are not necessary processes, and may be omitted.

Next, the pointer operation information outputting unit 44 determines whether or not the user's hands have moved, on the basis of the position detection result output from the operation space determining unit 43 (step F003). If it is determined that the user's hands have not moved as a result (step F003; NO), the process returns. If it is determined that the user's hands have moved (step F003; YES), on the other hand, the process moves on to step F004.

In step F004, the command identifying unit 46 identifies the movement (gesture) of the user's hands, on the basis of the position detection result output from the operation space determining unit 43 (step F004). In this case, the movement (gesture) of the hands of the user is a movement obtained by combining the movement of the hand present in the operation space A and the movement of the hand present in the operation space B.

Next, the command identifying unit 46 refers to the command information recorded in the command recording unit 47, and determines whether or not the command information includes the movement corresponding to the identified movement of the hands (step F005). As a result, if it is determined that the command information does not include the movement corresponding to the identified movement of the hands (step F005; NO), the process returns.

If it is determined that the command information includes the movement corresponding to the identified movement of the hands (step F005; YES), on the other hand, the command identifying unit 46 identifies the command associated with the movement in the command information (step F006). The command identifying unit 46 outputs the identified command to the command outputting unit 48.

Next, the command outputting unit 48 outputs the operation information including information indicating the command acquired from the command identifying unit 46 to the command generating unit 49 (step F007).

Next, the command generating unit 49 receives the operation information output from the command outputting unit 48, and generates the command included in the received operation information (step F008). As a result, in the interface system 100, the command corresponding to the movement (gesture) of the user's hands is executed.

By operating as described above, the interface system 100 according to the fifth embodiment can perform control as described below, for example.

(8) Left Drag Operation

Figure 27A:
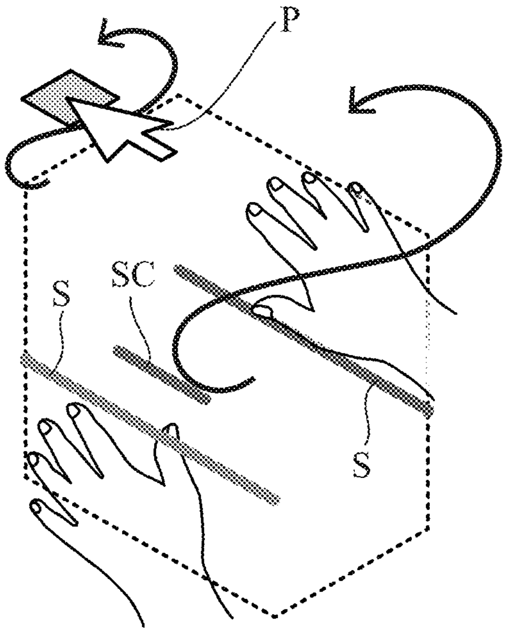
FIG. 27A is a diagram for explaining a left drag operation in the fifth embodiment.

The user makes the left hand reach the left click occurrence region in the operation space B, and moves the right hand in the operation space A. As a result, in the interface system 100, the command identifying unit 46 identifies the movement (gesture) of the right and left hands. This movement (gesture) is associated with a "left drag operation" command in the command information. Thus, in the interface system 100, the command identifying unit 46 identifies the "left drag operation" command, and a left drag operation in conjunction with the movement of the right hand of the user is performed (see FIG. 27A).

(9) Right Drag Operation

Figure 27B:
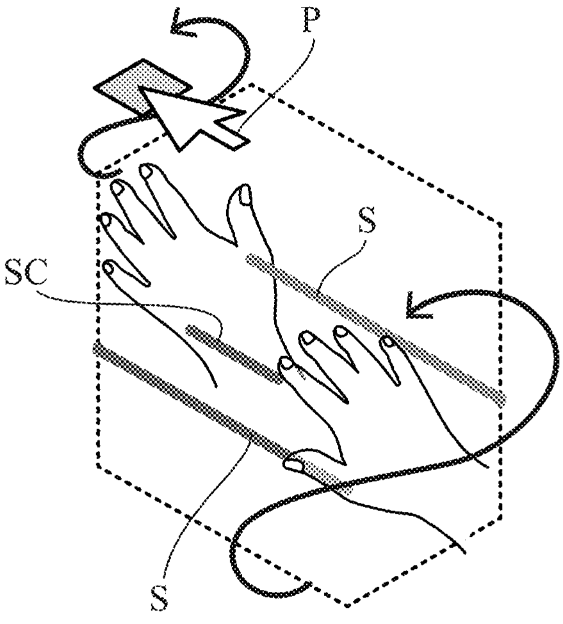
FIG. 27B is a diagram for explaining a right drag operation in the fifth embodiment.

The user makes the right hand reach the right click occurrence region in the operation space B, and moves the left hand in the operation space A. As a result, in the interface system 100, the command identifying unit 46 identifies the movement (gesture) of the right and left hands. This movement (gesture) is associated with a "right drag operation" command in the command information. Thus, in the interface system 100, the command identifying unit 46 identifies the "right drag operation" command, and a right drag operation in conjunction with the movement of the left hand of the user is performed (see FIG. 27B).

Note that, although the user performs a left drag operation and a right drag operation by moving the right and left hands in the examples described above, these are merely examples, and the commands to be executed depending on combinations of movements of the right and left hands of the user are not limited to the above examples. As described above, by associating combinations of movements of the right and left hands of the user with commands, the interface system 100 can increase the variation of commands that the user can execute.

Further, in the above description, an example operation in the spatial process AB and an example operation in the above-described spatial process B have been separately described for easier understanding of explanation, but these processes may be performed in a continuous manner. For example, in the interface system 100, in the spatial process B, the pointer position controlling unit 45 first fixes the pointer P onto the operation screen R on the basis of the fixing control information generated by the pointer operation information outputting unit 44, and the above-described spatial process AB may be then performed. That is, the user may perform the left drag operation and the right drag operation described above, by putting one of the right and left hands into the operation space B, fixing the pointer P onto the operation screen R, and moving the right and left hands in the operation space A and the operation space B while maintaining the pointer-fixed state, for example. In this case, in the interface system 100, the spatial process B and the spatial process AB are performed in a continuous manner. Thus, in the interface system 100, it is possible to achieve both an accurate pointing operation by the user and extension of variations of commands executable by the user.

As described above, in the interface system 100 according to the fifth embodiment, the aerial image S indicating the boundary position between the operation space A and the operation space B constituting the virtual space K is projected onto the virtual space K. Thus, the user can visually recognize the boundary position between the operation space A and the operation space B in the virtual space K, and can easily grasp at which position the operation spaces (modes) are switched.

In this regard, in the above-described conventional device, it is difficult for the user to visually recognize at which positions in the virtual planar space the modes are switched, or, in other words, the boundary positions (the boundary position between the first space and the second space, and the boundary position between the second space and the third space) of the respective spaces constituting the virtual planar space, and the user needs to grasp these positions while moving his or her hand to some extent. Also, for this reason, the user cannot grasp the correlation between the pointer and the hand unless the user moves the hand to some extent, and it may take time to start an operation.

In the fifth embodiment, on the other hand, the user can visually recognize the boundary position between the operation space A and the operation space B in the virtual space K as described above, and can easily grasp at which position the operation spaces (modes) are switched. Also, this eliminates the need for the user to grasp the boundary position at which the operation spaces are switched by moving his or her hand, and the user can start an operation more quickly than with the conventional device.

Further, in a conventional noncontact pointing system such as the conventional device, it is difficult for the user to recognize the position in a virtual space corresponding to pressing of a button on an operation screen displayed on a display. Therefore, it might be necessary to add an auxiliary display onto the operation screen in some cases. Alternatively, to press a button on the operation screen surely on the basis of a touch operation in the virtual space, it might be necessary to make a change such as increasing the size of the buttons on the operation screen in some cases. That is, in the conventional noncontact pointing system, it might be necessary to rearrange existing software for displaying the operation screen in some cases.

Further, in the conventional noncontact pointing system, even if the user stops his or her hand in the air and performs an operation (gesture) such as pushing, it might be difficult to designate an accurate position on the operation screen for the reason that the pointer position shifts at the time of pushing or the like. Furthermore, in the conventional noncontact pointing system, in an operation involving continuity such as long distance movement or scrolling of a pointer, the amount of movement of the user's hand is large, and a wide space might be required in some cases.

In this regard, in the fifth embodiment, the virtual space K is divided into the operation space A and the operation space B. While the pointer P can be moved in conjunction with movement of the user's hand in the operation space A, the pointer P is fixed in the operation space B, and movement (a gesture) of the user's hand that causes generation of a command is recognized in the state where the pointer P is fixed, as described above. Thus, in the fifth embodiment, the position of the pointer P is prevented from shifting during execution of movement (a gesture) of the hand that causes generation of a command. Accordingly, the user can not only perform an accurate pointing operation at a time of command execution, but also directly operate an operation screen with small buttons created for operating a mouse of a PC, for example, and there is no need to rearrange the software for displaying the operation screen.

Also, in the fifth embodiment, the user can operate the display apparatus, including an operation of the pointer Pin a noncontact manner. Thus, the user can perform an operation in a noncontact manner, even when the user's hand is dirty, or in a work environment in which hygiene is prioritized and the user's hand is not to be dirty, for example.

Further, in the fifth embodiment, the user can execute a command by moving his or her hand, regardless of the shapes of the fingers. Because of this, there is no need to memorize any specific finger gesture. Furthermore, in the fifth embodiment, the target to be detected by the detection device 21 is not necessarily the user's hand. Therefore, if the detection target is an object other than the user's hand, the user can perform an operation while holding something in the hand, for example.

Note that, as for the means described in the present disclosure for providing the user with an interface that gives a feeling of a mouse operation (a feeling close to a mouse operation) by using an aerial image as a guide, if the region for an operation can be presented to the user with the guide by the aerial image, an imaging optical system having a structure in which the beam splitter 202 and the retroreflective member 203 are combined is not necessarily used, and some other structure may be used as an imaging optical system that forms the aerial image.

Figure 28A:
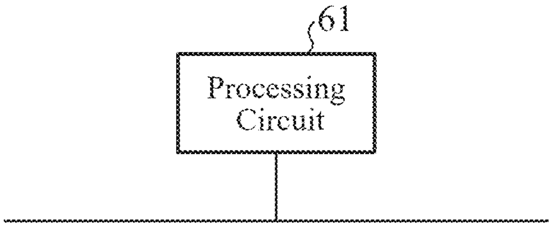
FIGS. 28A and 28B are diagrams illustrating examples of the hardware configuration of a device controller according to the fifth embodiment.
Figure 28B:
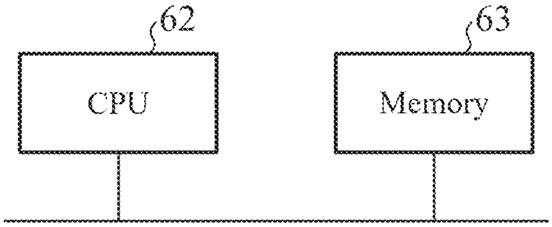

Next, an example of the hardware configuration of the device controller 12 included in the interface system 100 according to the fifth embodiment is described with reference to FIG. 28. Each function of the position acquiring unit 41, the operation space determining unit 43, the pointer operation information outputting unit 44, the command identifying unit 46, the command outputting unit 48, and the aerial image generating unit 50 in the device controller 12 is implemented by a processing circuit. The processing circuit may be dedicated hardware as illustrated in FIG. 28A, or may be a central processing unit (may also be referred to as a CPU, a central processing device, a processing unit, an arithmetic unit, a microprocessor, a microcomputer, a processor, or a digital signal processor (DSP)) 62 that executes a program stored in a memory 63 as illustrated in FIG. 28B.

In a case where the processing circuit is dedicated hardware, a processing circuit 61 is a single circuit, a composite circuit, a programmed processor, a parallel programmed processor, an application specific integrated circuit (ASIC), a field programmable gate array (FPGA), or a combination thereof, for example. Each of the functions of the position acquiring unit 41, the operation space determining unit 43, the pointer operation information outputting unit 44, the command identifying unit 46, the command outputting unit 48, and the aerial image generating unit 50 may be implemented by the processing circuit 61, or the functions of the respective components may be collectively implemented by the processing circuit 61.

In a case where the processing circuit is the CPU 62, the functions of the position acquiring unit 41, the operation space determining unit 43, the pointer operation information outputting unit 44, the command identifying unit 46, the command outputting unit 48, and the aerial image generating unit 50 are implemented by software, firmware, or a combination of software and firmware. Software and firmware are written as programs and are stored into the memory 63. The processing circuit reads and executes the programs stored in the memory 63, to implement the functions of the respective components. That is, the device controller 12 includes a memory for storing programs that lead to execution of each of the steps shown in FIGS. 12 to 15 and FIGS. 25 and 26, for example, when executed by the processing circuit. It can also be said that these programs cause a computer to implement procedures and methods to be carried out by the position acquiring unit 41, the operation space determining unit 43, the pointer operation information outputting unit 44, the command identifying unit 46, the command outputting unit 48, and the aerial image generating unit 50. Here, examples of the memory 63 include a nonvolatile or volatile semiconductor memory such as a random access memory (RAM), a read only memory (ROM), a flash memory, an erasable programmable ROM (EPROM), or an electrically EPROM (EEPROM), a magnetic disk, a flexible disk, an optical disk, a compact disc, a mini disc, and a digital versatile disc (DVD).

Note that some of the functions of the position acquiring unit 41, the operation space determining unit 43, the pointer operation information outputting unit 44, the command identifying unit 46, the command outputting unit 48, and the aerial image generating unit 50 may be implemented by dedicated hardware, and some other functions thereof may be implemented by software or firmware. For example, the functions of the position acquiring unit 41 can be implemented by a processing circuit as dedicated hardware, and the functions of the operation space determining unit 43, the pointer operation information outputting unit 44, the command identifying unit 46, the command outputting unit 48, and the aerial image generating unit 50 can be implemented by the processing circuit reading and executing the programs stored in the memory 63.

In such a manner, a processing circuit can implement each of the above functions with hardware, software, firmware, or a combination thereof.

Note that, in the example described above, the operation information outputting unit 51 outputs operation information for performing a predetermined operation on the display apparatus 1, using at least a space determination result from the operation space determining unit 43. However, the operation information outputting unit 51 is not limited to this, and may be designed to output operation information for performing a predetermined operation on an application displayed on the display apparatus 1, using at least a space determination result from the operation space determining unit 43. Here, an "application" includes an operating system (OS) or various kinds of software operating on the OS.

Also, an operation on an application may include various touch-panel operations to be performed with a fingertip, in addition to the above-described mouse operation. In this case, each operation space may correspond to at least one operation among a plurality of kinds of operations using a mouse or a touch panel on an application. Further, successive different operations for an application may be associated with adjacent operation spaces among the respective operation spaces.

Note that, like the above-described "operations having continuity", the successive different operations for an application refer to operations that are normally performed successively in terms of time, such as execution of a predetermined command to be executed after the user has moved the pointer P on a displayed application.

Note that, of the operation spaces, all the adjacent spaces may be associated with operations having continuity, or some of the adjacent operation spaces may be associated with operations having continuity. That is, the other adjacent operation spaces may be associated with operations having no continuity.

As described above, according to the fifth embodiment, the interface system 100 includes: the detection unit 21 that detects the three-dimensional position of a detection target in the virtual space K divided into a plurality of operation spaces; the position acquiring unit 41 that acquires the three-dimensional position of the detection target detected by the detection unit 21; the projection unit 20 that projects the aerial image S indicating the boundary position of each operation space in the virtual space K; the operation space determining unit 43 that determines the operation space in which the three-dimensional position of the detection target is included, on the basis of the three-dimensional position of the detection target acquired by the position acquiring unit 41 and the boundary position of each operation space in the virtual space K; and the operation information outputting unit 51 that outputs operation information for performing a predetermined operation on an application displayed on the display apparatus 1, using at least a determination result from the operation space determining unit 43. In the interface system 100, each operation space corresponds to at least one operation among a plurality of kinds of operations using a mouse or a touch panel for an application, and adjacent operation spaces among the respective operation spaces are associated with successive different operations for the application. Thus, in the interface system 100 according to the fifth embodiment, it is possible to visually recognize the boundary positions of the plurality of the operation spaces constituting the virtual space K to be operated by the user.

Sixth Embodiment

In a sixth embodiment, as another example configuration of the interface device 2, an interface device 2 capable of controlling the spatial position relationship of an aerial image with respect to the projection device 20 is described.

Figure 29:
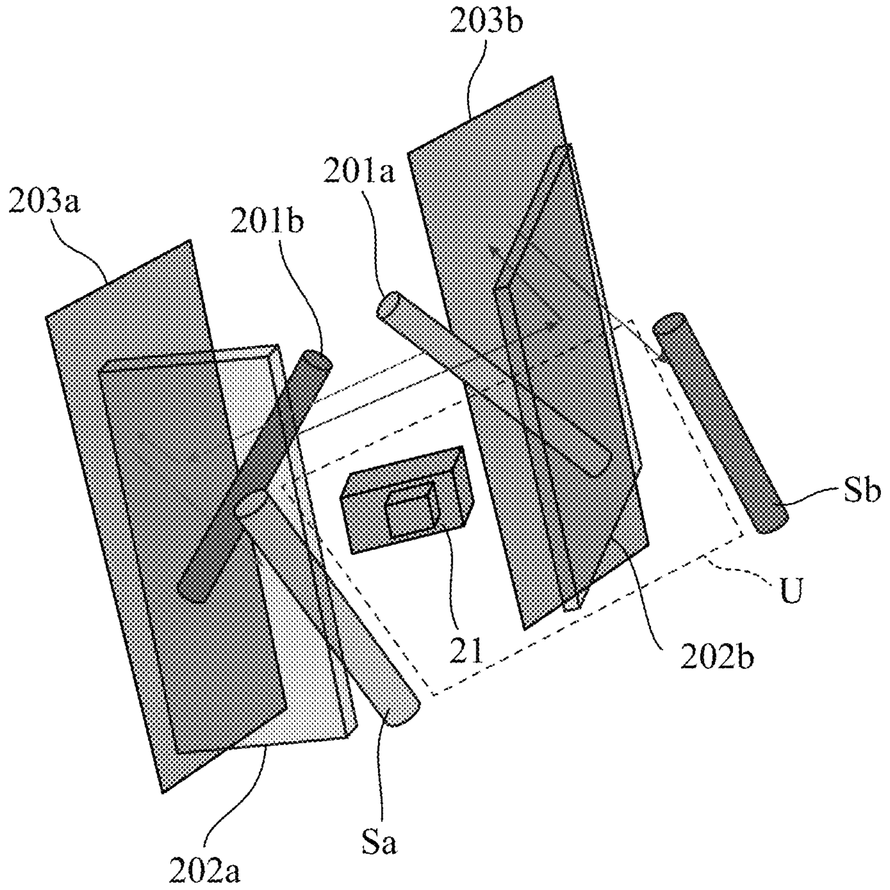
FIG. 29 is a perspective view illustrating an example layout of a projection device and a detection device in an interface device according to a sixth embodiment.
Figure 30:
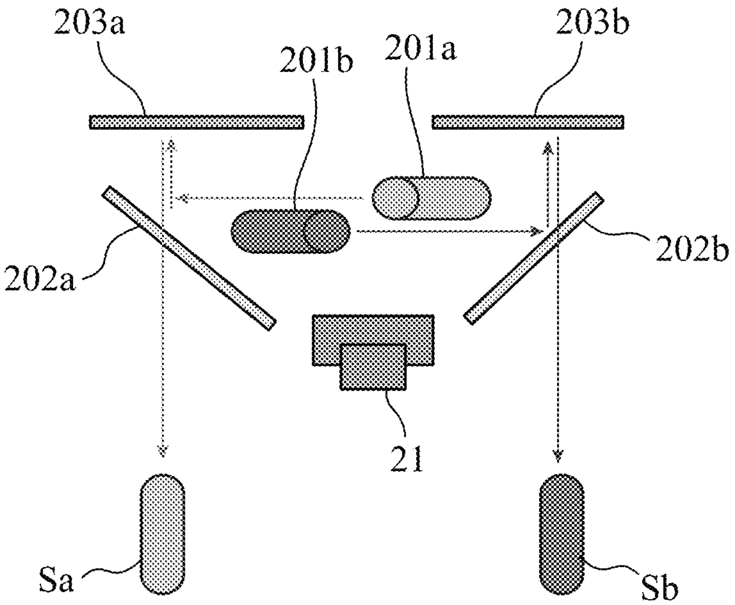
FIG. 30 is a top view illustrating an example layout of the projection device and the detection device in the interface device according to the sixth embodiment.
Figure 31:
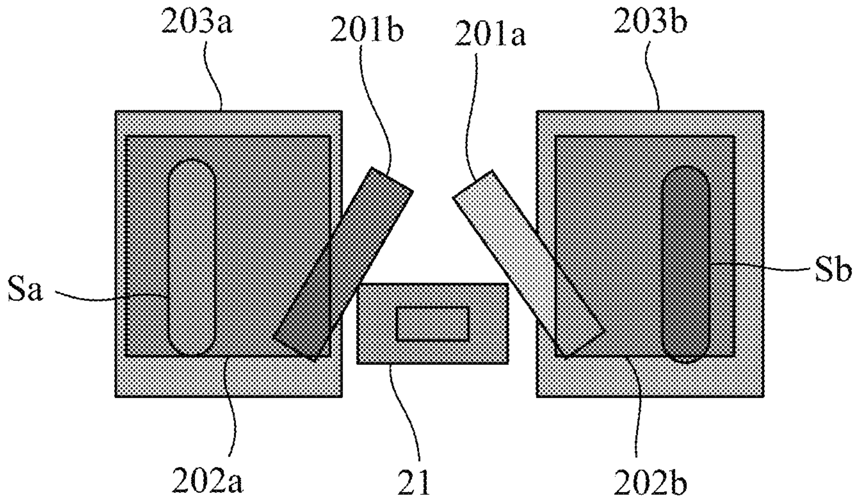
FIG. 31 is a front view illustrating an example layout of the projection device and the detection device in the interface device according to the sixth embodiment.

FIG. 29 is a perspective view illustrating an example layout of the projection device 20 and the detection device 21 in the interface device 2 according to the sixth embodiment. Also, FIG. 30 is a top view illustrating an example layout of the projection device 20 and the detection device 21 in the interface device 2 according to the sixth embodiment. Further, FIG. 31 is a front view illustrating an example layout of the projection device 20 and the detection device 21 in the interface device 2 according to the sixth embodiment.

In the interface device 2 according to the sixth embodiment, the beam splitter 202 is divided into two beam splitters 202*a* and 202*b*, and the retroreflective member 203 is divided into two retroreflective members 203*a* and 203*b*, as in the interface device 2 according to the second embodiment illustrated in FIG. 6. Further, the interface device 2 according to the sixth embodiment differs from the interface device 2 according to the second embodiment illustrated in FIG. 6, in that the light source 201 is also divided into two light sources 201*a* and 201*b*.

Also, an aerial image Sa is projected onto a virtual space K (a space on the front side in the drawing in FIG. 29) by a first imaging optical system including the light source 201*a*, the beam splitter 202*a*, and the retroreflective member 203*a*, and an aerial image Sb is projected onto the virtual space K by a second imaging optical system including the light source 201*b*, the beam splitter 202*b*, and the retroreflective member 203*b*. That is, the two divided light sources, the two divided beam splitters, and the two divided retroreflective members are in a correspondence relationship, the light source 201*a*, the beam splitter 202*a*, and the retroreflective member 203*a* correspond to one another, and the light source 201*b*, the beam splitter 202*b*, and the retroreflective member 203*b* correspond to one another.

Note that the principles of projection (image formation) of aerial images by the first imaging optical system and the second imaging optical system are the same as those of the second embodiment. For example, light (diffused light) emitted from the light source 201*a* is specularly reflected on the surface of the beam splitter 202*a*, and the reflected light enters the retroreflective member 203*a*. The retroreflective member 203*a* retroreflects the incident light, and causes the incident light to reenter the beam splitter 202*a*. The light that has entered the beam splitter 202*a* passes through the beam splitter 202*a*, and reaches the user. By following the optical path, the light emitted from the light source 201*a* then reconverges and rediffuses at a position plane-symmetrical with the light source 201*a*, with the beam splitter 202*a* serving as the boundary. Thus, the user can perceive the aerial image Sa in the virtual space K.

Likewise, light (diffused light) emitted from the light source 201*b* is specularly reflected on the surface of the beam splitter 202*b*, and the reflected light enters the retroreflective member 203*b*. The retroreflective member 203*b* retroreflects the incident light, and causes the incident light to reenter the beam splitter 202*b*. The light that has entered the beam splitter 202*b* passes through the beam splitter 202*b*, and reaches the user. By following the optical path, the light emitted from the light source 201*b* then reconverges and rediffuses at a position plane-symmetrical with the light source 201*b*, with the beam splitter 202*b* serving as the boundary. Thus, the user can perceive the aerial image Sb in the virtual space K.

Further, in the interface device 2 according to the sixth embodiment, the detection device 21 may be disposed inside the projection device 20, or may be disposed outside the projection device 20, as in the interface device 2 according to the second embodiment. Note that FIGS. 29 and 30 illustrate an example case where the detection device 21 is disposed inside the first imaging optical system and the second imaging optical system included in the projection device 20, and, more particularly, illustrate an example case where the detection device 21 is disposed in a region interposed between the two light sources 201*a* and 201*b* and the two beam splitters 202*a* and 202*b*.

Further, at this point of time, the angle of view of the detection device 21 is set within a region in which the aerial images Sa and Sb projected by the projection device 20 do not appear, as in the second embodiment. In particular, the angle of view is set within an internal region U defined by the two aerial images Sa and Sb.

Also, the light source 201*a* and the light source 201*b* are arranged in a spatially non-parallel manner, and the aerial images Sa and Sb formed by the first imaging optical system and the second imaging optical system are formed in such a way as to have a spatially parallel relationship.

More specifically, the light source 201*a* and the light source 201*b* are arranged in such a manner that the axes in the spaces formed by the respective light sources are not parallel. In the case of a bar-like light source, for example, the axis in the space formed by the light source is an axis that penetrates the centers of both end surfaces of the light source in the extending direction of the light source.

Note that, although an example in which each light source is formed in a bar (rod)-like shape has been described herein, the respective light sources are arranged in such a manner that the planes (radiation planes) in the spaces formed by the respective light sources are not parallel to each other in a case where each light source is not formed in a bar (rod)-like shape but is formed in a shape having a radiation plane for emitting light. Also, at this point of time, the aerial images Sa and Sb are formed in such a way as to be parallel to each other on the boundary plane, which is any plane in the virtual space K.

The light sources 201*a* and 201*b*, and the aerial images Sa and Sb can be arranged in this manner for the following reasons. That is, in the interface device 2, the aerial images Sa and Sb are formed at positions plane-symmetrical with the light sources 201*a* and 201*b*, with the beam splitters 202*a* and 202*b* serving as spatially symmetrical axes. Accordingly, while being separated, the respective imaging optical systems form light from different light sources into aerial images, so that the aerial images Sa and Sb can be formed parallel to each other at positions closer to the user while the positions of the optical members (light source 201*a* and 201*b*) are not parallel to each other.

Figure 32:
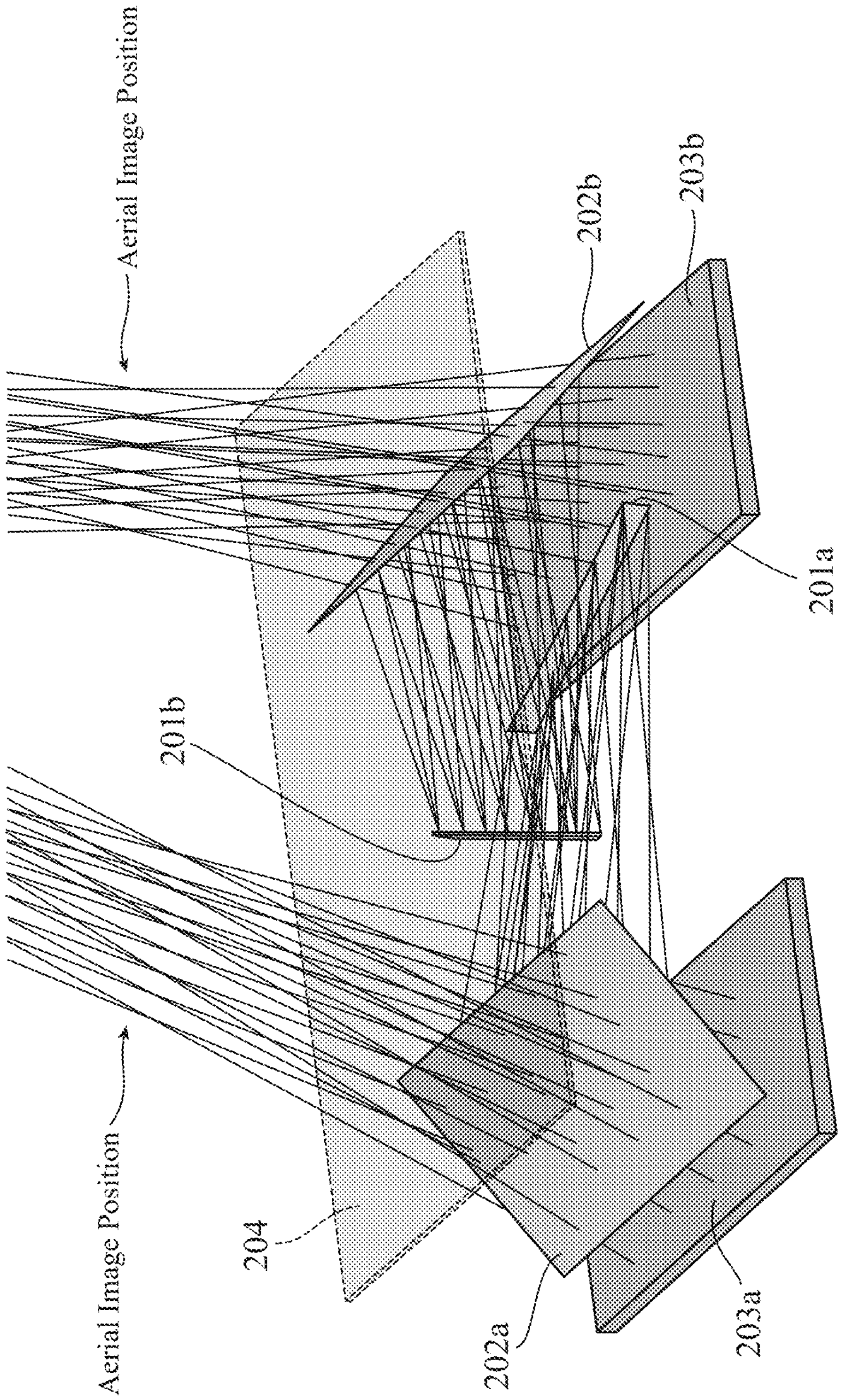
FIG. 32 is a diagram for supplementing the layout relationships between light sources and aerial images in the sixth embodiment.

Note that FIG. 32 is a diagram for supplementing the above-described layout relationship between the light sources 201*a* and 201*b* and the aerial images Sa and Sb. Note that, in FIG. 32, a cover glass 204 is shown in the vicinity of the beam splitters 202*a* and 202*b* for convenience, but the cover glass 204 is not shown in the other drawings. Therefore, in FIG. 32, the cover glass 204 is indicated by dashed lines.

Further, in the interface device 2 according to the sixth embodiment, by changing the layout relationships and the angles between the light source 201*a* and the beam splitter 202*a*, and between the light source 201*b* and the beam splitter 202*b*, it is possible to control the spatial position relationship of the aerial images Sa and Sb with respect to the projection device 20, and form boundary planes that allow the user to easily perform spatial operations.

For example, as illustrated in FIG. 31, the two light sources 201*a* and 201*b* are arranged in such a way as to have a chevron shape when viewed from the front, so that the aerial images Sa and Sb are formed at an angle at which the aerial images Sa and Sb appear as if to protrude forward from the upper end side to the lower end side (see also FIG. 29).

Also, the two light sources 201*a* and 201*b* are designed to be capable of changing the postures when arranged. As the degree of opening between the two light sources when viewed from the front is increased (the two light sources are arranged to be almost horizontal), the aerial images Sa and Sb are formed in such a manner that the lower end sides appear as if to protrude forward with respect to the upper end side. That is, as the degree of opening between the two light sources when viewed from the front is increased (the two light sources are arranged to be almost horizontal), the postures of the aerial images Sa and Sb change, and the angle between the boundary plane on which the aerial images Sa and Sb are projected and the horizontal plane changes.

Note that, in the interface device 2, the layout relationships and the angles between the light source 201*a* and the beam splitter 202*a*, and between the light source 201*b* and the beam splitter 202*b* may be changed manually or automatically by control. Also, at this point of time, in the interface device 2, the light sources 201*a* and 201*b* may be moved to change the above layout relationships and angles, the beam splitters 202*a* and 202*b* may be moved to change the above layout relationships and angles, or both the light sources 201*a* and 201*b* and the beam splitters 202*a* and 202*b* may be moved to change the above layout relationships and angles.

For example, the user manually adjusts the above layout relationships and angles, and controls the spatial position relationships between the boundary planes formed by the aerial images Sa and Sb and the projection device 20. In this manner, the user can adjust the boundary planes that the user can easily operate, depending on the environment in which the interface device 2 is actually installed. Also, this adjustment can be performed after the installation of the interface device 2, which is very convenient for the user. For example, the user can adjust the boundary planes that the user can easily operate. Thus, operability becomes higher, and the user can easily perform various operations (such as pointer moving, pointer fixing, a left click, and a right click) as described in the fifth embodiment.

Furthermore, in a case where the above layout relationships and angles are automatically adjusted, the interface device 2 acquires the position information about the user and the position information about the detection target (the user's hand, for example) with the detection device 21, changes the layout relationships and angles on the basis of the acquired information, and controls the positions of the boundary planes to be formed by the aerial images Sa and Sb. By doing so, the interface device 2 can provide boundary planes that are easy for an individual user to operate even in an environment where an unspecified number of users operate the device. Further, the user can also perform spatial operations using the boundary planes that are easy for the user to operate, and can easily perform various operations (such as pointer moving, pointer fixing, a left click, and a right click) as described in the fifth embodiment.

Note that, in the interface device 2 according to the sixth embodiment, the angle of view of the detection device 21 is also set in a region in which the aerial images Sa and Sb projected by the projection device 20 do not appear, and thus, the decrease in the resolution of the aerial images Sa and Sb is reduced.

Also, in the above description, an example in which an imaging optical system includes a beam splitter and a retroreflective member has been described. However, the configuration of an imaging optical system is not limited to this. For example, an imaging optical system may include a two-sided corner reflector array element as described in the second embodiment. In this case, in the interface device 2, the retroreflective members 203*a* and 203*b* may be omitted in FIG. 29, and a two-sided corner reflector array element may be disposed at each of the positions at which the beam splitters 202*a* and 202*b* are arranged.

As described above, according to the sixth embodiment, the interface device 2 includes two or more light sources. The respective light sources are arranged in such a manner that at least either the axes or the planes in the spaces to be formed by the respective light sources are not parallel. The beam splitter 202 and the retroreflective member 203 form a pair form real images as the aerial images Sa and Sb. The aerial images Sa and Sb are formed in parallel to each other on planes onto which the aerial images are projected in the virtual space K. Thus, in addition to achieving the effects of the second embodiment, the interface device 2 according to the sixth embodiment can easily control the spatial position relationship between the projection device 20 and the aerial images Sa and Sb.

Further, the posture of each light source is variable. When the posture of each light source is changed, the posture of each aerial image changes, and the angles formed by the boundary planes onto which the respective aerial images are projected with respect to the horizontal plane changes. As a result, operability increases for the user in the interface device 2 according to the sixth embodiment.

Seventh Embodiment

In each of the first to sixth embodiments, the interface device 2 formed independently of the display 10 in the display apparatus 1 has been described. In a seventh embodiment, an interface device 2 integrated with the display 10 in the display apparatus 1 is described.

Figure 33:
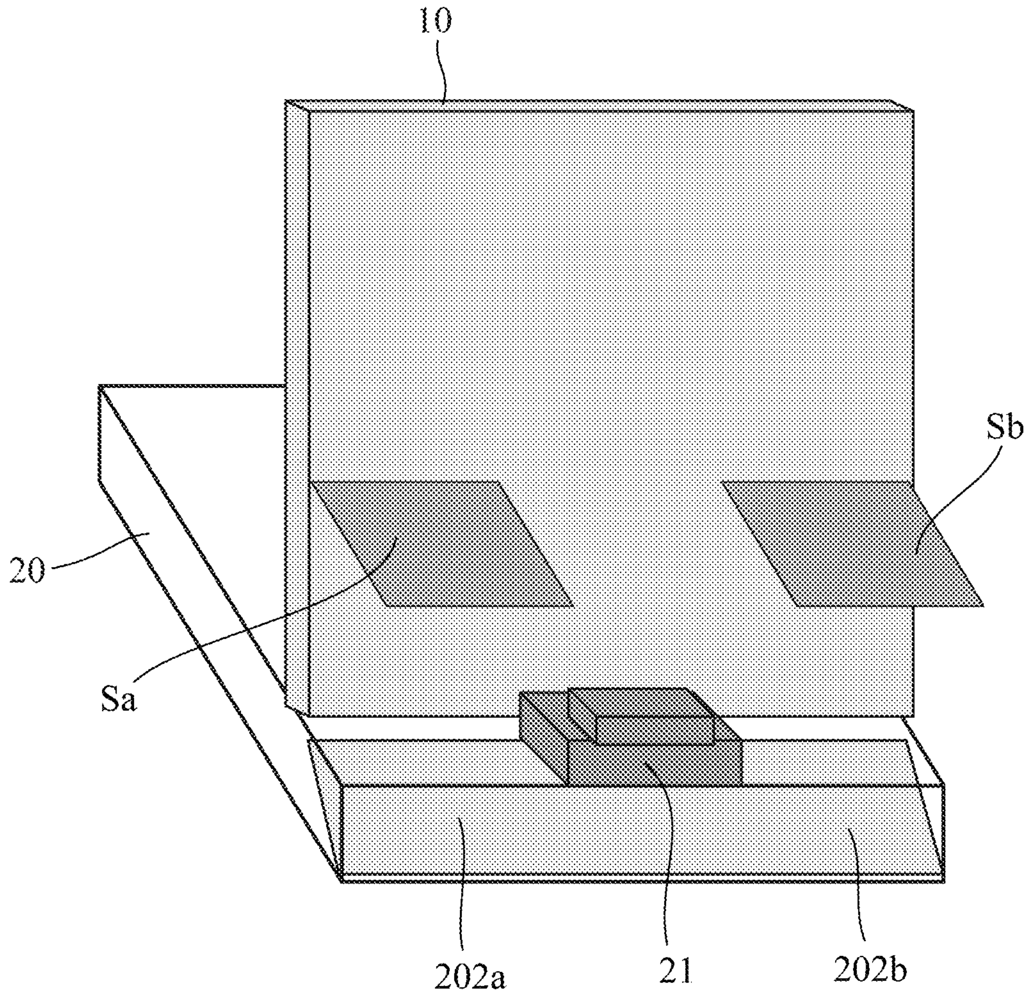
FIG. 33 is a perspective view illustrating an example configuration of an interface device according to a seventh embodiment.
Figure 34:
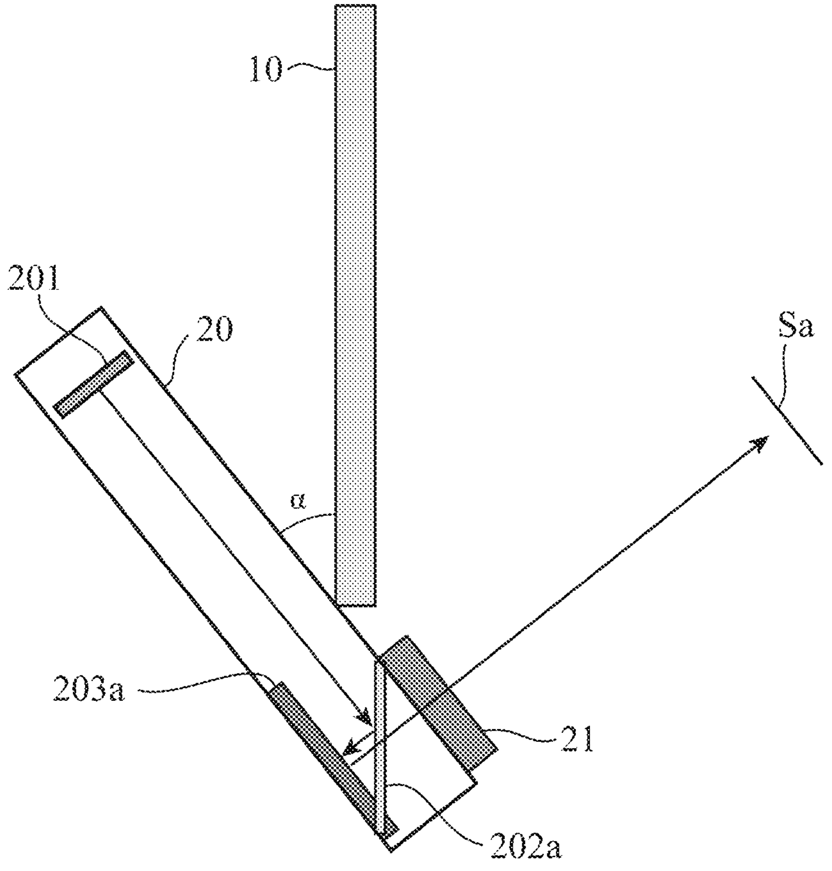
FIG. 34 is a side view illustrating an example configuration of the interface device according to the seventh embodiment.

FIG. 33 is a perspective view illustrating an example configuration of the interface device 2 according to the seventh embodiment, and is a perspective view illustrating an example of the layout of the display 10 and the interface device 2 (the projection device 20 and the detection device 21). Further, FIG. 34 is a side view illustrating an example configuration of the interface device 2 according to the seventh embodiment, and is a side view illustrating an example of the layout of the display 10 and the interface device 2 (the projection device 20 and the detection device 21).

The display 10 in the seventh embodiment is a device that displays a digital video signal, such as a liquid crystal display and a plasma display, as in the first embodiment. In the interface device 2 according to the seventh embodiment, the display 10, the projection device 20, and the detection device 21 are fixed in such a way as to be integrated. Note that the display 10, the projection device 20, and the detection device 21 can be integrated by various methods. As an example, a fixing jig that accompanies the display 10 and is compliant with the Video Electronics Standards Association (VESA) standard may be applied, for example, and the projection device 20 and the detection device 21 may be mounted on the display 10 to be integrated therewith.

As illustrated in FIG. 33, for example, the detection device 21 is disposed near the substantial center in the width direction (left-right direction) of the display 10. Further, the projection device 20 includes a light source 201, two beam splitters 202*a* and 202*b*, and two retroreflective members 203*a* and 203*b*, as in the second embodiment. As illustrated in FIGS. 33 and 34, for example, the projection device 20 is disposed from the front to the back of the lower portion of display 10 (from the front side to the back side), to project aerial images Sa and Sb from the lower portion toward the front (front side) of the display 10.

In this case, as illustrated in FIG. 33, for example, the beam splitter 202*a* and the retroreflective member 203*a*, which correspond to each other, are arranged below the display 10 and on the left side of the detection device 21 in the width direction (left-right direction) of the display 10, and the beam splitter 202*b* and the retroreflective member 203*b*, which correspond to each other, are arranged below the display 10 and on the right side of the detection device 21 in the width direction (left-right direction) of the display 10. Further, as illustrated in FIG. 34, for example, the light source 201 is disposed behind the beam splitters 202*a* and 202*b* and the retroreflective members 203*a* and 203*b* in the housing of the projection device 20. Thus, the aerial image Sa is projected planarly in the space on the left side of the detection device 21 in the width direction (left-right direction) of the display 10, and the aerial image Sb is projected planarly in the space on the right side of the detection device 21 in the width direction (left-right direction) of the display 10. In this case, the two aerial images Sa and Sb are included in the same plane in the spaces, and the plane including these aerial images Sa and Sb indicates the boundary (boundary plane) of each operation space in the virtual space K.

Also, in this case, the larger the space between the light source 201 and the beam splitters 202*a* and 202*b*, the longer the imaging distance from the projection device 20 to the aerial images Sa and Sb. Therefore, in the projection device 20, a convex lens may be disposed between the light source 201 and the beam splitters 202*a* and 202*b*, to extend the imaging distance from the projection device 20 to the aerial images Sa and Sb. Further, a mirror surface is disposed between the light source 201 and the beam splitters 202*a* and 202*b*, to bend the linear optical path. In this manner, the shape of the housing of the projection device 20 can be changed, and the versatility of spatial installation of the projection device 20 can be increased.

The aerial images Sa and Sb projected by the projection device 20 are visually recognized by the user, together with video information displayed on the display 10. On the other hand, if the beam splitters 202*a* and 202*b* are not installed in the depth direction of the aerial images Sa and Sb on the light beams that allow the aerial images Sa and Sb to be visually recognized from the viewpoint position of the user, the user cannot visually recognize the aerial images Sa and Sb. Therefore, in order for the user to visually recognize the aerial images Sa and Sb and the video information obtained from the display 10 within the same visual field, it is necessary to adjust the layout of the projection device 20 and its internal structure.

For example, in the interface device 2, the angle (a shown in FIG. 34) between the entire projection device 20 and the display 10 when the interface device 2 is viewed from a side may be changed. In this manner, adjustment may be performed in such a way that the beam splitters 202*a* and 202*b* are positioned in the depth direction of the aerial images Sa and Sb on the light beams with which the aerial images Sa and Sb can be visually recognized from the viewpoint position of the user, and adjustment may be performed in such a way that the user can visually recognize the video information from the display 10 and the aerial images Sa and Sb within the same visual field.

Also, in the interface device 2, the distance between the light source 201 and the beam splitters 202*a* and 202*b*, or the layout angle of the beam splitters 202*a* and 202*b* may be changed, and the imaging positions of the aerial images Sa and Sb may be changed. In this manner, adjustment may be performed in such a way that the beam splitters 202*a* and 202*b* are positioned in the depth direction of the aerial images Sa and Sb on the light beams with which the aerial images Sa and Sb can be visually recognized from the viewpoint position of the user, and adjustment may be performed in such a way that the user can visually recognize the video information from the display 10 and the aerial images Sa and Sb within the same visual field.

Note that the above-described function of adjusting the imaging positions of the aerial images Sa and Sb may be achieved by manually adjusting the mechanical fixing positions of components (the light source 201, the beam splitter 202, and the like) of the projection device 20, for example, or may be implemented by mounting a control mechanism such as a stepping motor on the fixing jig for the components and electronically controlling the fixing positions of the components.

Further, in a case where the fixing positions of the above components are electronically controlled as in the latter case, the interface device 2 may include a control unit (not shown in the drawings) that acquires information indicating the viewpoint position of the user from a result of detection performed by the detection device 21, advance parameter information, and the like, and automatically adjusts the fixing positions of the components, using the acquired information.

Furthermore, the control unit may adjust the fixing positions of the above components as appropriate, to change not only the imaging positions of the aerial images Sa and Sb but also the angle at which the boundary planes indicated by the aerial images Sa and Sb spatially intersect with the display plane of the display 10. For example, the control unit may adjust the fixing positions of the above components as appropriate, to move the boundary planes indicated by the aerial images Sa and Sb to be almost horizontal, and change the angle at which the boundary planes spatially intersect with the display plane of the display 10 to an angle close to a right angle (90 degrees).

Conversely, the control unit may also adjust the fixing positions of the above components as appropriate, to move the boundary planes indicated by the aerial images Sa and Sb to be almost vertical, and change the angle at which the boundary planes spatially intersect with the display plane of the display 10 to be almost parallel (0 degrees). As a result, in the interface device 2, it is possible to control the spatial position relationships of the aerial images Sa and Sb with respect to the display plane of the display 10, and it is possible to provide boundary planes that are easy for the user to operate.

Note that, in the interface device 2 according to the seventh embodiment, the angle of view of the detection device 21 is also set in a region in which the aerial images Sa and Sb projected by the projection device 20 do not appear, and thus, the decrease in the resolution of the aerial images Sa and Sb is reduced.

Also, in the above description, an example in which the imaging optical system includes the beam splitters 202*a* and 202*b* and the retroreflective members 203*a* and 203*b* has been described. However, the configuration of the imaging optical system is not limited to this. For example, an imaging optical system may include a two-sided corner reflector array element as described in the second embodiment. In this case, in the interface device 2, the retroreflective member 203*a* may be omitted in FIG. 34, and a two-sided corner reflector array element may be disposed at the position at which the beam splitter 202*a* is disposed.

As described above, in the interface device 2 according to the seventh embodiment, the projection device 20 and the detection device 21 are integrated with the display 10. Thus, the user can visually recognize video information from the display 10 and the aerial images Sa and Sb projected by the projection device 20 within the same visual field. In such a layout, there is an advantage that, in a spatial operation of the interface device 2, the user can visually recognize the other visual information, even if the user is conscious of only either visual feedback information for the spatial operation or the visual information displayed on the display 10. Also, the possibility of overlooking visual information can be lowered for the user who experiences a new spatial operation, the user's acceptability of spatial operations is increases, and the user can intuitively and quickly understand a spatial operation.

Note that, in the example described so far, the interface device 2 has the above configuration. However, the interface system 100 described in the fifth embodiment may have the above configuration. In that case, the user of the interface system 100 can also visually recognize the video information from the display 10 and the aerial images Sa and Sb projected by the projection device 20 within the same visual field, and can control the spatial position relationships of the aerial images Sa and Sb with respect to the display surface of the display 10. Thus, the user can obtain boundary planes that are easy for the user to operate.

As described above, according to the seventh embodiment, the interface device 2 integrally includes the display 10 that displays video information, and the aerial images Sa and Sb projected by the projection unit 20 can be visually recognized by the user, together with the video information displayed on the display 10. Thus, in addition to achieving the effects of the first embodiment, the interface device 2 according to the seventh embodiment can lower the possibility that the user will overlook visual feedback information about a spatial operation and video information.

Furthermore, the interface device 2 includes a control unit that changes the angle at which the boundary planes, which are the planes on which the aerial images Sa and Sb are projected in the virtual space K, spatially intersect with the display plane of the display 10. Thus, the interface device 2 according to the seventh embodiment can control the spatial position relationships of the aerial images Sa and Sb with respect to the display plane of the display 10, and provide boundary planes that are easy for the user to operate.

Also, according to the seventh embodiment, the interface system 100 includes: the detection unit 21 that detects the three-dimensional position of a detection target in the virtual space K; the projection unit 20 that projects an aerial image onto the virtual space K; and the display 10 that displays video information. The virtual space K is divided into a plurality of operation spaces, and, in each of the operation spaces, an operation that can be performed by the user in a case where the three-dimensional position of the detection target detected by the detection unit 21 is included therein is defined. The boundary positions of the respective operation spaces in the virtual space K are indicated by aerial images projected by the projection unit 20. The aerial images projected by the projection unit 20 can be visually recognized by the user, together with the video information displayed on the display 10. Thus, in addition to achieving the effects of the fifth embodiment, the interface system 100 according to the seventh embodiment can lower the possibility that the user will overlook visual feedback information about a spatial operation and video information.

Further, the interface system 100 includes a control unit that changes the angle at which the boundary planes, which are the planes on which aerial images are projected in the virtual space K, spatially intersect with the display plane of the display 10. Thus, the interface system 100 according to the seventh embodiment can control the spatial position relationships of the aerial images Sa and Sb with respect to the display plane of the display 10, and provide boundary planes that are easy for the user to operate.

Eighth Embodiment

In the above description, the interface device 2 or the interface system 100 that indicates the boundary positions of the respective operation spaces in the virtual space K with the aerial images projected by the projection unit 20 has been described. In an eighth embodiment, an interface device 2 or an interface system 100 capable of indicating the boundary position of each operation space not with an aerial image is described.

For example, the interface device 2 according to the eighth embodiment is designed as follows.

The interface device 2 that enables an operation of an application displayed on a display, the interface device 2 including:

- a detection unit 21 that detects the three-dimensional position of a detection target in a virtual space K divided into a plurality of operation spaces,
- at least one boundary defining unit (not shown in the drawing) that indicates a boundary of each operation space and includes a line or a plane; and
- a boundary display unit (not shown in the drawing) that provides at least one visible boundary of each operation space, and includes a point, a line, or a plane. In the interface device 2,
- in a case where the three-dimensional position of the detection target detected by the detection unit 21 is included in the virtual space K, the detection target is enabled to perform a plurality of kinds of operations for the application, the operations being associated with the respective operation spaces.

The boundary defining unit defines the virtual space K, which is an interface provided by the interface device 2 or the interface system 100 to allow the user to operate applications, and the boundary of each operation space, and enables software control for interlocking a user operation and an application operation by determining various user operations after defining each boundary.

In other words, as the interface device 2 or the interface system 100 defines the virtual space K and the boundary of each operation space, it is possible to associate information about various user operations acquired by associating a detection target present in the virtual space K and the position or movement of the detection target with each operation space and detecting the detection target, or detecting movement of the detection target crossing each operation space or moving out of the virtual space K, with an operation of an application desired by the user, and interlock the information and the operation of the application.

The boundary display unit arranges the respective boundaries that are defined in the virtual space K and the respective operation spaces to be provided as interface means for the user by the interface device 2 or the interface system 100, and are to be visually recognized by the user who is to operate an application.

Figure 35:
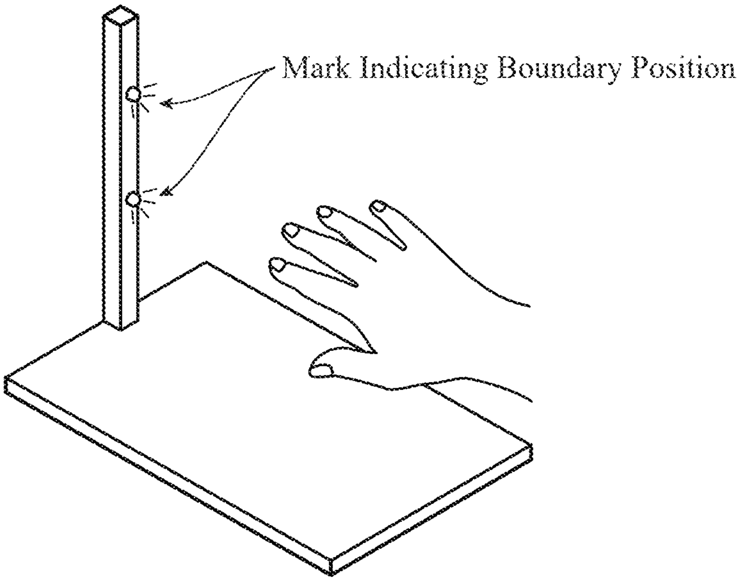
FIG. 35 is a perspective view illustrating an example configuration of a boundary display unit in an eighth embodiment.

Specifically, as illustrated in FIG. 35, for example, there is a method for installing one or a plurality of pillars on which marks indicating the boundary positions of the respective operation spaces are applied, the pillars indicating the upper and lower ranges of the virtual space K, or displaying an aerial image indicating the virtual space K and the respective boundaries of the respective operation spaces in a space. The above-mentioned marks indicating the boundary positions can be coloring, LEDs, or unevenness provided as points or lines, for example.

Also, one or a plurality of indicators indicating the boundaries can be provided for the same boundary, or the shape thereof can be a point or a line in such a way that the user can recognize the virtual space K and each boundary of each operation space.

That is, the interface device 2 or the interface system 100 that indicates the boundary positions of the respective operation spaces in the virtual space K mainly with aerial images projected by the projection unit 20 has been so far. However, the interface device 2 or the interface system 100 does not necessarily project aerial images, as long as the user can visually recognize the boundary positions of the respective operation spaces. Therefore, in the eighth embodiment, the interface device 2 or the interface system 100 provides at least one visually recognizable boundary of each operation space including a point, a line, or a plane, instead of an aerial image. In this case, the user can also visually recognize the boundary positions of the plurality of operation spaces constituting the virtual space K to be operated.

Note that, in the eighth embodiment, the boundary display unit may include the projection unit 20 that projects aerial images onto the virtual space K. Also, in this case, the boundary positions of the respective operation spaces in the virtual space K are indicated by aerial images projected by the projection unit 20, and the aerial images projected by the projection unit 20 may be visually recognizable by the user, together with the video information displayed on the display 10. Note that the configuration in this case is substantially the same as the configuration of the interface device 2 according to the seventh embodiment described above.

For example, displaying aerial images to indicate the boundary of each operation space rather than displaying an object other than aerial images to indicate the boundary of each operation space has an advantage that there is no problem in disposing a display object near the operation spaces forming the field of the interface (gesture), and the display object is less likely to be an obstacle to the user's operation. Therefore, in a case where it is desired to actively enjoy these advantages, it is desirable to form the boundary display unit with the projection unit 20 that projects aerial images onto the virtual space K as described above.

As described above, according to the eighth embodiment, the interface device 2 is the interface device 2 that allows an operation of an application displayed on a display, and includes: the detection unit 21 that detects the three-dimensional position of a detection target in the virtual space K divided into a plurality of operation spaces; at least one boundary defining unit that indicates the boundary of each operation space and is formed with a line or a plane; and a boundary display unit that provides at least one visually recognizable boundary of the respective operation spaces and is formed with a point, a line, or a plane. In a case where the three-dimensional position of the detection target detected by the detection unit 21 is included in the virtual space K, the interface device 2 allows the detection target to perform a plurality of kinds of operations on the application associated with each operation space. Thus, in the interface device 2 according to the eighth embodiment, it is possible to visually recognize the boundary positions of the plurality of operation spaces constituting the virtual space to be operated by the user.

Also, the boundary display unit is the projection unit 20 that projects aerial images onto the virtual space K, the boundary positions of the respective operation spaces in the virtual space K are indicated by the aerial images projected by the projection unit 20, and the aerial images projected by the projection unit 20 are visually recognizable by the user, together with the video information displayed on the display 10. Thus, in the interface device 2 according to the eighth embodiment, there is no problem of disposing a display object near the operation spaces forming the field of the interface (gesture), and the display object is less likely to be an obstacle to the user's operation.

Note that, to supplement the correspondence relationship between the boundary display unit and the boundary defining unit in the eighth embodiment and the functional units described in the other embodiments, the boundary display unit in the eighth embodiment corresponds to the projection device (projection unit) 20 described in the first embodiment and others, for example. Also, the boundary defining unit in the eighth embodiment corresponds to the position acquiring unit 41, the operation space determining unit 43, the pointer position controlling unit 45, the command generating unit 49, and the operation information outputting unit 51 described in the fifth embodiment, for example.

Note that, in the present disclosure, it is possible to freely combine the respective embodiments, modify any of the components of the respective embodiments, or omit any of the components in the respective embodiments.

For example, in the first to fourth embodiments, the sixth embodiment, and the seventh embodiment, the angle of view of the detection unit 21 is set in a region in which the aerial images Sa and Sb indicating boundary positions between the operation space A and the operation space B in the virtual space K do not appear. However, as described in the first embodiment, in a case where an aerial image that does not indicate any of the boundary positions of the respective operation spaces in the virtual space K is projected onto the virtual space K, it is not always necessary to prevent this aerial image from appearing in the angle of view of the detection unit 21.

For example, in the operation space B, the aerial image SC (see FIG. 3) indicating the lower limit position in the region detectable by the detection unit 21 is projected by the projection unit 20 in some cases. Note that this aerial image SC is projected in the vicinity of the center position in the X-axis direction in the operation space B and indicates the lower limit position, and may also serve as the reference for the left and right designations when the user moves his or her hand in the operation space B with the movement corresponding to a command that requires a left click, a right click, and the like. Not indicating any of the boundary positions of the respective operation spaces in the virtual space K, such an aerial image SC is not necessarily prevented from appearing within the angle of view of the detection device 21.

Further, the projection device 20 may change the projection mode of the aerial images projected onto the virtual space K, depending on at least either the operation space in which the three-dimensional position of the detection target (the user's hand, for example) detected by the detection device 21 is included, or the movement of the detection target in the operation space in which the three-dimensional position of the detection target is included. Furthermore, at this point of time, the projection device 20 may change the projection mode of the aerial images projected onto the virtual space K in units of pixels of the aerial images.

For example, the projection device 20 may change the color or the luminance of the aerial images to be projected onto the virtual space K, depending on whether the operation space in which the three-dimensional position of the detection target detected by the detection device 21 is included is the operation space A or the operation space B. Furthermore, at this point of time, the projection device 20 may change the color or the luminance of an entire aerial image (all the pixels of the aerial image) identically, or may change the color or the luminance of any portion of the aerial image (any of the pixels of the aerial image). Note that the projection device 20 can increase variations in the projection mode of an aerial image, such as adding desired gradation to the aerial image, by changing the color or the luminance of any portion of the aerial image.

Also, the projection device 20 may cause an aerial image projected onto the virtual space K to blink a desired number of times, depending on whether the operation space in which the three-dimensional position of the detection target detected by the detection device 21 is included is the operation space A or the operation space B. Furthermore, at this point of time, the projection device 20 may cause the entire aerial image (all the pixels of the aerial image) to blink identically, or may cause any portion of the aerial image (any of the pixels of the aerial image) to blink. With a change in the projection mode as described above, the user can easily understand in which operation space the three-dimensional position of the detection target is included.

Further, the projection device 20 may change the color or the luminance of an aerial image projected onto the virtual space K, or cause the aerial image to blink a desired number of times, depending on the movement (gesture) of the detection target in the operation space B, for example. At this point of time, the projection device 20 may also change the color or the luminance of the entire aerial image (all the pixels of the aerial image) identically or cause the entire aerial image to blink, or may change the color or the luminance of any portion of the aerial image (any of the pixels of the aerial image) or cause any portion of the aerial image to blink. Thus, the user can easily grasp the movement (gesture) of the detection target in the operation space B.

Further, a "change in the projection mode of an aerial image" herein also includes projection of the aerial image SC indicating the lower limit position of the region detectable by the detection device 21 as described above. That is, in a case where the operation space including the three-dimensional position of the detection target detected by the detection device 21 is the operation space B, the projection device 20 may project the aerial image SC indicating the lower limit position of the region detectable by the detection device 21 as described above as an example of a change in the projection mode of an aerial image. Also, as described above, the aerial image SC indicating the lower limit position of the detectable range may be projected within the angle of view of the detection device 21. Thus, the user can easily grasp how much he or she may lower his or her hand in the operation space B, and can execute a command that requires right or left designation.

According to the present disclosure, the operation information outputting unit 51 included in the interface system 100 or the interface device 2 converts information indicating a result of detection of the three-dimensional position of a detection target in the virtual space K as acquired by the position acquiring unit 41 (which is information about the three-dimensional position of the detection target), into information about the movement of the detection target. The operation information outputting unit 51 then identifies the movement of the detection target in each operation space or across each operation space formed in the virtual space K as information about a pointer operation input in the operation space A and information about a command execution input in the operation space B, for example. Here, the contents of an input operation (also referred to as a "gesture" or a "gesture operation") such as a pointer operation and command execution are determined in advance in a plurality of operation spaces in the virtual space K, and the operation information outputting unit 51 determines whether the movement of the detection target in each operation space or across each operation space corresponds to a predetermined input operation, and interlocks a predetermined operation of an application displayed on the display apparatus 1 and the movement of the detection target determined to correspond to the predetermined input operation. That is, the predetermined operation of the application can be performed in conjunction with movement of the detection target in the virtual space K.

As described above, according to the technology of the present disclosure, the user can operate an application displayed on the display apparatus 1 in a noncontact manner, without the use of an operation device such as a mouse or a touch panel. This leads to reduction of various restrictions when the user performs an application operation. The various restrictions include the space (size or height) of the table on which the operation device is installed, a predetermined shape of the operation device, a function of the operation device for connecting a signal to the display apparatus 1, and a situation or a state in which it is difficult for the user to touch the operation device and operate the operation device, for example.

As described above, since the interface system 100 or the interface device 2 converts movement of the user in the virtual space K into information for operating an application, the user can operate the application in a noncontact manner via the virtual space K provided by the interface system 100 or the interface device 2, without changing the program or the execution environment for the application being operated (driven) in the existing display apparatus 1, for example.

INDUSTRIAL APPLICABILITY

The present disclosure enables visual recognition of boundary positions of a plurality of operation spaces constituting a virtual space to be operated by a user, and is suitable for use in an interface device and an interface system.

REFERENCE SIGNS LIST

1: display apparatus, 2: interface device, 10: display, 11: display control device, 20: projection device (projection unit), 21: detection device (detection unit), 21*a*: detection device, 21*b*: detection device, 21*c*: detection device, 31: aerial image projecting unit, 32: position detecting unit, 41: position acquiring unit (acquisition unit), 42: boundary position recording unit, 43: operation space determining unit (determination unit), 44: pointer operation information outputting unit, 45: pointer position controlling unit, 46: command identifying unit, 47: command recording unit, 48: command outputting unit, 49: command generating unit, 50: aerial image generating unit, 51: operation information outputting unit, 100: interface system, 201: light source, 201*a*: light source, 201*b*: light source, 202: beam splitter, 202*a*: beam splitter, 202*b*: beam splitter, 203: retroreflective member, 203*a*: retroreflective member, 203*b*: retroreflective member, 503: real image, 600: video display device, 604: display apparatus, 605: light emitter, 606: imager, 612: wavelength selecting reflective member, 701: semi-reflective mirror, 702: retroreflective sheet, A: operation space, B: operation space, K: virtual space, P: pointer, R: operation screen, S: aerial image, Sa: aerial image, Sb: aerial image, SC: aerial image, U: internal region

The invention claimed is:

1. An interface device comprising:

detection hardware to detect a three-dimensional position of a detection target in a virtual space; and a projector to project an aerial image onto the virtual space, wherein the virtual space comprises a plurality of operation spaces including a first operation space and a second operation space separated by a boundary position, an operation being defined in each of the operation spaces among the plurality of operation spaces for execution by a user in response to the three-dimensional position of the detection target detected by the detection hardware being included within the virtual space, wherein a predetermined pointer movement operation to be performed to display information on an operation screen of a display device in conjunction with movement of the detection target is defined in the first operation space, an inputting of a command is defined in the second operation space, and the boundary position between the first operation space and the second operation space is indicated by the aerial image projected by the projector.

2. The interface device according to claim 1, wherein the operation defined in each of the operation spaces corresponds to an operation performed using one of a mouse or a touch panel, and the inputting of the command includes at least one of a click operation and a double-click operation.

3. The interface device according to claim 1, wherein the aerial image projected onto the virtual space is formed at a position where a decrease in accuracy of detection of the three-dimensional position of the detection target by the detection hardware is reduced.

4. The interface device according to claim 1, wherein the projector forms the aerial image in the virtual space, to cause the aerial image to include an angle of view of the detection hardware.

5. The interface device according to claim 1, wherein the projector changes a projection mode of the aerial image projected onto the virtual space, depending on at least one of an operation space in which the three-dimensional position of the detection target detected by the detection hardware is included within the virtual space, or the movement of the detection target in the operation space in which the three-dimensional position of the detection target is included within the virtual space, and the projection mode corresponds to changing at least one of color, luminance, or blinking of the aerial image or by projecting an aerial image indicating a lower limit position of a region detectable by the detection hardware.

6. The interface device according to claim 1, wherein the aerial image includes one or more aerial images projected onto the virtual space, and at least one aerial image among the one or more aerial images presents one of an outer frame or an outer surface of the virtual space to the user.

7. The interface device according to claim 1, wherein the projector is one or a plurality of imaging optical systems forming light emitted by a light source as a real image, the real image by the light source formed as the aerial image.

8. The interface device according to claim 7, wherein the projector includes:

two or more of the imaging optical systems forming the light emitted from the light source as two or more of real images by different light paths, and the two or more of the imaging optical systems forming the real image as each of different points, lines or planes as the aerial image including two or more aerial images indicating boundary positions of the operation spaces.

9. The interface device according to claim 7, wherein the projector includes:

two or more of the light sources for forming two or more of aerial images.

10. The interface device according to claim 7, wherein the imaging optical system includes:

a beam splitter splitting the light emitted from the light source into a transmission light and a reflection light, having light beam bending plane constituting one plane on which a light path of the light emitted from the light source being bent; and a retroreflection member reflecting the reflected light to incident direction in response to the reflected light from the beam splitter being incident.

11. The interface device according to claim 10, wherein the imaging optical system includes:

two or more of pairs of beam splitters and retroreflection members, each pair of the beam splitters and the retroreflection members forms the aerial image including two or more aerial images indicating the boundary of the operation space as different points, lines or planes of each of the light emitted from the light source.

12. The interface device according to claim 7, wherein at least one imaging optical system among the one or the plurality of imaging optical systems has a light beam bending plane that forms one plane in which an optical path of the light emitted from the light source is bent, the imaging optical system forming the real image with the light source disposed on one surface side of the light beam bending plane, the real image being formed as the aerial image on an opposite surface side of the light beam bending plane.

13. The interface device according to claim 7, wherein an imaging optical system has a light beam bending plane that forms one plane in which an optical path of the light emitted from the light source is bent, the detection hardware is disposed in an internal region of the imaging optical system, and on one surface side of the light beam bending plane of the imaging optical system.

14. The interface device according to claim 1, wherein the aerial image projected by the projector is visually recognizable by the user, together with video information displayed on the display device.

15. The interface device according to claim 1, further comprising a controller to change an angle at which a boundary plane as a plane onto which the aerial image is projected in the virtual space spatially intersects with a display plane of the display device or set an angle at which the boundary plane does not intersect with the display plane of the display device.

16. The interface device according to claim 7, further comprising two or more of the light sources, wherein the light sources are arranged in such a manner that at least either axes or planes on spaces formed by the light sources are not parallel, real images are formed as the aerial images by pairs of beam splitters and retroreflective members, and the aerial images are formed in parallel to each other on any plane onto which the aerial images are projected in the virtual space.

17. The interface device according to claim 7, further comprising two or more of the light sources, wherein each of the light sources has a variable posture, the aerial image includes a plurality of aerial images, and changing the posture of each of the light sources changes a posture of each aerial image among the plurality of aerial images and changes an angle formed by a boundary plane onto which the each aerial image among the plurality of aerial images is projected with respect to a horizontal plane.

18. The interface device according to claim 17, wherein two or more of the light sources have the variable posture, and changing the posture of each of the light sources changes position relations or directions of the each aerial image formed among the plurality of aerial images formed.

19. The interface device according to claim 1, wherein the projector projects the aerial image as indicating only a boundary position of the operation space.

20. The interface device according to claim 1, wherein neighboring operation spaces in each of the operation spaces correspond to the operations having continuity to each other, and the neighboring operation spaces are recognized simultaneously for users.

21. An interface device that allows an operation of an application displayed on a display device, the interface device comprising:

detection hardware to detect a three-dimensional position of a detection target in a virtual space comprising a plurality of operation spaces including a first operation space and a second operation space separated by a boundary position;

at least one boundary definer to indicate a boundary position between the first operation space and the second operation space, the at least one boundary definer including one of a line or a plane; and a boundary displayer to provide at least one visually recognizable boundary of each of the operation spaces, the boundary displayer including one of a point, a line, or a plane, wherein, in response to the three-dimensional position of the detection target detected by the detector is detection hardware being included in the virtual space, the detection target is enabled to perform a plurality of kinds of operations on the application, the operations being associated with each of the operation spaces, wherein a predetermined pointer movement operation to be performed to display information on an operation screen of the display device in conjunction with movement of the detection target is defined in the first operation space, an inputting of a command is defined in the second operation space, and the boundary position between the first operation space and the second operation space is indicated by the at least one boundary definer.

22. The interface device according to claim 21, wherein the boundary displayer is a projector to project an aerial image onto the virtual space, a boundary position of each of the operation spaces in the virtual space is indicated by the aerial image projected by the projector, and the aerial image projected by the projector is visually recognizable by a user, together with video information displayed on the display device.

23. The interface device according to claim 21, wherein the boundary displayer is a projector projecting an aerial image in the virtual space, the projector projects the aerial image as indicating only the boundary position of the operation space.

24. An interface system comprising:

detection hardware to detect a three-dimensional position of a detection target in a virtual space;

a projector to project an aerial image onto the virtual space; and a display device to display video information, wherein the virtual space comprises a plurality of operation spaces including a first operation space and a second operation space, an operation being defined in each of the operation spaces among the plurality of operation spaces for executable by a user in response to the three-dimensional position of the detection target detected by the detection hardware being included within the virtual space, wherein a predetermined pointer movement operation to be performed to display information on an operation screen of the display device in conjunction with movement of the detection target is defined in the first operation space, an inputting of a command is defined in the second operation space, and a boundary position between the first operation space and the second operation space is indicated by the aerial image projected by the projector, and the aerial image projected by the projector is visually recognizable by the user, together with the video information displayed on the display device.

25. The interface system according to claim 24, further comprising a controller to change an angle at which a boundary plane that is a plane onto which the aerial image is projected in the virtual space spatially intersects with a display plane of the display device.

26. The interface system according to claim 24, wherein the operation defined in each of the operation spaces among the plurality of operation spaces corresponds to an operation performed using one of a mouse or a touch panel, and the inputting of the command includes at least one of a click operation and a double-click operation.

27. An interface system comprising:

detection hardware to detect a three-dimensional position of a detection target in a virtual space comprising a plurality of operation spaces;

acquisition hardware to acquire the three-dimensional position of the detection target detected by the detection hardware;

a projector to project an aerial image indicating a boundary position of the operation spaces;

determining hardware to determine an operation space in which the three-dimensional position of the detection target is included within the virtual space, on a basis of the three-dimensional position of the detection target acquired by the acquisition hardware and the boundary position of each of the operation spaces in the virtual space; and an operation information outputting hardware to output operation information for performing a predetermined operation on an application displayed on a display apparatus, using at least a result of determination performed by the determining hardware, wherein each of the operation spaces corresponds to at least one operation of a plurality of kinds of operations using one of a mouse or a touch panel for the application, and different successive operations of the operations for the application are associated with adjacent operation spaces among the respective operation spaces.

28. An interface system comprising:

detection hardware to detect a three-dimensional position of a detection target in a virtual space comprising a plurality of operation spaces;

acquisition hardware to acquire the three-dimensional position of the detection target detected by the detection hardware;

a projector to project an aerial image indicating a boundary position of the operation spaces;

determining hardware to determine an operation space in which the three-dimensional position of the detection target is included within the virtual space, on a basis of the three-dimensional position of the detection target acquired by the acquisition hardware and the boundary position of each of the operation spaces in the virtual space; and an operation information outputting hardware to output operation information for performing a predetermined operation on an application displayed on a display apparatus, using at least a result of determination performed by the determining hardware, wherein the operation information outputting hardware identifies movement of the detection target on a basis of the three-dimensional position of the detection target, and associates movement of the detection target in each of the operation spaces or across each of the operation spaces with at least one operation of a plurality of kinds of operations for the application using one of a mouse or a touch panel, and interlock a predetermined operation for the application with the movement of the detection target.

* * * * *